(12) United States Patent
Suwa et al.

(10) Patent No.: US 8,447,241 B2
(45) Date of Patent: May 21, 2013

(54) WIRELESS COMMUNICATION APPARATUS

(75) Inventors: Yutaka Suwa, Fukuoka (JP); Hiroyuki Ishihara, Fukuoka (JP); Toshihiko Sakata, Fukuoka (JP); Koji Hayashida, Fukuoka (JP); Akira Shibuta, Fukuoka (JP); Norihiro Toyomura, Fukuoka (JP); Kyoichi Obana, Fukuoka (JP)

(73) Assignee: Panasonic Corporation, Osaka (JP)

( * ) Notice: Subject to any disclaimer, the term of this patent is extended or adjusted under 35 U.S.C. 154(b) by 725 days.

(21) Appl. No.: 12/472,278

(22) Filed: May 26, 2009

(65) Prior Publication Data

US 2009/0291644 A1 Nov. 26, 2009

(30) Foreign Application Priority Data

May 26, 2008 (JP) ................ P2008-136235
Jun. 25, 2008 (JP) ................ P2008-165578
Jul. 24, 2008 (JP) ................ P2008-190575

(51) Int. Cl.
*H04B 1/40* (2006.01)

(52) U.S. Cl.
USPC ........ 455/77; 455/464; 455/188.1; 455/191.1

(58) Field of Classification Search
USPC .............................. 455/77, 188.1, 191.1, 464
See application file for complete search history.

(56) References Cited

U.S. PATENT DOCUMENTS

| | | | | |
|---|---|---|---|---|
| 5,406,615 | A | * | 4/1995 | Miller et al. ............... 455/552.1 |
| 5,475,868 | A | * | 12/1995 | Duque-Anton et al. ......... 455/62 |
| 5,722,079 | A | * | 2/1998 | Apraez et al. ................. 455/464 |
| 2002/0177444 | A1 | * | 11/2002 | Nagato et al. ................. 455/446 |

FOREIGN PATENT DOCUMENTS

| | | |
|---|---|---|
| JP | 06 077 942 | 3/1994 |
| JP | 10 285 644 | 10/1998 |
| JP | 2000/261449 | 9/2000 |
| JP | 2004/229087 | 8/2004 |

* cited by examiner

*Primary Examiner* — Nguyen Vo
*Assistant Examiner* — Hsin-Chun Liao
(74) *Attorney, Agent, or Firm* — Dickinson Wright PLLC

(57) ABSTRACT

A wireless communication apparatus is provided. The apparatus includes a wireless transceiver which conducts communication with another wireless communication apparatus using a channel belonging to a first band of a plurality of frequency bands, and a switching unit which switches the channel being used by the wireless transceiver to a different channel of a second band of the plurality of frequency bands other than the first band.

9 Claims, 47 Drawing Sheets

| CHANNEL NO. | USE BAND |
|---|---|
| 1 | BAND 1 |
| 2 | BAND 1 |
| 3 | BAND 1 |
| 4 | BAND 1 |
| 5 | BAND 1 |
| 6 | BAND 2 |
| 7 | BAND 2 |
| 8 | BAND 2 |
| 9 | BAND 2 |
| 10 | BAND 2 |
| 11 | BAND 3 |
| 12 | BAND 3 |
| 13 | BAND 3 |
| 14 | BAND 3 |
| 15 | BAND 3 |

FIG. 8

CHANNEL SLOT RECEPTION ELECTRIC FIELD INTENSITY MAP    [dBm]

| CHANNEL NO. | USE BAND | SLOT 0 | SLOT 1 | SLOT 2 | SLOT 3 | SLOT 4 | SLOT 5 |
|---|---|---|---|---|---|---|---|
| 1 | BAND 1 | -85 | -85 | -85 | -85 | -85 | -85 |
| 2 | BAND 1 | -70 | -75 | -85 | -85 | -85 | -85 |
| 3 | BAND 1 | -50 | -60 | -60 | -50 | -50 | -85 |
| 4 | BAND 1 | -75 | -70 | -85 | -85 | -85 | -85 |
| 5 | BAND 1 | -70 | -85 | -85 | -85 | -85 | -85 |
| 6 | BAND 2 | -85 | -85 | -85 | -85 | -85 | -85 |
| 7 | BAND 2 | -85 | -85 | -85 | -85 | -85 | -85 |
| 8 | BAND 2 | -85 | -90 | -85 | -85 | -85 | -85 |
| 9 | BAND 2 | -85 | -85 | -85 | -85 | -85 | -85 |
| 10 | BAND 2 | -85 | -85 | -85 | -85 | -85 | -85 |
| 11 | BAND 3 | -85 | -85 | -85 | -85 | -85 | -85 |
| 12 | BAND 3 | -75 | -85 | -85 | -85 | -85 | -85 |
| 13 | BAND 3 | -60 | -60 | -50 | -85 | -85 | -85 |
| 14 | BAND 3 | -70 | -85 | -85 | -85 | -85 | -85 |
| 15 | BAND 3 | -85 | -85 | -85 | -85 | -85 | -85 |

FIG. 9

GOOD-CHANNEL SLOT MAP

| CHANNEL NO. | USE BAND | SLOT 0 | SLOT 1 | SLOT 2 | SLOT 3 | SLOT 4 | SLOT 5 | GOOD-CHANNEL SLOT PRIORITY INFORMATION (NUMBER OF BADNESS IN BAND) |
|---|---|---|---|---|---|---|---|---|
| 1 | BAND 1 | GOOD | GOOD | GOOD | GOOD | GOOD | GOOD | 20 PRIORITY LOW |
| 2 | BAND 1 | BAD | BAD | GOOD | GOOD | GOOD | GOOD | |
| 3 | BAND 1 | BAD | BAD | BAD | BAD | BAD | GOOD | |
| 4 | BAND 1 | BAD | BAD | GOOD | GOOD | GOOD | GOOD | |
| 5 | BAND 1 | BAD | GOOD | GOOD | GOOD | GOOD | GOOD | |
| 6 | BAND 2 | GOOD | GOOD | GOOD | GOOD | GOOD | GOOD | 30 PRIORITY HIGH |
| 7 | BAND 2 | GOOD | GOOD | GOOD | GOOD | GOOD | GOOD | |
| 8 | BAND 2 | GOOD | GOOD | GOOD | GOOD | GOOD | GOOD | |
| 9 | BAND 2 | GOOD | GOOD | GOOD | GOOD | GOOD | GOOD | |
| 10 | BAND 2 | GOOD | GOOD | GOOD | GOOD | GOOD | GOOD | |
| 11 | BAND 3 | GOOD | GOOD | GOOD | GOOD | GOOD | GOOD | 25 |
| 12 | BAND 3 | BAD | GOOD | GOOD | GOOD | GOOD | GOOD | |
| 13 | BAND 3 | BAD | BAD | BAD | GOOD | GOOD | GOOD | |
| 14 | BAND 3 | BAD | GOOD | GOOD | GOOD | GOOD | GOOD | |
| 15 | BAND 3 | GOOD | GOOD | GOOD | GOOD | GOOD | GOOD | |

FIG. 10

ERROR-CHANNEL SLOT MAP

| CHANNEL NO. | USE BAND | SLOT 0 | SLOT 1 | SLOT 2 | SLOT 3 | SLOT 4 | SLOT 5 | GOOD-CHANNEL SLOT PRIORITY INFORMATION (NUMBER OF BADNESS IN BAND) |
|---|---|---|---|---|---|---|---|---|
| 1 | BAND 1 | 0 | 0 | 0 | 0 | 0 | 0 | 14 PRIORITY LOW |
| 2 | BAND 1 | 6 | 3 | 1 | 0 | 0 | 0 | |
| 3 | BAND 1 | 2 | 2 | 0 | 0 | 0 | 0 | |
| 4 | BAND 1 | 0 | 0 | 0 | 0 | 0 | 0 | |
| 5 | BAND 1 | 0 | 0 | 0 | 0 | 0 | 0 | |
| 6 | BAND 2 | 0 | 0 | 0 | 0 | 0 | 0 | 3 PRIORITY HIGH |
| 7 | BAND 2 | 0 | 0 | 0 | 0 | 0 | 0 | |
| 8 | BAND 2 | 3 | 0 | 0 | 0 | 0 | 0 | |
| 9 | BAND 2 | 0 | 0 | 0 | 0 | 0 | 0 | |
| 10 | BAND 2 | 0 | 0 | 0 | 0 | 0 | 0 | |
| 11 | BAND 3 | 0 | 0 | 0 | 0 | 0 | 0 | 9 |
| 12 | BAND 3 | 5 | 3 | 1 | 0 | 0 | 0 | |
| 13 | BAND 3 | 0 | 0 | 0 | 0 | 0 | 0 | |
| 14 | BAND 3 | 0 | 0 | 0 | 0 | 0 | 0 | |
| 15 | BAND 3 | 0 | 0 | 0 | 0 | 0 | 0 | |

USUAL USE CHANNEL GROUP

BAND 1 1.9GHz | BAND 2 2.4GHz | BAND 3 5.8GHz

LOW → FREQUENCY HIGH

| USUAL USE CHANNEL GROUP | | WAITING CHANNEL GROUP | |
|---|---|---|---|
| CHANNEL NO. | USE BAND | CHANNEL NO. | USE BAND |
| 1 | BAND 1 | 16 | BAND 1 |
| 2 | BAND 1 | 17 | BAND 1 |
| 3 | BAND 1 | 18 | BAND 1 |
| 4 | BAND 1 | 19 | BAND 1 |
| 5 | BAND 1 | 20 | BAND 1 |
| 6 | BAND 2 | 21 | BAND 2 |
| 7 | BAND 2 | 22 | BAND 2 |
| 8 | BAND 2 | 23 | BAND 2 |
| 9 | BAND 2 | 24 | BAND 2 |
| 10 | BAND 2 | 25 | BAND 2 |
| 11 | BAND 3 | 26 | BAND 3 |
| 12 | BAND 3 | 27 | BAND 3 |
| 13 | BAND 3 | 28 | BAND 3 |
| 14 | BAND 3 | 29 | BAND 3 |
| 15 | BAND 3 | 30 | BAND 3 |

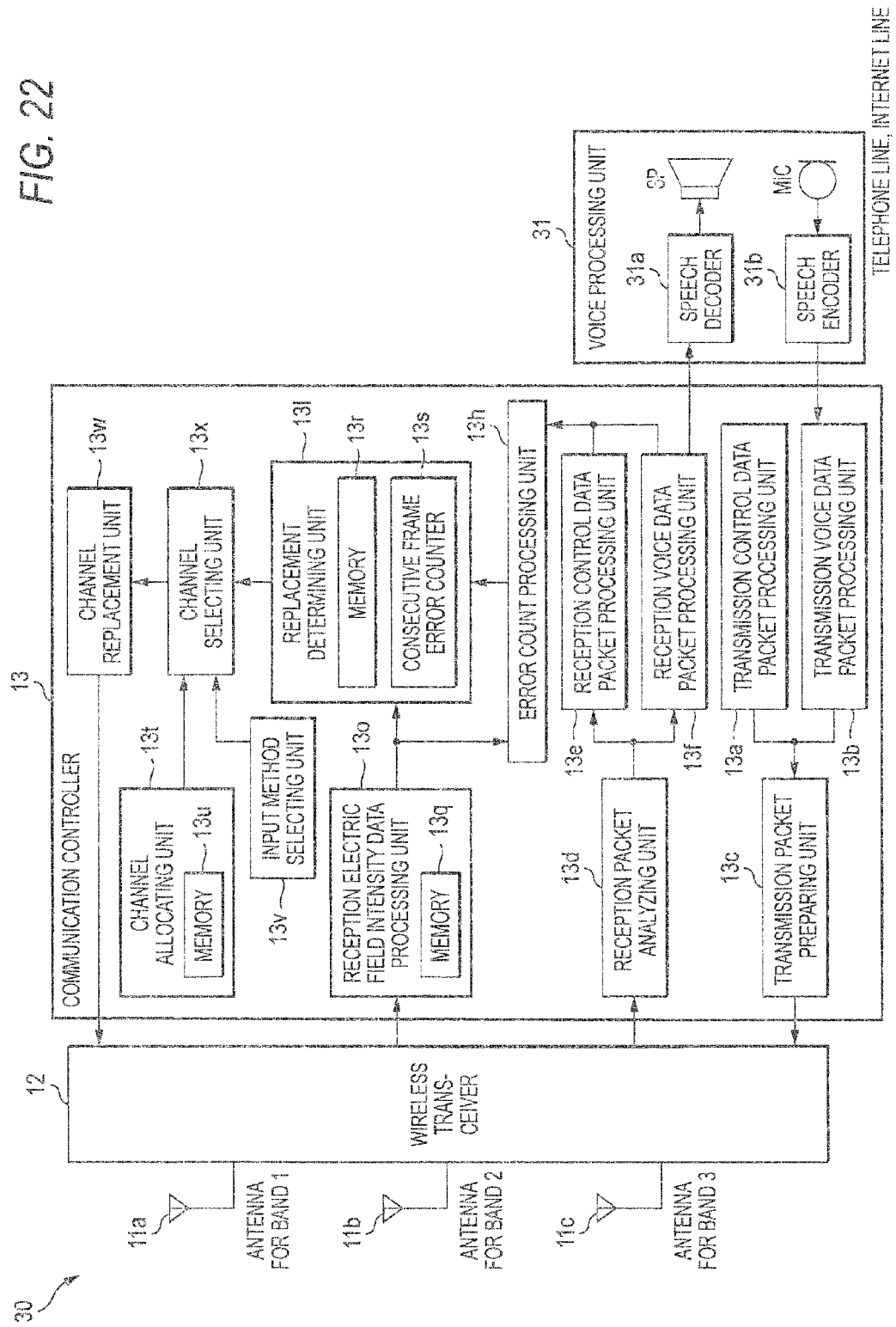

FIG. 23

CHANNEL STATE TABLE

| | CHANNEL NO. | USE BAND | STATE |
|---|---|---|---|
| USUAL USE CHANNEL GROUP | 1 | BAND 1 | USE |
| | 2 | BAND 1 | USE |
| | 3 | BAND 1 | REPLACEMENT |
| | 4 | BAND 1 | USE |
| | 5 | BAND 1 | USE |
| | 6 | BAND 2 | USE |
| | 7 | BAND 2 | USE |
| | 8 | BAND 2 | USE |
| | 9 | BAND 2 | USE |
| | 10 | BAND 2 | USE |
| | 11 | BAND 3 | USE |
| | 12 | BAND 3 | USE |
| | 13 | BAND 3 | REPLACEMENT |
| | 14 | BAND 3 | USE |
| | 15 | BAND 3 | USE |
| WAITING CHANNEL GROUP | 16 | BAND 1 | WAITING |
| | 17 | BAND 1 | WAITING |
| | 18 | BAND 1 | WAITING |
| | 19 | BAND 1 | WAITING |
| | 20 | BAND 1 | WAITING |
| | 21 | BAND 2 | USE |
| | 22 | BAND 2 | USE |
| | 23 | BAND 2 | WAITING |
| | 24 | BAND 2 | WAITING |
| | 25 | BAND 2 | WAITING |
| | 26 | BAND 3 | WAITING |
| | 27 | BAND 3 | WAITING |
| | 28 | BAND 3 | WAITING |
| | 29 | BAND 3 | WAITING |
| | 30 | BAND 3 | WAITING |

FIG. 24A

USUAL USE CHANNEL GROUP

| CHANNEL NO. | CHANNEL FREQUENCY | |
|---|---|---|
| 1 | 1.90GHz | BAND 1 (1.9GHz) |
| 2 | 1.91GHz | |
| 3 | 1.92GHz | |
| 4 | 1.93GHz | |
| 5 | 1.94GHz | |
| 6 | 2.40GHz | BAND 2 (2.4GHz) |
| 7 | 2.41GHz | |
| 8 | 2.42GHz | |
| 9 | 2.43GHz | |
| 10 | 2.44GHz | |
| 11 | 5.80GHz | BAND 3 (5.8GHz) |
| 12 | 5.81GHz | |
| 13 | 5.82GHz | |
| 14 | 5.83GHz | |
| 15 | 5.84GHz | |

FIG. 24B

WAITING CHANNEL GROUP

| CHANNEL NO. | CHANNEL FREQUENCY | |
|---|---|---|
| 16 | 1.95GHz | BAND 1 (1.9GHz) |
| 17 | 1.96GHz | |
| 18 | 1.97GHz | |
| 19 | 1.98GHz | |
| 20 | 1.99GHz | |
| 21 | 2.45GHz | BAND 2 (2.4GHz) |
| 22 | 2.46GHz | |
| 23 | 2.47GHz | |
| 24 | 2.48GHz | |
| 25 | 2.49GHz | |
| 26 | 5.85GHz | BAND 3 (5.8GHz) |
| 27 | 5.86GHz | |
| 28 | 5.87GHz | |
| 29 | 5.88GHz | |
| 30 | 5.89GHz | |

FIG. 26

CHANNEL SLOT RECEPTION ELECTRIC FIELD INTENSITY MAP  [dBm]

| KIND | CHANNEL NO. | USE BAND | SLOT 0 | SLOT 1 | SLOT 2 | SLOT 3 | SLOT 4 | SLOT 5 |
|---|---|---|---|---|---|---|---|---|
| USUAL USE CHANNEL GROUP | 1 | BAND 1 | -85 | -85 | -85 | -85 | -85 | -85 |
| | 2 | BAND 1 | -70 | -75 | -85 | -85 | -85 | -85 |
| | 3 | BAND 1 | -50 | -60 | -60 | -50 | -50 | -85 |
| | 4 | BAND 1 | -75 | -70 | -85 | -85 | -85 | -85 |
| | 5 | BAND 1 | -70 | -85 | -85 | -85 | -85 | -85 |
| | 6 | BAND 2 | -85 | -85 | -85 | -85 | -85 | -85 |
| | 7 | BAND 2 | -85 | -85 | -85 | -85 | -85 | -85 |
| | 8 | BAND 2 | -85 | -90 | -85 | -85 | -85 | -85 |
| | 9 | BAND 2 | -85 | -85 | -85 | -85 | -85 | -85 |
| | 10 | BAND 2 | -85 | -85 | -85 | -85 | -85 | -85 |
| | 11 | BAND 3 | -85 | -85 | -85 | -85 | -85 | -85 |
| | 12 | BAND 3 | -75 | -85 | -85 | -85 | -85 | -85 |
| | 13 | BAND 3 | -60 | -60 | -50 | -85 | -85 | -85 |
| | 14 | BAND 3 | -70 | -85 | -85 | -85 | -85 | -85 |
| | 15 | BAND 3 | -85 | -85 | -85 | -85 | -85 | -85 |
| WAITING CHANNEL GROUP | 16 | BAND 1 | -85 | -85 | -85 | -85 | -85 | -85 |
| | 17 | BAND 1 | -70 | -75 | -85 | -85 | -85 | -85 |
| | 18 | BAND 1 | -50 | -60 | -85 | -85 | -50 | -85 |
| | 19 | BAND 1 | -75 | -70 | -85 | -85 | -85 | -85 |
| | 20 | BAND 1 | -70 | -85 | -85 | -85 | -85 | -85 |
| | 21 | BAND 2 | -85 | -85 | -85 | -85 | -85 | -85 |
| | 22 | BAND 2 | -85 | -85 | -85 | -85 | -85 | -85 |
| | 23 | BAND 2 | -85 | -90 | -85 | -85 | -85 | -85 |
| | 24 | BAND 2 | -85 | -85 | -85 | -85 | -85 | -85 |
| | 25 | BAND 2 | -85 | -85 | -85 | -85 | -85 | -85 |
| | 26 | BAND 3 | -85 | -85 | -85 | -85 | -85 | -85 |
| | 27 | BAND 3 | -75 | -85 | -85 | -85 | -85 | -85 |
| | 28 | BAND 3 | -60 | -60 | -50 | -85 | -85 | -85 |
| | 29 | BAND 3 | -70 | -85 | -85 | -85 | -85 | -85 |
| | 30 | BAND 3 | -85 | -85 | -85 | -85 | -85 | -85 |

FIG. 27

GOOD-CHANNEL SLOT MAP

| KIND | CHANNEL NO. | USE BAND | SLOT 0 | SLOT 1 | SLOT 2 | SLOT 3 | SLOT 4 | SLOT 5 | NUMBER OF GOODNESS IN BAND |
|---|---|---|---|---|---|---|---|---|---|
| USUAL USE CHANNEL GROUP | 1 | BAND 1 | GOOD | GOOD | GOOD | GOOD | GOOD | GOOD | |
| | 2 | BAND 1 | BAD | BAD | GOOD | GOOD | GOOD | GOOD | |
| | 3 | BAND 1 | BAD | BAD | BAD | BAD | BAD | GOOD | |
| | 4 | BAND 1 | BAD | BAD | GOOD | GOOD | GOOD | GOOD | |
| | 5 | BAND 1 | BAD | GOOD | GOOD | GOOD | GOOD | GOOD | |
| | 6 | BAND 2 | GOOD | GOOD | GOOD | GOOD | GOOD | GOOD | |
| | 7 | BAND 2 | GOOD | GOOD | GOOD | GOOD | GOOD | GOOD | |
| | 8 | BAND 2 | GOOD | GOOD | GOOD | GOOD | GOOD | GOOD | |
| | 9 | BAND 2 | GOOD | GOOD | GOOD | GOOD | GOOD | GOOD | |
| | 10 | BAND 2 | GOOD | GOOD | GOOD | GOOD | GOOD | GOOD | |
| | 11 | BAND 3 | GOOD | GOOD | GOOD | GOOD | GOOD | GOOD | |
| | 12 | BAND 3 | BAD | GOOD | GOOD | GOOD | GOOD | GOOD | |
| | 13 | BAND 3 | BAD | BAD | BAD | GOOD | GOOD | GOOD | |
| | 14 | BAND 3 | BAD | GOOD | GOOD | GOOD | GOOD | GOOD | |
| | 15 | BAND 3 | GOOD | GOOD | GOOD | GOOD | GOOD | GOOD | |
| WAITING CHANNEL GROUP | 16 | BAND 1 | GOOD | GOOD | GOOD | GOOD | GOOD | GOOD | 22 PRIORITY LOW |
| | 17 | BAND 1 | BAD | BAD | GOOD | GOOD | GOOD | GOOD | |
| | 18 | BAND 1 | BAD | BAD | GOOD | GOOD | BAD | GOOD | |
| | 19 | BAND 1 | BAD | BAD | GOOD | GOOD | GOOD | GOOD | |
| | 20 | BAND 1 | BAD | GOOD | GOOD | GOOD | GOOD | GOOD | |
| | 21 | BAND 2 | GOOD | GOOD | GOOD | GOOD | GOOD | GOOD | 30 PRIORITY HIGH |
| | 22 | BAND 2 | GOOD | GOOD | GOOD | GOOD | GOOD | GOOD | |
| | 23 | BAND 2 | GOOD | GOOD | GOOD | GOOD | GOOD | GOOD | |
| | 24 | BAND 2 | GOOD | GOOD | GOOD | GOOD | GOOD | GOOD | |
| | 25 | BAND 2 | GOOD | GOOD | GOOD | GOOD | GOOD | GOOD | |
| | 26 | BAND 3 | GOOD | GOOD | GOOD | GOOD | GOOD | GOOD | 25 |
| | 27 | BAND 3 | BAD | GOOD | GOOD | GOOD | GOOD | GOOD | |
| | 28 | BAND 3 | BAD | BAD | BAD | GOOD | GOOD | GOOD | |
| | 29 | BAND 3 | BAD | GOOD | GOOD | GOOD | GOOD | GOOD | |
| | 30 | BAND 3 | GOOD | GOOD | GOOD | GOOD | GOOD | GOOD | |

FIG. 28

ERROR-CHANNEL SLOT MAP

| KIND | CHANNEL NO. | USE BAND | SLOT 0 | SLOT 1 | SLOT 2 | SLOT 3 | SLOT 4 | SLOT 5 | NUMBER OF ERRORS IN CHANNEL | NUMBER OF ERRORS IN BAND |
|---|---|---|---|---|---|---|---|---|---|---|
| USUAL USE CHANNEL GROUP | 1 | BAND 1 | 0 | 0 | 0 | 0 | 0 | 0 | 0 | |
| | 2 | BAND 1 | 6 | 5 | 1 | 0 | 0 | 0 | 12 | |
| | 3 | BAND 1 | 2 | 4 | 0 | 0 | 0 | 0 | 6 | |
| | 4 | BAND 1 | 0 | 0 | 0 | 0 | 0 | 0 | 0 | |
| | 5 | BAND 1 | 0 | 0 | 0 | 0 | 0 | 0 | 0 | |
| | 6 | BAND 2 | 0 | 0 | 0 | 0 | 0 | 0 | 0 | |
| | 7 | BAND 2 | 0 | 0 | 0 | 0 | 0 | 0 | 0 | |
| | 8 | BAND 2 | 3 | 0 | 0 | 0 | 0 | 0 | 3 | |
| | 9 | BAND 2 | 0 | 0 | 0 | 0 | 0 | 0 | 0 | |
| | 10 | BAND 2 | 0 | 0 | 0 | 0 | 0 | 0 | 0 | |
| | 11 | BAND 3 | 0 | 0 | 0 | 0 | 0 | 0 | 0 | |
| | 12 | BAND 3 | 5 | 3 | 1 | 0 | 0 | 0 | 9 | |
| | 13 | BAND 3 | 0 | 0 | 0 | 0 | 0 | 0 | 0 | |
| | 14 | BAND 3 | 0 | 0 | 0 | 0 | 0 | 0 | 0 | |
| | 15 | BAND 3 | 0 | 0 | 0 | 0 | 0 | 0 | 0 | |
| WAITING CHANNEL GROUP | 16 | BAND 1 | 0 | 0 | 0 | 0 | 0 | 0 | 0 | 18 PRIORITY LOW |
| | 17 | BAND 1 | 6 | 3 | 1 | 0 | 0 | 0 | 10 | |
| | 18 | BAND 1 | 2 | 4 | 0 | 0 | 0 | 0 | 6 | |
| | 19 | BAND 1 | 0 | 0 | 0 | 0 | 0 | 0 | 0 | |
| | 20 | BAND 1 | 1 | 0 | 0 | 0 | 0 | 0 | 1 | |
| | 21 | BAND 2 | 0 | 0 | 0 | 0 | 0 | 0 | 0 | 3 PRIORITY HIGH |
| | 22 | BAND 2 | 0 | 0 | 0 | 0 | 0 | 0 | 0 | |
| | 23 | BAND 2 | 1 | 0 | 0 | 0 | 0 | 0 | 1 | |
| | 24 | BAND 2 | 0 | 0 | 0 | 0 | 0 | 0 | 0 | |
| | 25 | BAND 2 | 0 | 0 | 0 | 0 | 0 | 0 | 0 | |
| | 26 | BAND 3 | 0 | 0 | 0 | 0 | 0 | 0 | 0 | 9 |
| | 27 | BAND 3 | 1 | 3 | 1 | 0 | 0 | 0 | 5 | |
| | 28 | BAND 3 | 0 | 0 | 0 | 0 | 0 | 0 | 0 | |
| | 29 | BAND 3 | 0 | 0 | 0 | 0 | 0 | 0 | 0 | |
| | 30 | BAND 3 | 0 | 0 | 0 | 0 | 0 | 0 | 0 | |

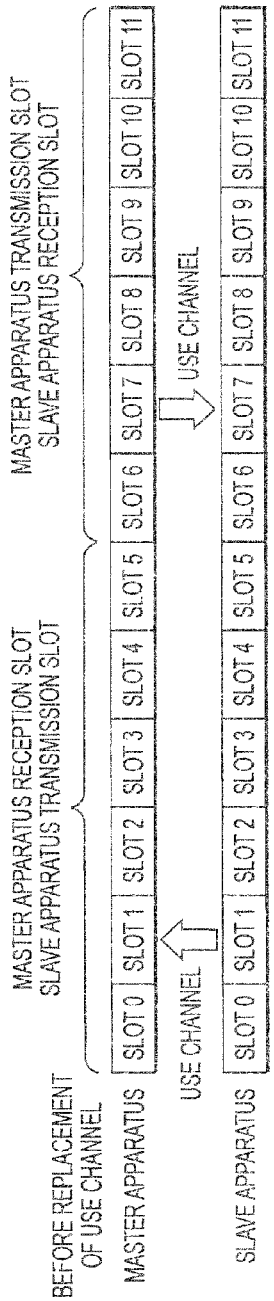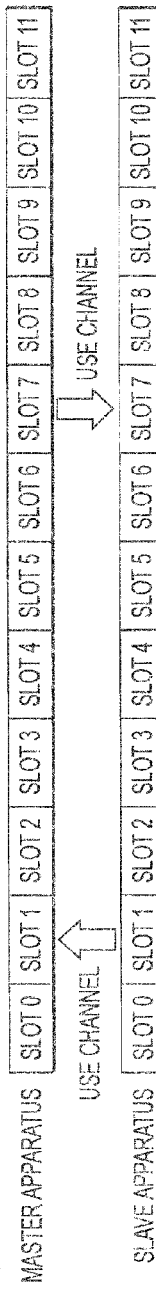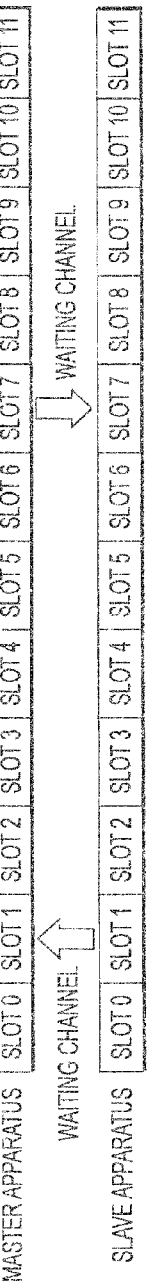
FIG. 36

FIG. 37A

USUAL USE CHANNEL GROUP

| CHANNEL NO. | CHANNEL FREQUENCY | |
|---|---|---|
| 1 | 1.90GHz | BAND 1 (1.9GHz) |
| 2 | 1.92GHz | |
| 3 | 1.94GHz | |
| 4 | 1.96GHz | |
| 5 | 1.98GHz | |
| 6 | 2.40GHz | BAND 2 (2.4GHz) |
| 7 | 2.42GHz | |
| 8 | 2.44GHz | |
| 9 | 2.46GHz | |
| 10 | 2.48GHz | |
| 11 | 5.80GHz | BAND 3 (5.8GHz) |
| 12 | 5.82GHz | |
| 13 | 5.84GHz | |
| 14 | 5.86GHz | |
| 15 | 5.88GHz | |

FIG. 37B

WAITING CHANNEL GROUP

| CHANNEL NO. | CHANNEL FREQUENCY | |
|---|---|---|
| 16 | 1.91GHz | BAND 1 (1.9GHz) |
| 17 | 1.93GHz | |
| 18 | 1.95GHz | |
| 19 | 1.97GHz | |
| 20 | 1.99GHz | |
| 21 | 2.41GHz | BAND 2 (2.4GHz) |
| 22 | 2.43GHz | |
| 23 | 2.45GHz | |
| 24 | 2.47GHz | |
| 25 | 2.49GHz | |
| 26 | 5.81GHz | BAND 3 (5.8GHz) |
| 27 | 5.83GHz | |
| 28 | 5.85GHz | |
| 29 | 5.87GHz | |
| 30 | 5.89GHz | |

WIRELESS COMMUNICATION APPARATUS

BACKGROUND OF THE INVENTION

1. Field of the Invention

The present invention relates to a wireless communication apparatus which conducts TDMA (Time Division Multiple Access)-based communication.

2. Description of the Background Art

In wireless communication, communication quality is significantly affected by an electric field intensity of a transmission electric waver a distance between devices and an interference electric wave as a noise.

As a measure against an interference electric wave, for example, JP-2000-261449A discloses an interference avoidance method in which a channel under communication is switched when interference is detected. Specifically, in response to a notification from a wireless terminal which has detected any interference, a master station first executes channel switching for all wireless terminals and informs all the wireless terminals of a switching start timing. Then, all the wireless terminals which have received this information continue to conduct communication by generating a random number on the basis of a random number radix from a master apparatus and decide a channel switching destination channel on the basis of the generated random number.

However, the interference avoidance method disclosed in JP-2000-261449A addresses only switching channel for interference avoidance. For example, assuming a frequency band being used by a wireless communication device is a band of 2.4 GHz, if a microwave oven to generate noise in the same band of 2.4 GHz is operating near the wireless communication device, an interference electric wave is produced in all channels of the band of 2.4 GHz, which may result in impossibility of communication even in channel switching.

SUMMARY OF THE INVENTION

It is therefore an object of the present invention to provide a wireless communication apparatus with high communication quality.

A wireless communication apparatus of the present invention includes a wireless transceiver which conducts communication with another wireless communication apparatus using a channel belonging to a first band of a plurality of frequency bands; and a switching unit which switches the channel being used by the wireless transceiver to a different channel of a second band of the plurality of frequency bands other than the first band.

The present invention provides a wireless communication apparatus with high communication quality since it is possible to maintain good communication by switching a channel being used to a different channel of the frequency band other than that to which the channel being used belongs.

BRIEF DESCRIPTION OF THE DRAWINGS

FIG. 8 shows a channel/slot reception electric field intensity map;

FIG. 9 shows a good channel/slot map;

FIG. 10 shows an error channel/slot map;

FIG. 22 is a block diagram showing a configuration of a slave apparatus of the cordless telephone system shown in FIG. 1;

FIG. 23 shows a channel state table;

FIGS. 24A and 24B are tables showing an example of channel frequencies allocated by a channel allocating unit;

FIG. 26 shows a channel/slot reception electric field intensity map;

FIG. 27 shows a good channel/slot map;

FIG. 28 shows an error channel/slot map;

FIG. 36 is a flow chart showing a state where channel replacement is performed between communication counterpart devices;

FIGS. 37A and 37B are tables showing another example of channel frequencies allocated by the channel allocating unit;

DETAILED DESCRIPTION OF THE PREFERRED EMBODIMENTS

First Embodiment

Figure 1:
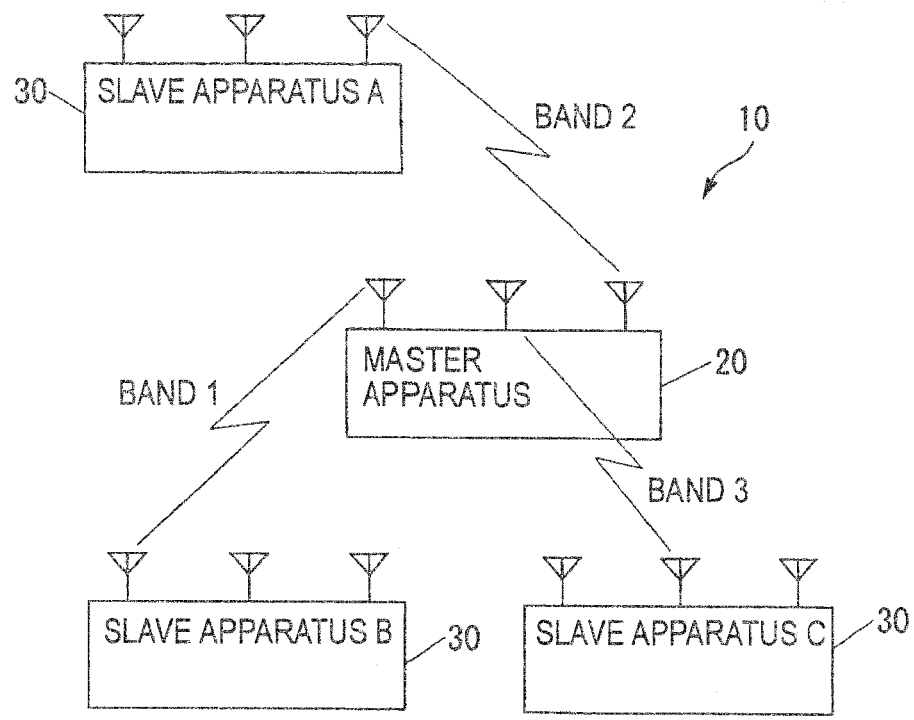
FIG. 1 shows a configuration of a cordless telephone system according to a first embodiment.
Figures 2A, 2B:
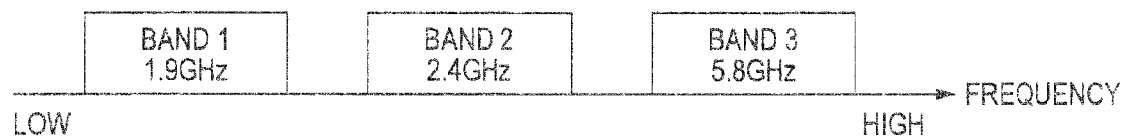
FIGS. 2A and 2B show frequency bands and channels used by the cordless telephone system shown in FIG. 1, respectively.

A wireless communication apparatus according to a first embodiment will be described by way of example of a cordless telephone system with reference to the drawings. FIG. 1 shows a configuration of a cordless telephone system according to the first embodiment. FIGS. 2A and 2B show frequency bands and channels used by the cordless telephone system shown in FIG. 1; FIG. 2A shows frequency bands and FIG. 2B shows a correspondence of frequency band to channel number. A cordless telephone system 10 shown in FIG. 1 includes one master apparatus 20 connected to a telephone line L and three slave apparatuses 30(A to C) which conduct TDMA TDD-based communication with the master apparatus 20. In this example, 6 slots are used in each of up and down links, with one frame constituted by twelve slots (see FIG. 5). The master apparatus 20 and the slave apparatuses 30 conduct communication therebetween using three different frequency bands. Specifically, five carrier frequencies (hereinafter called "channel") are allocated, as shown in FIG. 2B, in three frequency bands, i.e., a 1.9 GHz band (band 1), a 2.4 GHz band (band 2) and a 5.8 GHz band (band 3) as shown in FIG. 2A, respectively, and communication is conducted using one of the five channels.

Figure 3:
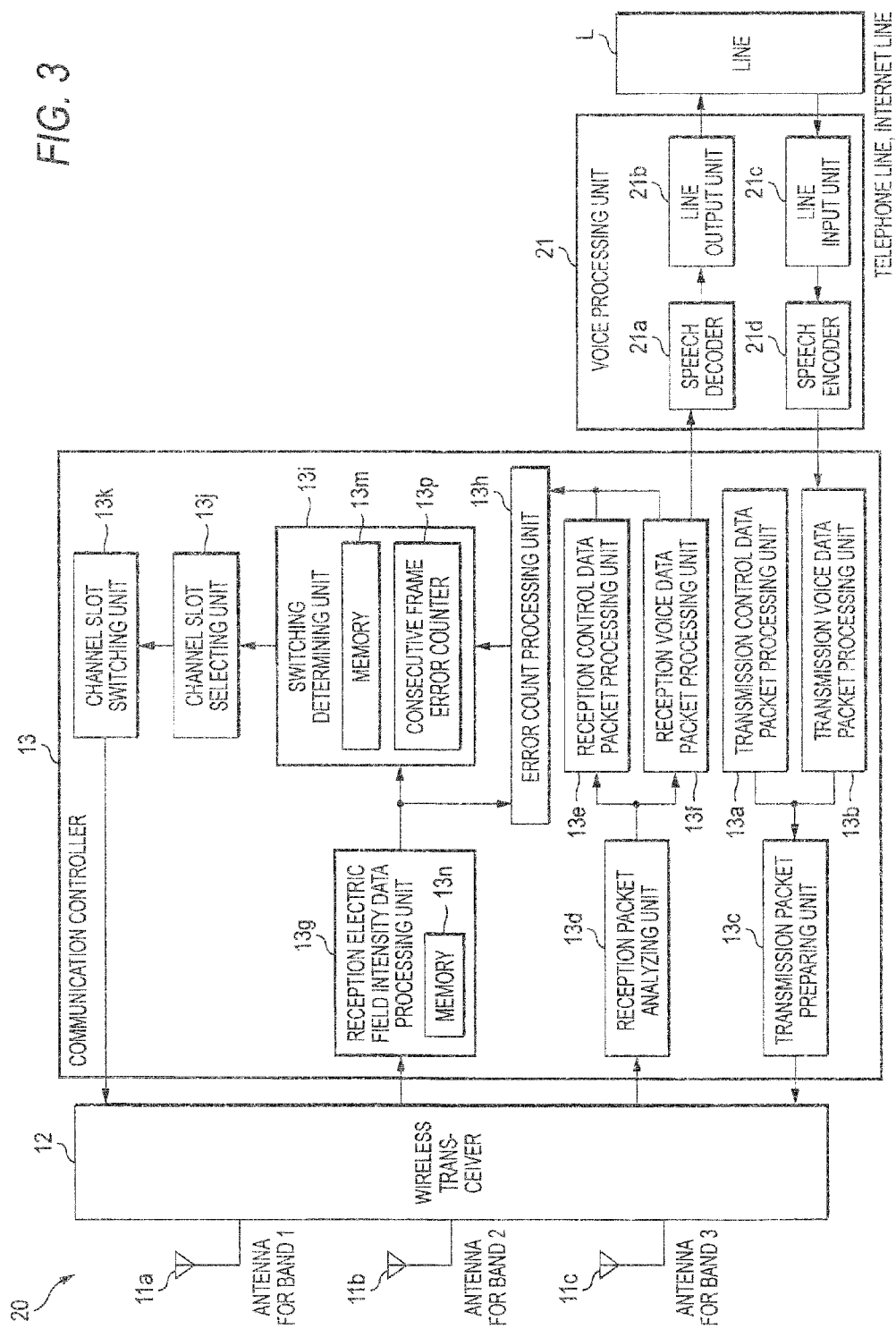
FIG. 3 is a block diagram showing a configuration of a master apparatus of the cordless telephone system shown in FIG. 1.
Figure 4:
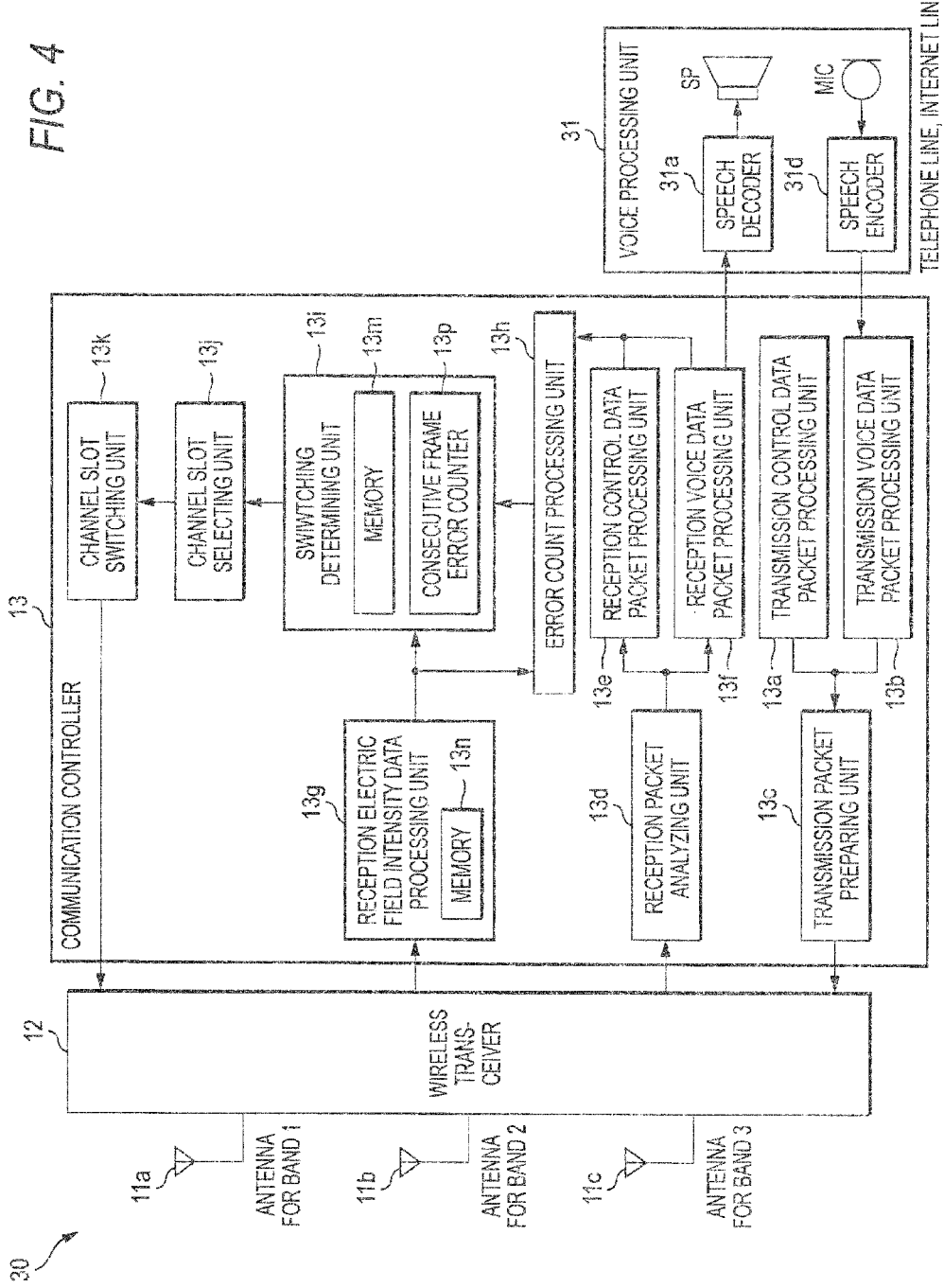
FIG. 4 is a block diagram showing a configuration of a slave apparatus of the cordless telephone system shown in FIG. 1.

Next, a configuration of the master apparatus 20 and slave apparatuses 30 will be described in detail with reference to FIGS. 3 and 4. FIG. 3 is a block diagram showing a configuration of the master apparatus of the cordless telephone system shown in FIG. 1. FIG. 4 is a block diagram showing a configuration of the slave apparatus of the cordless telephone system shown in FIG. 1.

In FIG. 3, the master apparatus 20 includes antennas 11a to 11c for bands 1 to 3, a wireless transceiver 12, a communication controller 13 and a voice processing unit 21.

The antennas 11a to 11c for bands 1 to 3 are antennas having a characteristic suitable for transmission reception of electric waves of respective frequency bands. For wireless communication with the slave apparatus 30, the wireless transceiver 12 selectively switches one frequency band of bands 1 to 3 and conducts wireless communication with the slave apparatus 30.

The communication controller 13 is a controller to direct a channel or slot used in wireless communication with the slave apparatus 30 to the wireless transceiver 12. The communication controller 13 switches one channel to another channel as well as for slot. Hereinafter, a two-dimensional matrix consisting of channels on a frequency axis and slots on a time axis is called "channel/slot." Reception electric field intensity is measured for each channel/slot and is recorded as shown in FIG. 8. The communication controller 13 selects an optimal frequency band according to a determination process to be described later, and instructs the wireless transceiver 12 to switch to a channel and a slot selected from the selected frequency band.

The communication controller 13 includes a transmission control data packet processing unit 13a, a transmission voice data packet processing unit 13b, a transmission packet preparing unit 13c, a reception packet analyzing unit 13d, a reception control data packet processing unit 13e and a reception voice data packet processing unit 13f. In addition, the communication controller 13 includes a reception electric field intensity data processing unit 13g, an error count processing unit 13h, a switching determining unit 13i, a channel/slot selecting unit 13j and a channel/slot switching unit 13k.

The transmission control data packet processing unit 13a adds CRC which is an error detection code generated for communication control data. The transmission voice data packet processing unit 13b adds CRC generated for voice data.

The transmission packet preparing unit 13c combines communication control data generated in the transmission control data packet processing unit 13a and the voice data generated in the transmission voice data packet processing unit 13b to generate packets to be transmitted by the wireless transceiver 12.

The reception packet analyzing unit 13d analyzes the packets received through the wireless transceiver 12 and separates the received packets into the control data and the voice data.

The reception control data packet processing unit 13e processes the communication control data and detects a reception error by the CRC added for the communication control data. The reception voice data packet processing unit 13f processes the voice data and detects a reception error by the CRC added for the voice data.

The reception electric field intensity data processing unit 13g measures electric field intensity of each channel in each frequency band and stores it as reception electric field intensity data in a memory 13n. In addition, the reception electric field intensity data processing unit 13g has a function of determining whether or not slots are good based on the stored electric field intensity and totaling the number of good slots to set slot priority. The error count processing unit 13h counts up an error counter when a reception error occurs.

The switching determining unit 13i determines whether or not there is a need to switch to a different slot of the same channel under current communication or another slot of a different channel. Upon determining that there is a need of switching due to frequent occurrence of reception errors, the switching determining unit 13i sets an interference detection flag indicating that interference is detected or a badness detection flag indicating that a reception condition is bad, depending on the content of the determination. The interference detection flag and the badness detection flag are stored in a memory 13m within the switching determining unit 13i. In addition, the switching determining unit 13i includes a consecutive frame error counter 13p to be counted up if an error consecutively occurs in a plurality of frames. The consecutive frame error counter 13p is managed for each slot.

If the switching determining unit 13i determines that there is a need of switching, the channel/slot selecting unit 13j selects a slot of a channel of a switching destination as "channel/slot" based on the reception electric field intensity data measured by the reception electric field intensity data processing unit 13g.

The channel/slot switching unit 13k instructs the wireless transceiver 12 to switch a channel/slot based on the selected channel/slot.

The voice processing unit 21 decodes the voice data from the communication controller 13 by means of a speech decoder 21a and outputs the decoded voice data to the telephone line L through a line output unit 21b, or codes a signal input from the telephone line L through a line input unit 21c into voice data by means of a speech encoder 21d and outputs the voice data to the communication controller 13.

It has been illustrated in this embodiment that the master apparatus 20 is the cordless telephone system 10 connected to the telephone line L, and alternatively, the master apparatus 20 may be an IP telephone connected to Internet.

Next, the slave apparatus 30 will be described. While a voice input output unit for the master apparatus 20 shown in FIG. 3 is the telephone line L, a voice input output unit for the slave apparatus 30 is a speaker SP and a microphone MIC. The slave apparatus 30 has substantially the same configuration for TDMA communication as the master apparatus 20 shown in FIG. 3 except for the voice input output unit, and so components having the same function as the master apparatus 20 are denoted by the same reference numerals and explanation thereof in the slave apparatus 30 will be omitted. If the master apparatus 20 conducts TDMA communication with the slave apparatus 30, they have a master slave relation, that is, the master apparatus 20 act as a master and the slave apparatus 30 acts as a slave.

In FIG. 4, the slave apparatus 30 includes antennas 11a to 11c for bands 1 to 3, a wireless transceiver 12, a communication controller 13 and a voice processing unit 31. The voice processing unit 31 decodes voice data from the communication controller 13 by means of a speech decoder 31a and outputs the decoded voice data to the speaker SP, or codes a signal input through the microphone MIC into voice data by means of a speech encoder 31b and outputs the voice data to the communication controller 13.

Operation of the above-configured cordless telephone system according to the embodiment of the present invention will be described with reference to FIGS. 5 to 19.

Figure 5:
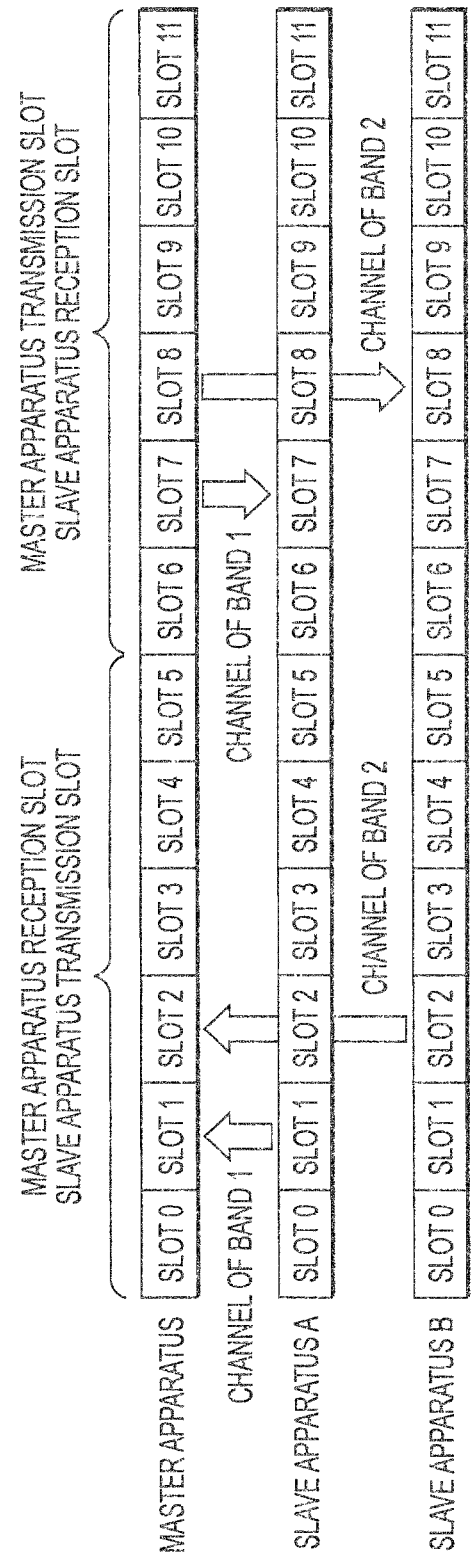
FIG. 5 shows a frame structure.
Figure 6:
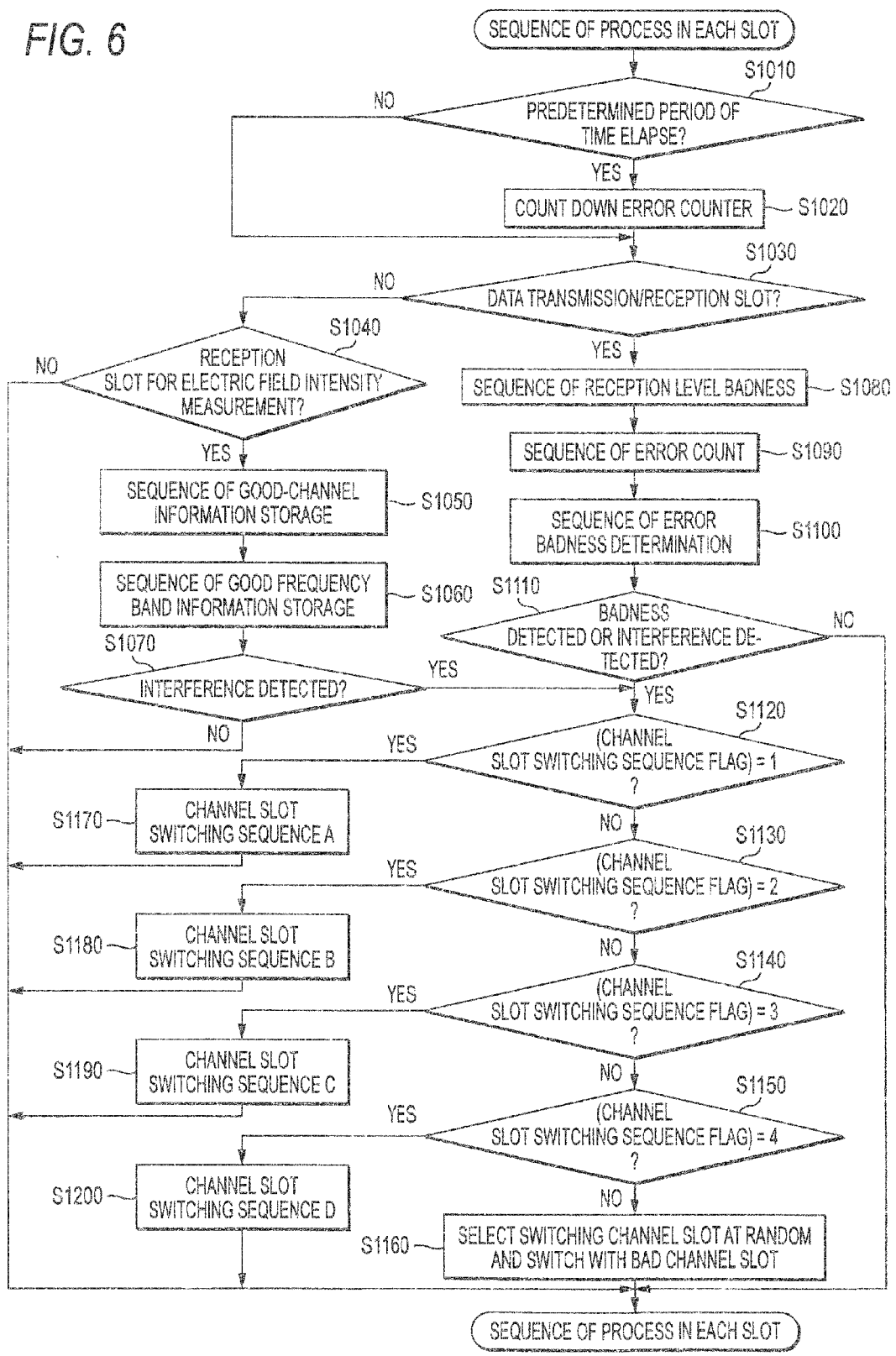
FIG. 6 is a flow chart showing a sequence of process of each slot.

FIG. 5 shows a frame structure. FIG. 6 is a flow chart showing a sequence of process of each slot. In a frame structure with which the master apparatus 20 communicates with the slave apparatuses 30(A to C) as shown in FIG. 5, one frame consists of twelve slots, the first half six slots being used as master apparatus reception slots (or slave apparatus transmission slots) and the second half six slots being used as master apparatus transmission slots (or slave apparatus reception slots). Any slave apparatus 30 exchanges packets with the master apparatus 20 one time in one frame.

A control operation is performed for each reception slot of these slots in the master apparatus 20 and the slave apparatus 30, as shown in FIG. 6. Hereinafter, a control for electric field intensity measurement in the master apparatus 20 will be described.

In FIG. 6, first, at S1010, the error count processing unit 13h determines whether or not a predetermined period of time elapses. The predetermined period of time is a period of time longer than a time interval during which a background scan makes a round of the entire slot of the entire channel of the entire frequency band. If it is determined at S1010 that the predetermined period of time elapses, at S1020, the error count processing unit 13h counts down an error counter of a slot of a corresponding channel. Details of the process in which the error count processing unit 13h counts down the error counter when the predetermined period of time elapses will be described later.

Next, at S1030, the communication controller 13 determines whether or not the slot at that time is a reception slot for data communication. That is, in case of the master apparatus 20, it is determined whether or not the slot at that time is a slot 0 to 5 shown in FIG. 5. If it is determined at S1030 that the slot at that time is not a reception slot for data communication, the process proceeds to S1040.

At S1040, the reception electric field intensity data processing unit 13g determines whether or not the slot at that time is a reception slot for electric field intensity measurement. If it is determined that the slot at that time is not a reception slot for electric field intensity measurement, the process is ended. If it is determined at S1040 that the slot at that time is a reception slot for electric field intensity measurement, at S1050, the reception electric field intensity data processing unit 13g executes a sequence of good channel information storage.

Figure 7:
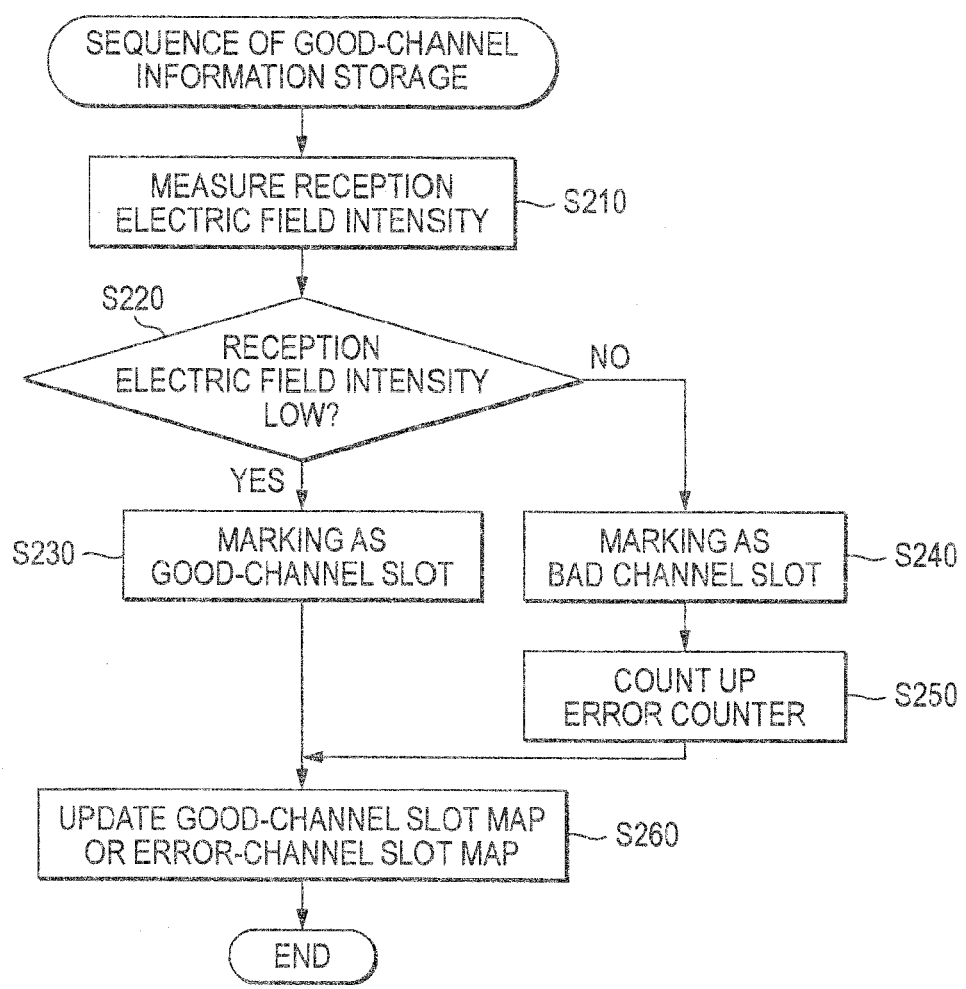
FIG. 7 is a flow chart showing a sequence of good channel information storage.

Here, the sequence of good channel information storage will be described with reference to FIGS. 7 to 10. FIG. 7 is a flow chart showing a sequence of good channel information storage by a background scan, FIG. 8 shows a channel/slot reception electric field intensity map, FIG. 9 shows a good channel/slot map, and FIG. 10 shows an error channel/slot map.

In the sequence of good channel information storage, reception electric field intensity of a predetermined slot is first measured at S210, as shown in FIG. 7. This measurement is made when the reception electric field intensity data processing unit 13g instructs the wireless transceiver 12 to do so. A result of the measurement is stored, as a channel/slot reception electric field intensity map shown in FIG. 8, in a memory 13n of the reception electric field intensity data processing unit 13g.

This channel/slot reception electric field intensity map is a table storing the measured electric field intensity as reception electric field intensity data for each slot in association with a channel number allocated for each frequency band. The electric field intensity measured at S210 is stored in a corresponding location in the channel/slot reception electric field intensity map.

The example of FIG. 8 shows a result after all channel/slots for respective frequency bands are subjected to a background scan, and electric field intensities are stored in respective locations of the channel/slot reception electric field intensity map.

At S220, the reception electric field intensity data processing unit 13g determines whether or not the measured electric field intensity is lower than a predetermined value. If it is determined that the measured electric field intensity is lower than a predetermined value, it may mean that there is no or little interference electric wave. Then, at S230, a marking is made which indicates that corresponding channel/slots are very good.

The marking indicating the goodness at S230 is stored as a good channel/slot map shown in FIG. 9. In other words, if the electric field intensity of each slot of a channel number of a corresponding frequency band is less than a predetermined threshold, it is stored as good, and otherwise, if the electric field intensity is equal to or more than the predetermined threshold, it is stored as bad. The threshold may be determined in a suitable manner.

If it is determined at S220 of FIG. 7 that the measured electric field intensity is equal to or more than the predetermined value, it may mean that an interference electric wave is detected in a slot of the measured channel. Then, at S240, a marking is made which indicates that corresponding channel/slots are bad.

At S250 of FIG. 7, the reception electric field intensity data processing unit 13g counts up the error counter. This error counter is counted up based on the determination at S220 that the measured electric field intensity is equal to or more than the predetermined value, and the count-up is stored, as an error channel/slot map shown in FIG. 10, in the memory 13n of the reception electric field intensity data processing unit 13g. That is, in addition to a CRC error occurring in wireless communication, if an interference electric wave is detected in electric field intensity measurement for interference electric waves, the error counter is counted up as an error. In this manner, the good channel/slot map or the error channel/slot map is updated (S260).

Figure 11:
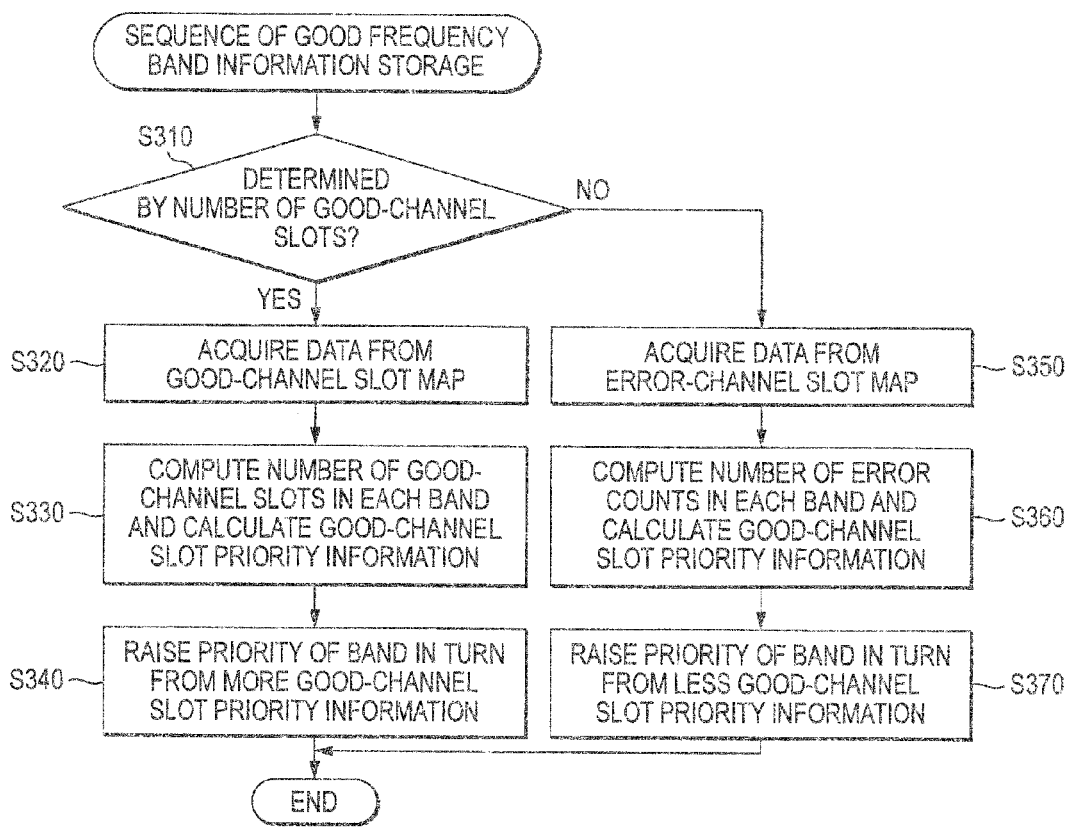
FIG. 11 is a flow chart showing a sequence of good frequency band information storage.

When the sequence of good channel information storage is ended, a sequence of good frequency band information storage is executed at S1060 of FIG. 6. Here, the sequence of good frequency band information storage at S1060 will be described with reference to FIG. 11. FIG. 11 is a flow chart showing a sequence of good frequency band information storage.

In the sequence of good frequency band information storage shown in FIG. 11, first, at S310, the reception electric field intensity data processing unit 13g determines whether or not there is a setting that a degree of goodness of each frequency band is determined based on the total number of good channel/slots for each frequency band. If it is determined that there is a setting that the determination is made based on the total number of good channel/slots, the process proceeds to S320.

At S320, the reception electric field intensity data processing unit 13g acquires data from the good channel/slot map. At S330, the reception electric field intensity data processing unit 13g sums up the number of markings indicating goodness for each frequency band based on data from the good channel/slot map, and calculates good channel/slot priority information based on a result of the summing up.

At S340, the reception electric field intensity data processing unit 13g sets frequency band priority based on the calculated good channel/slot priority information in such a manner that the frequency band priority becomes higher in an order of increasing in the total number of good channel/slots. A band with higher priority information is more preferentially used. In the example of FIG. 9, the good channel/slot priority information is 20 in band 1, 30 in band 2 and 25 in band 3. Here, band 2 has high priority since it is the largest in the total number of good channel/slots, and band 1 has low priority since it is the smallest in the total number of good channel/slots.

In addition, in the examples of FIGS. 8 and 9, the channel/slot reception electric field intensity map or the good channel/slot map are to measure electric field intensity with each of channels of bands 1 to 3 as the minimal unit on a frequency axis and with each slot of TDMA as the minimal unit on a time axis and mark goodness badness on a two-dimension. In this manner, by marking the goodness/badness for different slots, it is possible to detect situations of interference electric waves from the surroundings more closely and determine channel conditions of a switching destination precisely.

On the other hand, at S310, if it is determined that there is a setting that the determination is not made based on the total number of good channel/slots, the process proceeds to S350.

At S350, the reception electric field intensity data processing unit 13g acquires data from the error channel/slot map. At S360, it performs a totaling operation for each frequency band based on each error counter of the error channel/slot map and calculates good channel/slot priority information by the error counter. In the example of FIG. 10, priority is 14 in band 1, 3 in band 2 and 9 in band 3.

At S370, the reception electric field intensity data processing unit 13g sets frequency band priority based on the calculated good channel/slot priority information in such a manner that the frequency band priority becomes higher in an order of decreasing in the total number of good channel/slots. In other words, in the example of FIG. 10, band 1 has low priority since it is the largest in the total number of good channel/slots, and band 2 has high priority since it is the smallest in the total number of good channel/slots.

In this manner, when priority is set for each frequency band in the sequence of good frequency band information storage, at S1070 of FIG. 6, the reception electric field intensity data processing unit 13g determines whether or not an interference electric wave is detected. If the reception electric field intensity measured at S210 of FIG. 7 is more than the predetermined value, it is determined that an interference electric wave is detected. If it is determined at S1070 that an interference electric wave is not detected, the process is ended.

Figure 12:
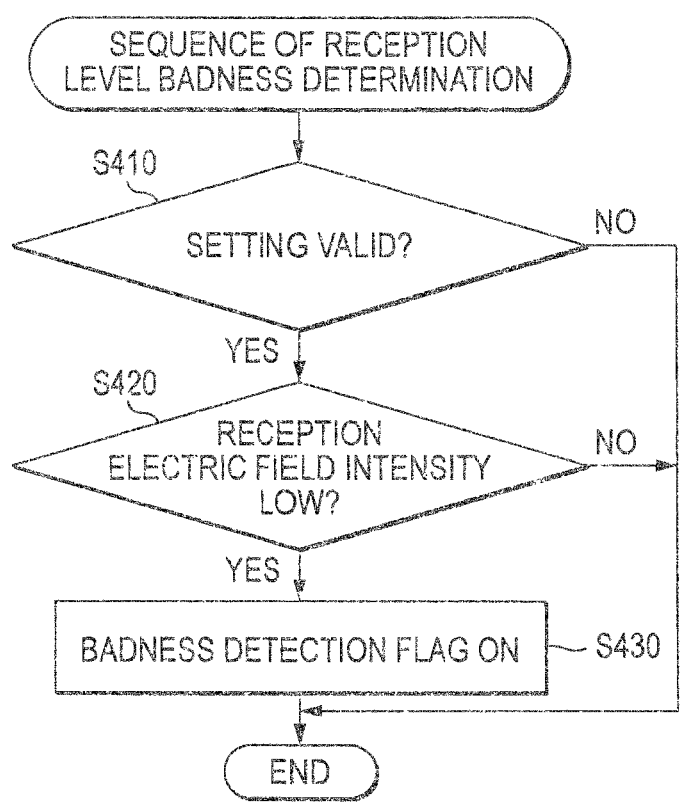
FIG. 12 is a flow chart showing a sequence of reception level badness determination.

In case of the master apparatus 20, if it is determined at S1030 that slots used are reception slots under data communication, which are slots 1 and 2 shown in FIG. 5, at S1080, the switching determining unit 13i executes a sequence of reception level badness determination. Here, the sequence of reception level badness determination will be described with reference to FIG. 12. FIG. 12 is a flow chart showing a sequence of reception level badness determination.

In the sequence of reception level badness determination, first, at S410, it is determined whether or not a setting indicating that a determination is made based on a reception level is valid. If it is determined at S410 that the setting is invalid, since it means that a process according to the sequence of reception level badness determination is not performed, this process is ended.

If it is determined at S410 that the setting is valid, at S420, it is determined whether or not electric field intensity of the reception slots for data communication is less than a predetermined value. This reception electric field intensity is input to the switching determining unit 13i through the reception electric field intensity data processing unit 13g.

If it is determined at S420 that the electric field intensity is less than the predetermined value, since it may mean that the master apparatus 20 is separated from the slave apparatus 30, a badness detection flag is effectively set at S430, and then the process is ended.

In this manner, when the sequence of reception level badness determination is ended, a sequence of error count is executed at S1090 of FIG. 6.

Figure 13:
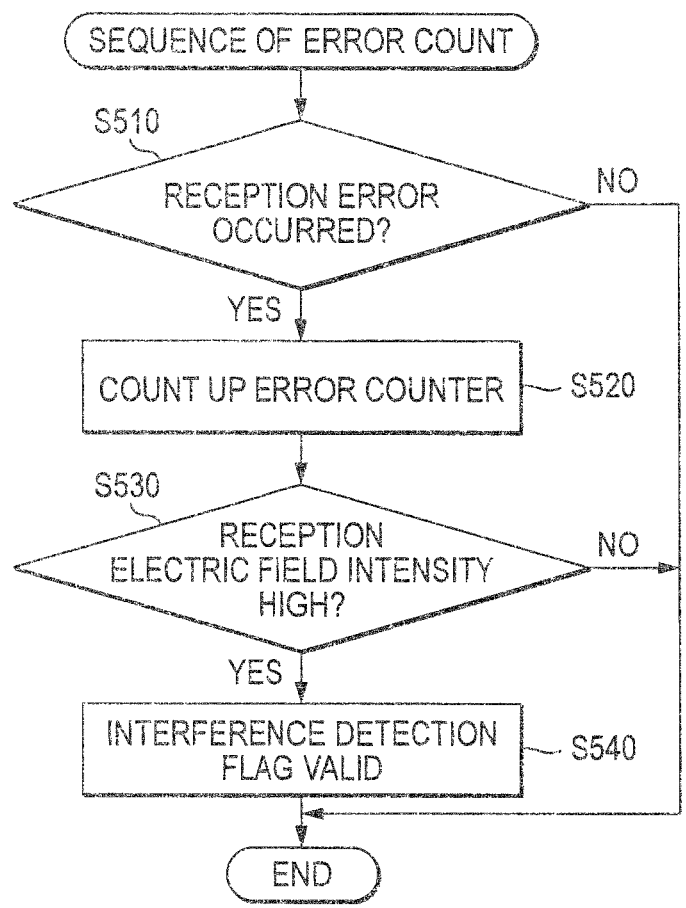
FIG. 13 is a flow chart showing a sequence of error count.
Figure 14:
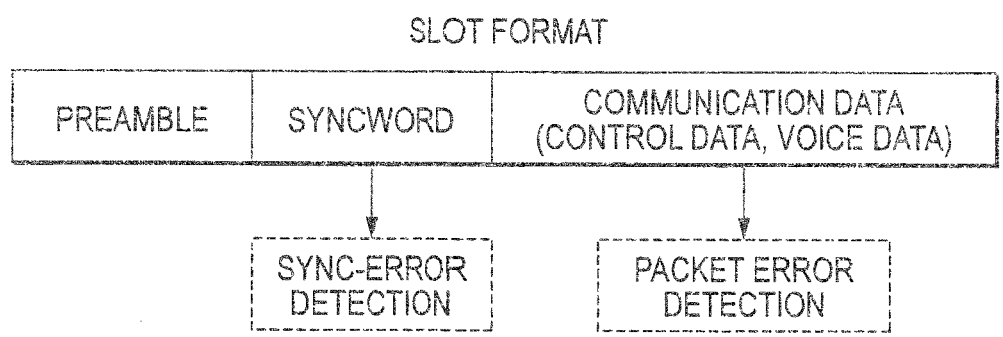
FIG. 14 shows a slot format.

Next, the sequence of error count will be described with reference to FIGS. 13 and 14. FIG. 13 is a flow chart showing a sequence of error count, and FIG. 14 shows a slot format.

In the sequence of error count shown in FIG. 13, first, at S510, the error count processing unit 13h determines whether or not a received slot generates a reception error. Upon receiving data packets, the reception control data packet processing unit 13e processes data for communication control and detects a reception error by CRC added for the data for communication control. In addition, the reception voice data packet processing unit 13f processes voice data and detects a reception error by CRC added for the voice data. That is, as shown in FIG. 14, it is determined whether or not the reception error is occurred, based on a determination on whether or not a synchronization error of a syncword in a slot format was present or a determination on whether or not information indicating that a CRC error (packet error) is detected in communication data is sent from the reception control data packet processing unit 13e or the reception voice data packet processing unit 13f.

If it is determined at S510 that the reception error is not generated, the process is ended. If it is determined at S510 that the reception error is generated, at S520, a corresponding error counter of the error channel/slot map shown in FIG. 10 is counted up. For example, if a channel/slot in which a reception error is generated is channel number 3 and slot 1 of band 1, it becomes slot 2 by incrementing the error counter by +1. If a channel/slot is currently slot 2, it becomes slot 3 by incrementing the error counter by +1.

In this manner, as each error counter of the error channel/slot map is counted up when the reception error or the like is generated, priority allocated for each frequency band is lowered in the sequence of good frequency band information storage (see FIG. 11). Once priority is lowered, it remains in the lowered state for a while, and thus the error counter is not counted down at once even when no reception error is present in the next slot. The priority is affected by the past state of occurrence of the reception error.

The error counter is counted down in all channel/slots whenever a predetermined period of time elapses. That is, if a predetermined period of time elapses at S1010 of FIG. 6, error counters of all channel/slots are counted down at S1020. In this manner, by automatically counting down the error counter during some period of time, the priority can be returned according to change of surrounding circumstances such as disappearance of an effect by interference electric waves.

At S530 of FIG. 13, the switching determining unit 13i determines whether or not electric field intensity of a reception slot for data communication is more than a predetermined value. If electric field intensity of when a reception error is detected is relatively high, the reception error is very likely to be caused by an interference electric wave. If an reception error is detected although electric field intensity is high as the master apparatus 20 is close to the slave apparatus 30, it may be determined that the reception error is caused by the interference electric wave. Accordingly, in that interference is detected at S530 if the reception electric field intensity is more than the predetermined value, at S540, the switching determining unit 13i determines an interference detection flag as valid and ends the process. If it is determined at S530 that the reception electric field intensity is less than the predetermined value, the process is ended.

In this manner, when the sequence of error count process is ended, at S1100 of FIG. 6, a sequence of error badness determination is executed.

Figure 15:
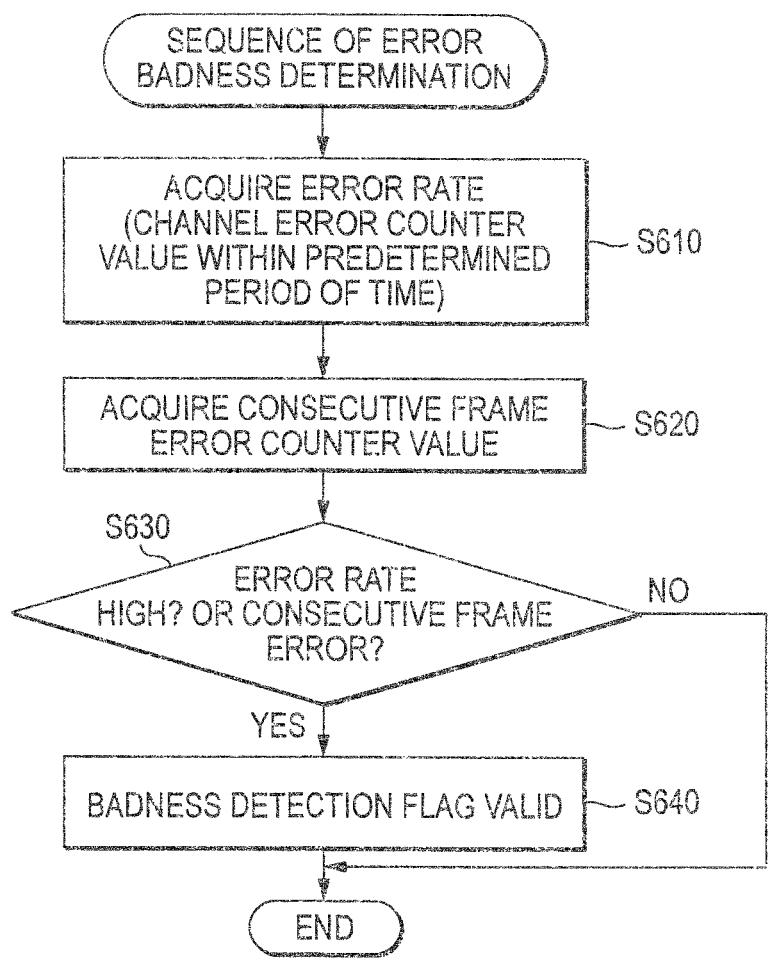
FIG. 15 is a flow chart showing a sequence of bad channel/slot determination.
Figure 16:
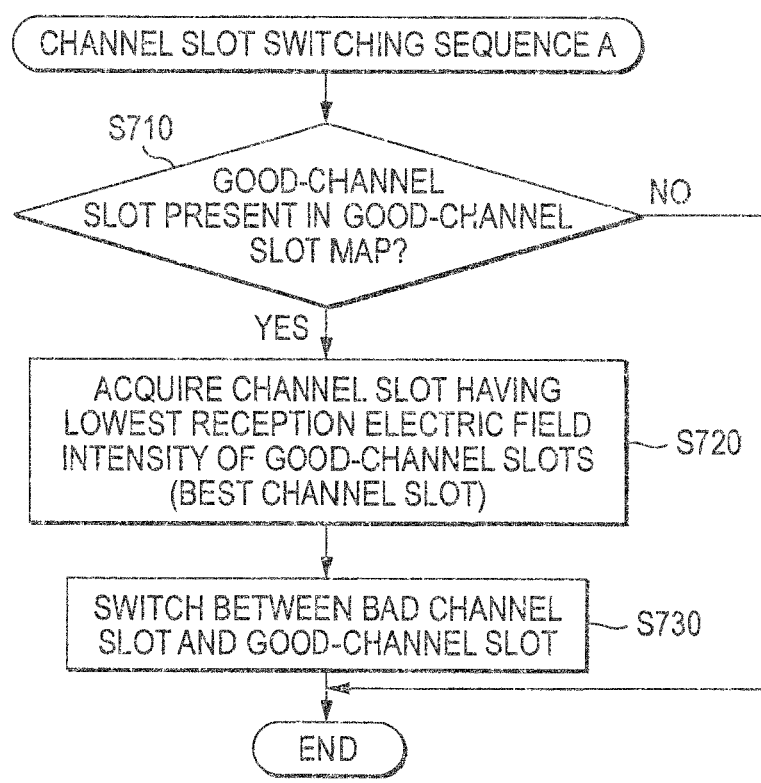
FIG. 16 is a flow chart showing a channel/slot switching sequence A.
Figure 17:
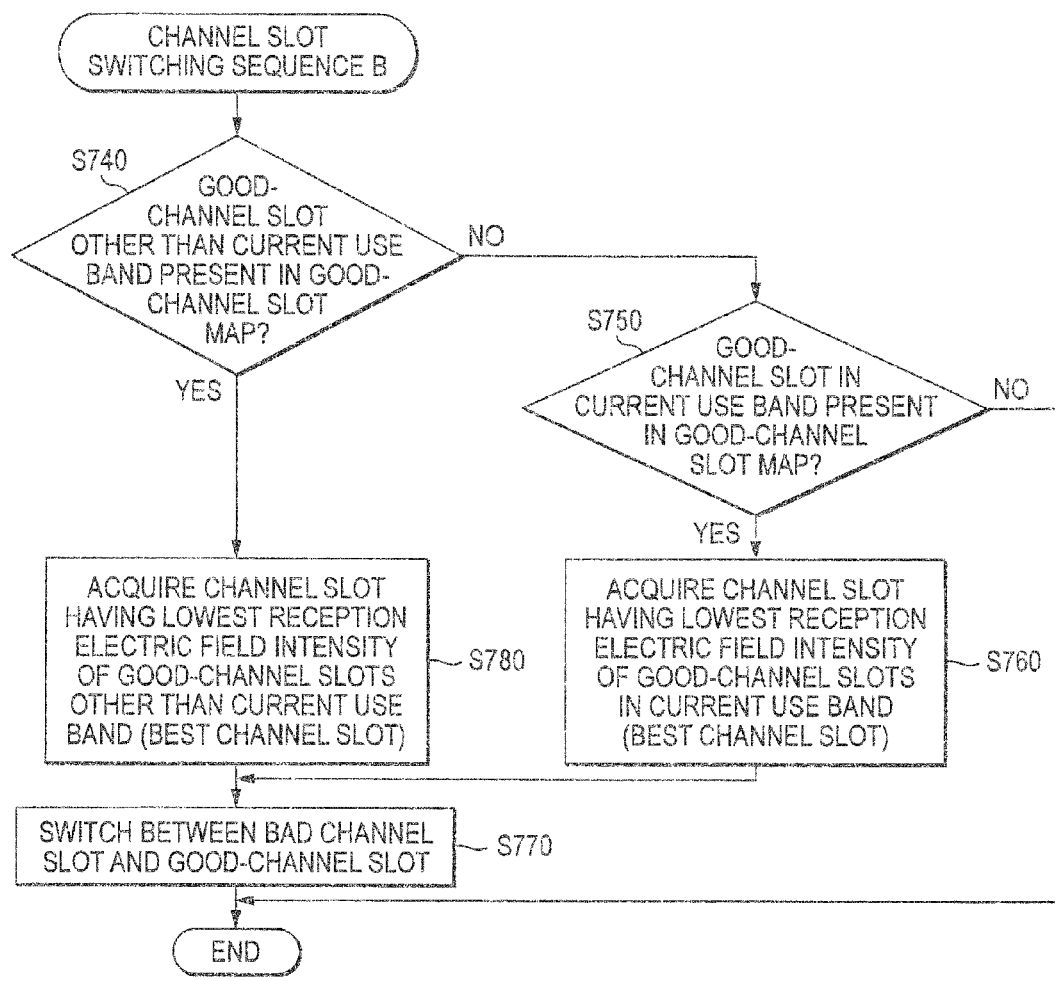
FIG. 17 is a flow chart showing a channel/slot switching sequence B.

Next, the sequence of error badness determination will be described with reference to FIGS. 15 to 19. FIG. 15 is a flow chart showing a sequence of error badness determination, and FIGS. 16 to 19 are flow charts showing sequences A to D of channel/slot switching. In the sequence of error badness determination, bad channel/slots are determined based on an error rate.

In FIG. 15, first, at S610, the switching determining unit 13i acquires an error rate. The error rate will be calculated by the reception electric field intensity data processing unit 13g based on a value of each error counter of the error channel/slot map within a predetermined period of time. That is, the error rate is managed every slot.

Next, at S620, the switching determining unit 13i acquires a value of the consecutive frame error counter 13p. The consecutive frame error counter 13p provided in the switching determining unit 13i is managed every slot and is a counter continuing to count up when an error is consecutively generated in a plurality of frames. For example, when a reception error such as a CRC error or a synchronization error is generated in any slot, this counter counts up by information from the error count processing unit 13h.

For example, as shown in FIG. 5, if a transmission packet transmitted from the slave apparatus A using slot 1 is an reception error, the counter 13p counts up (+1). If a reception error is generated in the same slot of the next frame, the counter 13p additionally counts up. Once counting up (+1) with the reception error, if no reception error is generated in the next frame, the consecutive frame error counter 13p is cleared.

Next, at S630, the switching determining unit 13i determines whether or not an error rate is high or a value of the consecutive frame error counter 13p is a consecutive frame error exceeding a predetermined value. A high error rate means that the error rate calculated at S610 is equal to or more than a predetermined value and a reception error is frequently generated in slots of this channel. In addition, since the value of the consecutive frame error counter 13p acquired at S620 is counted up (+1) whenever a reception error is generated, for example, when a reception error is consecutively generated in five frames, the value of the consecutive frame error counter 13p becomes 5. Accordingly, if a reception error is generated in slots consecutive by five frames, the predetermined value is set to 4 with the reception error as the consecutive frame error.

If it is determined at S630 that the error rate is less than a predetermined value or the value of the consecutive frame error counter 13p is equal to or less than a predetermined value, the process is ended.

If it is determined at S630 that the error rate is high or the value of the consecutive frame error counter 13p exceeds the predetermined value, since it means that corresponding channel/slots are bad, at S640, a badness detection flag is made valid, and then the process is ended.

In this manner, when the sequence of error badness determination is ended, at S1110 of FIG. 6, the channel/slot selecting unit 13j determines whether or not a badness detection flag or an interference detection flag is valid. If both flags are invalid, the process is ended.

Hereinafter, a case where the badness detection flag or the interference detection flag is valid will be described. If it is determined at S1110 of FIG. 6 that one of the badness detection flag and the interference detection flag is valid, switching of channel/slot is performed. This embodiment provides five methods for selection of channel and slot of a switching destination, any one of which may be selected depending on a setting (a channel/slot switching sequence flag).

First, at S1120, it is determined whether or not the channel/slot switching sequence flag is 1. At S1130, it is determined whether or not the channel/slot switching sequence flag is 2. At S1140, it is determined whether or not the channel/slot switching sequence flag is 3. At S1150, it is determined whether or not the channel/slot switching sequence flag is 4. If the channel/slot switching sequence flag is none of 1 to 4, the process proceeds to S1160.

First, if it is determined at S1120 that the channel/slot switching sequence flag is 1, at S1170, a channel/slot switching sequence A is executed. In the channel/slot switching sequence A, at S710 of FIG. 16, the channel/slot selecting unit 13j determines whether or not a good channel/slot is present in the good channel/slot map (see FIG. 9). If it is determined that no good channel/slot is present in the good channel/slot map, since it means that a channel of a switching destination can not be selected, the process is ended.

If it is determined at S710 that a good channel/slot is present, at S720, a channel/slot having the lowest reception electric field intensity in the channel/slot reception electric field intensity map (see FIG. 8) is acquired. In the example of FIG. 8, slot 1 of channel number 8 of band 2 of −90 dBm corresponds to this channel/slot. This channel/slot is taken as the best channel/slot.

Upon receiving the best channel/slot, at S730, the channel/slot switching unit 13k instructs the wireless transceiver 12 to switch between the best channel/slot as a channel/slot of a switching destination and the slots detected as bad channel/slots (slots set at S430, S540 and S640). In such a channel/slot switching sequence A, a bad channel/slot is switched to the channel/slot having the lowest reception electric field intensity.

In this manner, even in case where an interference electric wave as a noise interferes with the same channel or interferes with all channels of the same frequency band, good communication can be maintained by switching to a different channel/slot of the same or different frequency band based on the channel/slot reception electric field intensity map. In addition, in this embodiment, by switching in unit of slot, not in the unit of channel, many candidates of the switching destination can be secured even when the number of channels allocated in a frequency band is small, thereby allowing a proper switching destination to be selected.

Next, a case where the channel/slot switching sequence flag is 2 will be described. If it is determined at S1130 of FIG. 6 that the channel/slot switching sequence flag is 2, at S1180, a channel/slot switching sequence B is executed. In the channel/slot switching sequence B, at S740 of FIG. 17, the channel/slot selecting unit 13j determines whether or not a good channel/slot is present in the good channel/slot map (see FIG. 9) in a frequency band other than the frequency band being currently used (hereinafter referred to as "use band").

If it is determined that no good channel/slot is present in a frequency band other than the current use band, it is determined at S750 whether or not a good channel/slot is present in the same frequency band as the current use band in the good channel/slot map.

If it is determined at S750 that no good channel/slot is present in the same frequency band as the current use band, since it means that a channel of a switching destination can not be selected, the process is ended. If it is determined at S750 that a good channel/slot is present, at S760, a channel/slot having the lowest reception electric field intensity in the current use band is acquired as the best channel/slot from the channel/slot reception electric field intensity map (see FIG. 8). Upon receiving the best channel/slot, at S770, the channel/slot switching unit 13k instructs the wireless transceiver 12 to switch between the best channel/slot as a channel/slot of a switching destination and the slots detected as bad channel/slots.

In this manner, even when a bad channel/slot can not be switched to a different frequency band, by switching to a different channel or slot of the same frequency band, the probability of avoiding an interference electric wave can be increased.

If it is determined at S740 that a good channel/slot is present in a frequency band other than the current use band, at S780, a channel/slot having the lowest reception electric field intensity of good channel/slots other than the current use band is acquired from the channel/slot reception electric field intensity map. If the best channel/slot in a different band can be acquired, at S770, the best channel/slot as a channel/slot of a switching destination is switched with the slots detected as bad channel/slots.

In this manner, in the channel/slot switching sequence B, by first determining at S740 whether or not a good channel/slot is present in a frequency band different from the use band, the frequency band different from the use band can be preferentially set as a channel/slot of a switching destination, thereby avoiding an interference electric wave interfering in the entire use band. Accordingly, it is possible to reliably maintain good communication.

Next, a case where the channel/slot switching sequence flag is 3 will be described. If it is determined at S1140 of FIG. 6 that the channel/slot switching sequence flag is 3, at S1190, the channel/slot switching sequence C is executed. In the channel/slot switching sequence C, at S780 of FIG. 18, the channel/slot selecting unit 13j determines whether or not a good channel/slot is present in the good channel/slot map (see FIG. 9). If it is determined that no good channel/slot is present in the good channel/slot map, since it means that a channel of a switching destination can not be selected, the process is ended.

If it is determined at S780 that a good channel/slot is present, at S790, good channel/slot priority information being calculated for each band is acquired as shown in FIG. 9. Next, at S800, a channel having the lowest reception electric field intensity of good channel/slots of a frequency band set to have high priority from the acquired good channel/slot priority information is acquired as the best channel/slot from the channel/slot reception electric field intensity map (see FIG. 8).

The priority in this case may be an order set by one of good channel/slot priority information calculated based on a marking indicating goodness from the good channel/slot map or good channel/slot priority information calculated based on an error counter from the good channel/slot map.

Upon receiving the best channel/slot, at S810, the channel/slot switching unit 13k instructs the wireless transceiver 12 to switch between the best channel/slot as a channel/slot of a switching destination and the slots detected as bad channel/slots.

In this manner, if conditions of different channels or slots in the same frequency band are not good overall although a switching destination is a good channel/slot, communication may be affected by an interference electric wave. Accordingly, by selecting channels of the switching destination in order from a frequency band having more channels with higher goodness, it is possible to select a frequency band allowing stable communication to continue.

In particular, with priority by the good channel/slot priority information calculated based on a marking indicating goodness, since a degree of goodness can be determined based on the measured reception electric field intensity, it is possible to select a frequency band insignificantly affected by an interference electric wave at the current point of time.

In addition, with priority by the good channel/slot priority information calculated based on an error counter, since a degree of goodness can be determined based on small sum-up of the error counter, it is possible to select a frequency band insignificantly affected by an interference electric wave from a statistical point of view.

Next, a case where the channel/slot switching sequence flag is 4 will be described. If it is determined at S1150 of FIG. 6 that the channel/slot switching sequence flag is 4, at S1200, the channel/slot switching sequence D is executed.

Figure 18:
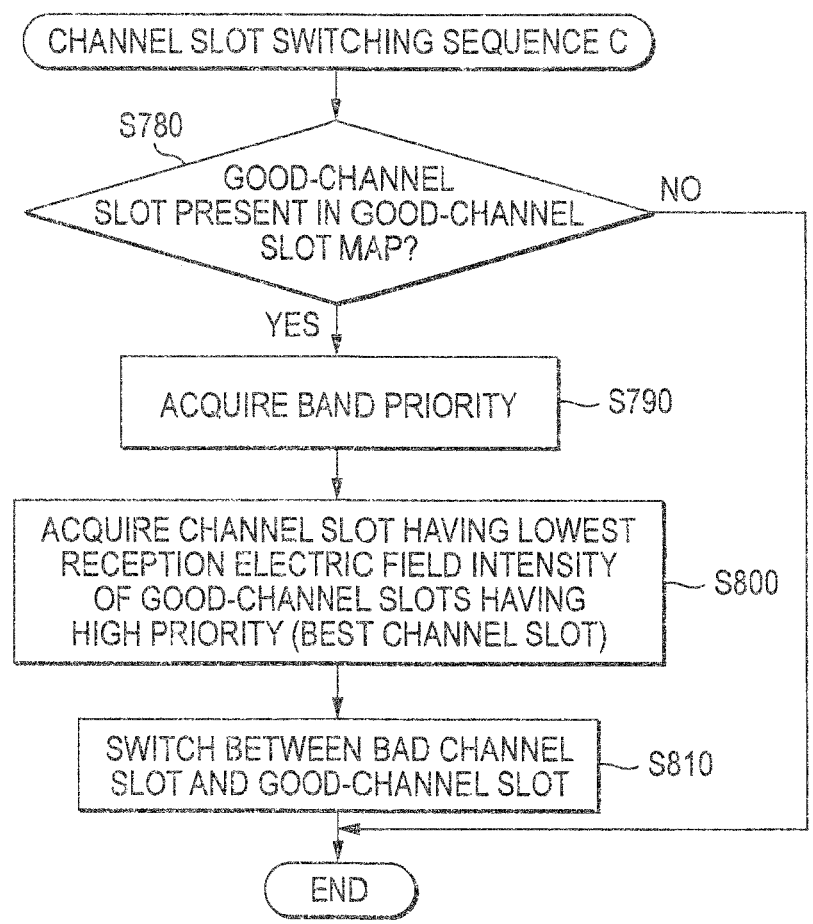
FIG. 18 is a flow chart showing a channel/slot switching sequence C.
Figure 19:
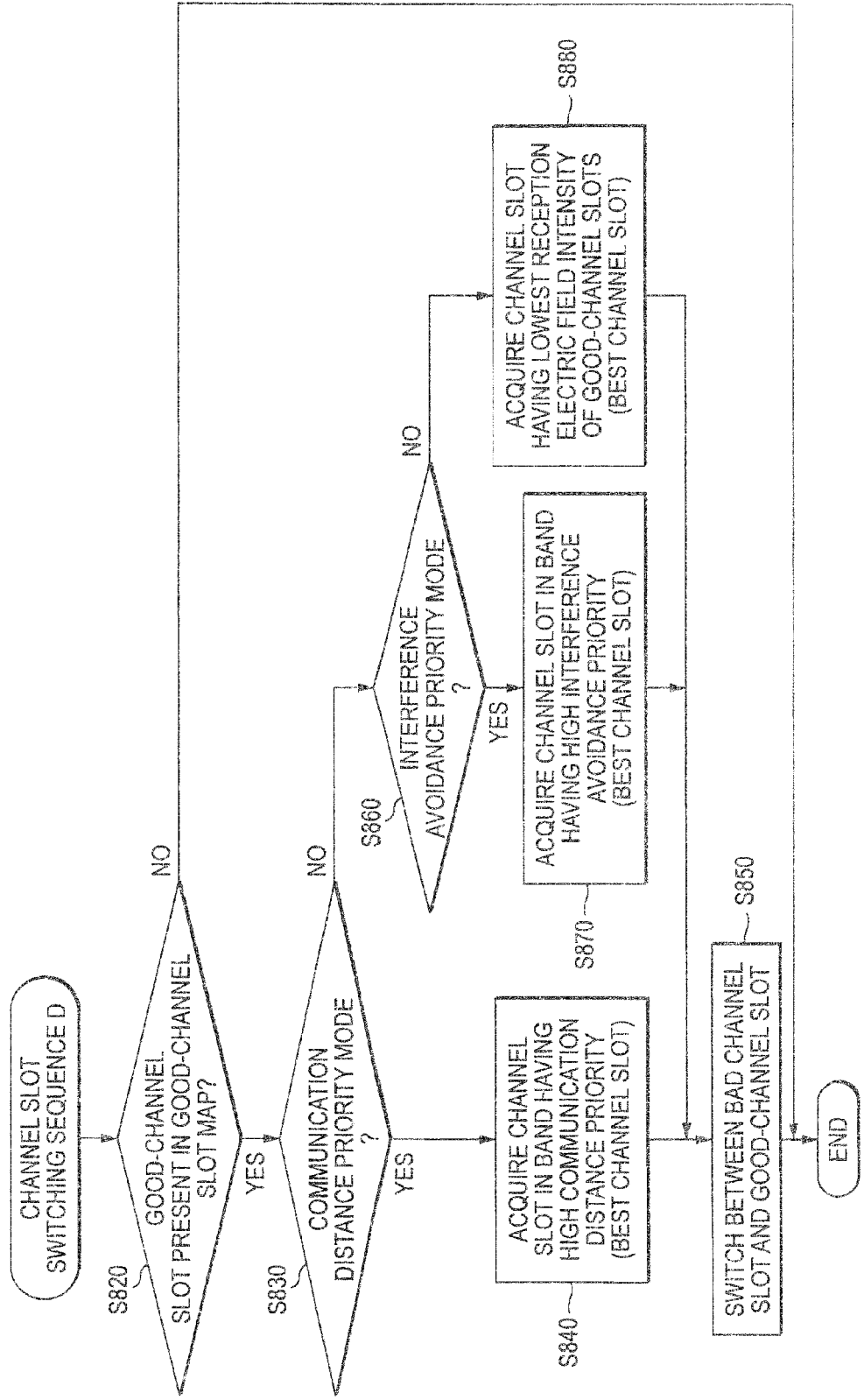
FIG. 19 is a flow chart showing a channel/slot switching sequence D.

In the channel/slot switching sequence D, at S820 of FIG. 18, the channel/slot selecting unit 13j determines whether or not a good channel/slot is present in the good channel/slot map (see FIG. 9). If it is determined that no good channel/slot is present in the good channel/slot map, since it means that a channel of a switching destination can not be selected, the process is ended.

If it is determined at S820 that a good channel/slot is present, it is determined at S830 whether or not a setting is a communication distance priority mode. If it is determined at S830 that a setting is a communication distance priority mode, at S840, a channel/slot having the lowest reception electric field intensity in a frequency band having high communication distance priority in the channel/slot reception electric field intensity map (see FIG. 8) is acquired as the best channel/slot.

In the first embodiment, as frequency bands (bands 1 to 3), three frequency bands, that is, a 1.9 GHz band, a 2.4 GHz band and a 5.8 GHz band, are used. Since one having a longer wavelength of these three frequency bands provides a relatively longer arrival distance at the same transmission power, if it is assumed that these frequency bands have the same transmission power, priority becomes higher in order of band 1, band 2 and band 3. Accordingly, if a bad channel/slot is detected in band 2 or band 3, a good channel/slot of band 1 is first selected.

Upon receiving the best channel/slot, at S850, the channel/slot switching unit 13k instructs the wireless transceiver 12 to switch between the best channel/slot as a channel/slot of a switching destination and the slots detected as bad channel/slots.

In this manner, as priority is set in order of long wavelength of frequency bands 1 to 3, a frequency band providing a long arrival distance of an electric wave can be preferentially allocated as a channel/slot of a switching destination. Accordingly, even when reception electric field intensity is lowered or an reception error frequently occurs as the master apparatus 20 becomes distant from the slave apparatus 30, it is possible to improve communication environments to some extents.

If it is determined at S830 that a setting is not a communication distance priority mode, it is determined at S860 whether or not a setting is an interference avoidance priority mode.

If is determined at S860 that a setting is an interference avoidance priority mode, at S870, a channel/slot having the lowest reception electric field intensity in a frequency band having high interference avoidance priority in the channel/slot reception electric field intensity map (see FIG. 8) is acquired as the best channel/slot.

There exist many sources of interference electric waves, such as a microwave oven, a Wi-Fi as a wireless LAN and the like, in the 2.4 GHz frequency band. In addition, the 1.9 GHz frequency band is significantly affected by an interference electric wave since only five channels are allocated in this band according to a communication standard. Accordingly, in this embodiment, priority becomes higher in order of band 3, band 1 and band 2. Accordingly, if a bad channel/slot is detected in band 2 or band 1, a good channel/slot of band 3 is first selected.

If the best channel/slot can be acquired, at S850, the acquired best channel/slot as a channel/slot of a switching destination is switched with the slots detected as bad channel/slots.

In this manner, since priority is set depending on the kind of electronic devices in which interference electric wave is occurred such as a microwave oven, Wi-Fi and the like, it is possible to select a good frequency band by avoiding an interference electric wave.

If is determined at S860 that a setting is not an interference avoidance priority mode, at S880, a channel/slot having the lowest reception electric field intensity is acquired as the best channel/slot from the channel/slot reception electric field intensity map (see FIG. 8).

If the best channel/slot can be acquired, at S850, by switching the acquired best channel/slot as a channel/slot of a switching destination with the slots detected as bad channel/slots, it is possible to maintain good communication by switching to a different channel/slot of the same frequency band or a channel/slot of a different frequency band.

Finally, a case where the channel/slot switching sequence flag is none of 1 to 4 and the process proceeds from S1150 of FIG. 6 to S1160 will be described.

At S1160, in particular, irrespective of whether or not a channel/slot of a switching destination is a good channel/slot, a channel/slot of a switching destination is randomly selected and switched. In this case, although there is a possibility that an effect by an interference electric wave is unavoidable, a control can be performed simply since there is no need to measure electric field intensity by a background scan.

In addition, for switching to a channel/slot of a switching destination, when a channel/slot being currently used is detected as a bad channel/slot, by using the channel/slot of the switching destination to conduct communication in two slots simultaneously and canceling communication in the bad channel/slot, it is possible to switch to a different channel/slot of the switching destination.

While the first embodiment has been illustrated in the above, the present invention is not limited to the first embodiment. For example, a switching destination may be set in the unit of channel instead of the unit of slot.

In addition, while the wireless communication apparatus has been illustrated with the cordless telephone system in the first embodiment, the same effect can be achieved even when the present invention is applied to time division-based communication between wireless communication apparatuses such as, for example, communication between mobile telephones and base stations.

In addition, since the communication distance of the frequency band 1 (1.9 GHz band) having a long wavelength at the same transmission power is the largest and a communication distance becomes smaller as a wavelength becomes shorter, priority is set in order of long wavelength in the frequency band 1 to 3 in this embodiment. However, if transmission power is different in the frequency bands, a relation between priority and a frequency band may be varied. Transmission power which can be set in each frequency band is specified according to national wireless standards and there is a need to set transmission power to be lower in one frequency band than in other frequency bands according to circumstances of every nation. In that case, since a communication distance can not be secured even with a long wavelength, priority of frequency bands is rated using both of wavelength and transmission power.

Second Embodiment

Figures 20A, 20B:
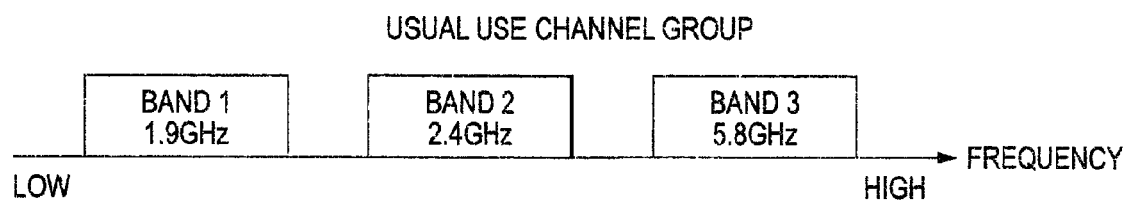
FIGS. 20A and 20B show frequency bands and channels used by the cordless telephone system shown in FIG. 1, respectively.

A wireless communication apparatus according to a second embodiment will be described by way of example of a cordless telephone system with reference to the drawings. A cordless telephone system according to a second embodiment has the same configuration as that of the first embodiment shown in FIG. 1. FIGS. 2A and 2B show the same frame structure as that of the first embodiment shown in FIG. 5. FIGS. 20A and 20B show frequency bands and channels used by the cordless telephone system shown in FIGS. 1A and 1B FIG. 1A shows frequency bands and FIG. 1B shows a correspondence of frequency band to channel.

The master apparatus 20 and the slave apparatus 30 of the wireless telephone 10 shown in FIG. 1 conduct communication therebetween using three different frequency bands. Specifically, as shown in FIGS. 20A and 20B, in three frequency bands, i.e., a 1.9 GHz band (band 1), a 2.4 GHz band (band 2) and a 5.8 GHz band (band 3), a usual use channel group and a waiting channel group are allocated to five carrier frequencies (hereinafter called "channel") for the three frequency bands, respectively, and communication is conducted using one channel (hereinafter referred to as "use channel") of channels belonging to the usual use channel group.

A channel in use may be set for each slot and is switched to a channel to be used in a slot of a switching destination when a slot is changed. Hereinafter, a two-dimensional matrix consisting of channels on a frequency axis and slots on a time axis is called "channel/slot." (As will be described in detail later, reception electric field intensity is measured for each channel/slot and is recorded as shown in FIG. 26, for example.)

Figure 21:
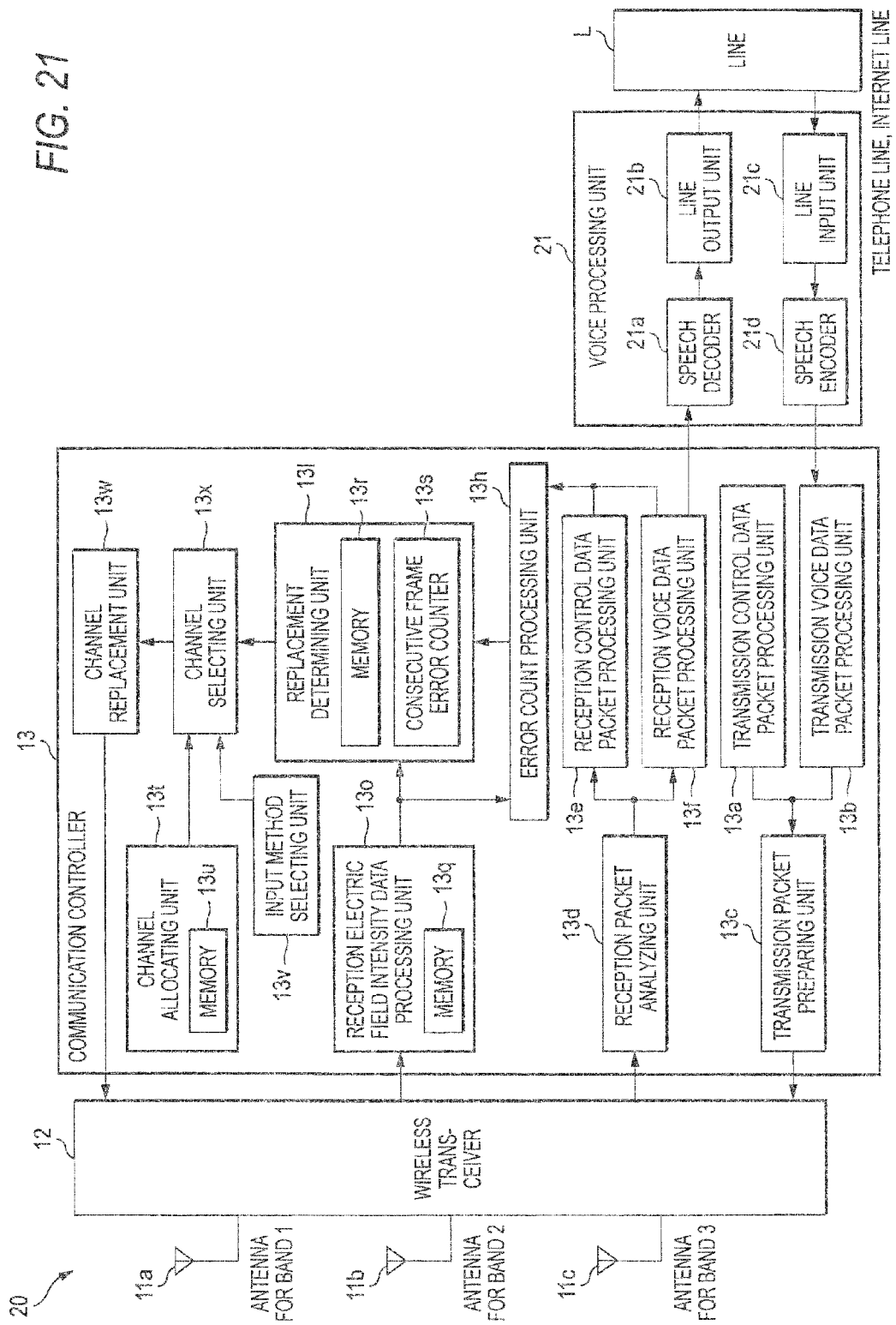
FIG. 21 is a block diagram showing a configuration of a master apparatus of the cordless telephone system shown in FIG. 1.

Next, a configuration of the master apparatus 20 and slave apparatus 30 will be described in detail with reference to FIGS. 21 to 23. FIG. 21 is a block diagram showing a configuration of the master apparatus of the cordless telephone system shown in FIG. 1. FIG. 22 is a block diagram showing a configuration of the slave apparatus of the cordless telephone system shown in FIG. 1. FIG. 23 shows a channel state table.

In FIG. 21, the master apparatus 20 includes antennas 11a to 11c for bands 1 to 3, a wireless transceiver 12, a communication controller 13 and a voice processing unit 21.

The antennas 11a to 11c for bands 1 to 3 are antennas having a characteristic suitable for transmission reception of electric waves of respective frequency bands. For wireless communication with the slave apparatus 30, the wireless transceiver 12 selectively switches one frequency band of bands 1 to 3 and conducts wireless communication with the slave apparatus 30.

The communication controller 13 is a controller to direct a channel or slot used in wireless communication with the slave apparatus 30 to the wireless transceiver 12. The communication controller 13 measures reception electric field intensity for each channel/slot and records it as shown in FIG. 26. The communication controller 13 selects an optimal frequency band according to a determination process to be described later, and instructs the wireless transceiver 12 to switch to a channel and a slot selected from the selected frequency band.

The communication controller 13 includes a transmission control data packet processing unit 13a, a transmission voice data packet processing unit 13b, a transmission packet preparing unit 13c, a reception packet analyzing unit 13d, a reception control data packet processing unit 13e and a reception voice data packet processing unit 13f. In addition, the communication controller 13 includes a channel allocating unit 13t, a reception electric field intensity data processing unit 13o, an error count processing unit 13h, a replacement determining unit 13l, a channel selecting unit 13x and a channel replacement unit 13w.

The transmission control data packet processing unit 13a adds CRC which is an error detection code generated for communication control data. The transmission voice data packet processing unit 13b adds CRC generated for voice data.

The transmission packet preparing unit 13c combines the communication control data generated in the transmission control data packet processing unit 13a and the voice data generated in the transmission voice data packet processing unit 13b to generate packets to be transmitted by the wireless transceiver 12.

The reception packet analyzing unit 13d analyzes the packets received through the wireless transceiver 12 and separates the received packets into the control data and the voice data.

The reception control data packet processing unit 13e processes the communication control data and detects a reception error by the CRC added for the communication control data. The reception voice data packet processing unit 13f processes the voice data and detects a reception error by the CRC added for the voice data.

The channel allocating unit 13t allocates a plurality of channels in a plurality of frequency bands to the usual use channel group and the waiting channel group and stores the allocated channels in an internal memory 13u. Here, the usual use channel group refers to a plurality of channel allocated to a frequency band used for regular wireless communication. The waiting channel group refers to reserved channels which are allocatable instead as use channels although it is not initially used, and are prepared to replace channels of the usual use channel group.

The reception electric field intensity data processing unit 13o measures electric field intensity of each channel in each frequency band and stores it as reception electric field intensity data in an internal memory 13q. In addition, the reception electric field intensity data processing unit 13o determines whether or not slots are good based on the stored electric field intensity. In addition, the reception electric field intensity data processing unit 13o totals the number of good slots and sets priority of frequency bands as good frequency band priority information.

The error count processing unit 13h counts up an error counter when a reception error occurs.

The replacement determining unit 13l determines whether or not there is a need to replace a use channel with a different channel. Upon determining that there is a need of switching due to frequent occurrence of reception errors, the replacement determining unit 13l sets an interference detection flag indicating that interference is detected or a badness detection flag indicating that a reception condition is bad, depending on the content of the determination. The interference detection flag and the badness detection flag are stored in a memory 13r within the replacement determining unit 13l. In addition, the replacement determining unit 13l includes a consecutive frame error counter 13s to be counted up if an error consecutively occurs in a plurality of frames. The consecutive frame error counter 13s is managed for each slot.

If the replacement determining unit 13l determines that there is a need to replace a use channel, the channel selecting unit 13x selects a channel of a switching destination belonging to the waiting channel group based on the reception electric field intensity data measured by the reception electric field intensity data processing unit 13o or situations of occurrence of reception errors. Such replacement is made in a single channel or channels for respective frequency bands and is determined by a setting.

The channel replacement unit 13w instructs the wireless transceiver 12 to replace a use channel with a channel of the waiting channel group based on the channel selected by the channel selecting unit 13x. As shown in FIG. 23, the channel replacement unit 13w manages channels belonging to the usual use channel group and the waiting channel group with three use states, i.e., "use," "waiting" and "replacement." Here, "use" represents a slot being currently used, "waiting" represents a slot which can be replaced as a use slot instead of a slot being used (use slot), and "replacement" represents a slot replaced instead of a use slot. A channel in this waiting state becomes a channel to be replaced with a use channel.

A replacement method selecting unit 13v selects whether to replace a channel in the unit of single channel or in the unit of frequency band and informed the channel selecting unit 13x of a result of the selection.

The voice processing unit 21 decodes the voice data from the communication controller 13 by means of a speech decoder 21a and outputs the decoded voice data to the telephone line L through a line output unit 21b, or codes a signal input from the telephone line L through a line input unit 21c into voice data by means of a speech encoder 21d and outputs the voice data to the communication controller 13.

Although it has been illustrated in this embodiment that the master apparatus 20 is the cordless telephone system 10 connected to the telephone line L, the master apparatus 20 may be an IP telephone connected to Internet.

Next, the slave apparatus 30 will be described with reference to FIG. 22. While the voice processing unit 21 in the master apparatus 20 shown FIG. 21 is connected to the telephone line L, the voice processing unit 31 in the slave apparatus 30 shown FIG. 22 is a speaker SP and a microphone MIC. The slave apparatus 30 has substantially the same configuration for TDMA communication as the master apparatus 20 except for the voice processing units 21 and 31, and so components having the same function as the master apparatus 20 are denoted by the same reference numerals and explanation thereof in the slave apparatus 30 will be omitted. If the master apparatus 20 conducts TDMA communication with the slave apparatus 30, they have a master slave relation, that is, the master apparatus 20 act as a master and the slave apparatus 30 acts as a slave.

In FIG. 22, the slave apparatus 30 includes antennas 11a to 11c for bands 1 to 3, a wireless transceiver 12, a communication controller 13 and a voice processing unit 31. The voice processing unit 31 decodes voice data from the communication controller 13 by means of a speech decoder 31a and outputs the decoded voice data to the speaker SP, or codes a signal input through the microphone MIC into voice data by means of a speech encoder 31b and outputs the voice data to the communication controller 13.

Figure 25:
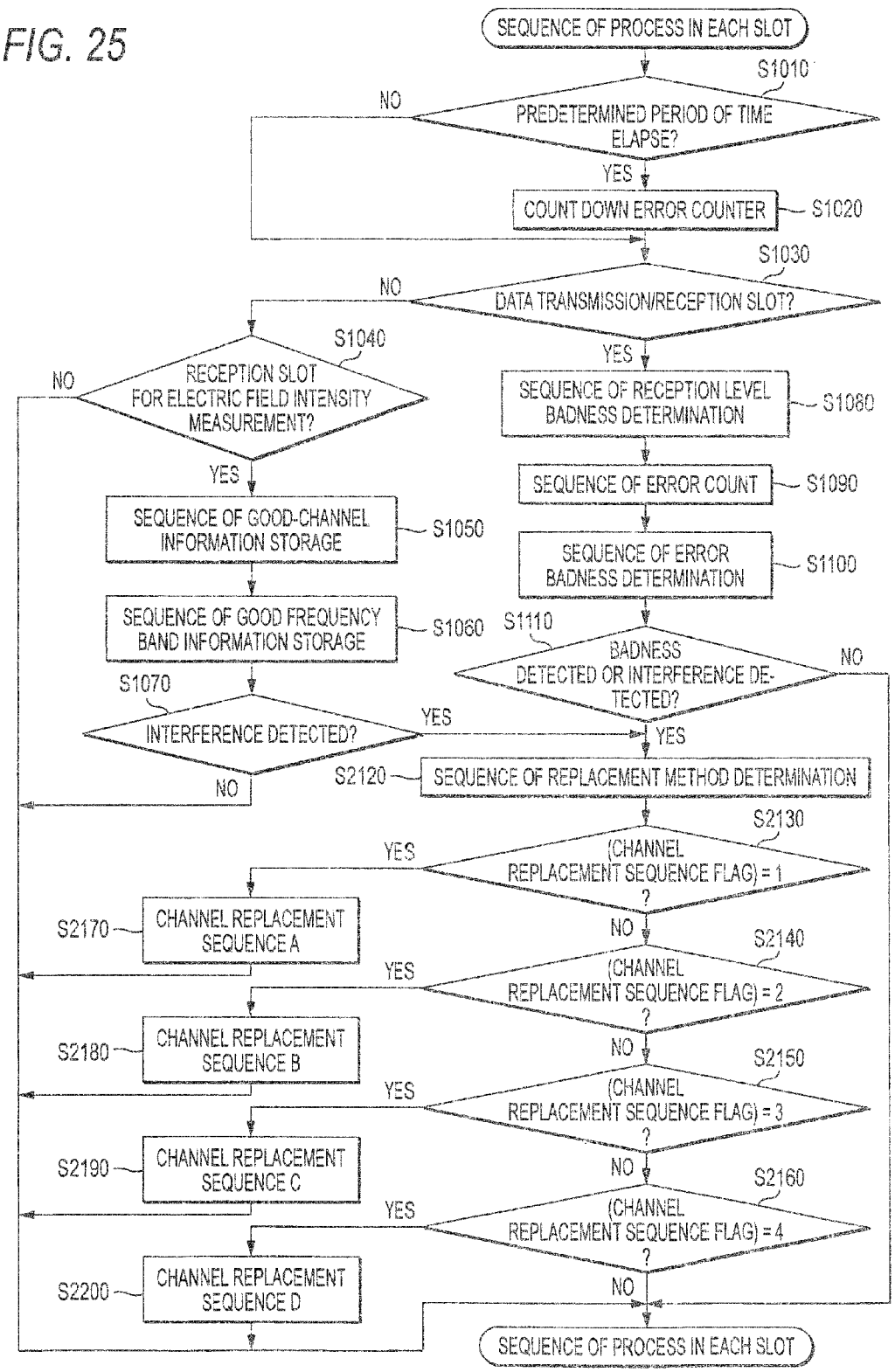
FIG. 25 is a flow chart showing a sequence of process of each slot.

Operation of the above-configured cordless telephone system according to the embodiment of the present invention will be described with reference to the drawings. FIGS. 24A and 24B are tables showing an example of channel frequencies allocated by the channel allocating unit, FIG. 24A being a table showing a usual use channel group and FIG. 24B being a table showing a waiting channel group. FIG. 25 is a flow chart showing a sequence of process of each slot.

In a frame structure with which the master apparatus 20 communicates with the slave apparatuses 30(A to C) as shown in FIG. 5, one frame consists of twelve slots, the first half six slots being used as master apparatus reception slots (or slave apparatus transmission slots) and the second half six slots being used as master apparatus transmission slots (or slave apparatus reception slots). Any slave apparatus 30 exchanges packets with the master apparatus 20 one time in one frame.

For example, the master apparatus 20 and the slave apparatus 30 are allocated with the usual use channel group and the waiting channel group, as shown in FIGS. 24A and 24B, by the channel allocating unit 13t. In the example of FIGS. 24A and 24B, channels (channel number 1 to 5) of band 1 of the usual use channel group are allocated with carrier frequencies increasing from 1.90 GHz to 1.94 GHz at a rate of 0.01 GHz. In addition, channels (channel number 16 to 30) of band 1 of the waiting channel group are allocated with carrier frequencies increasing from 1.95 GHz to 1.99 GHz at a rate of 0.01 GHz. Likewise, for bands 2 and 3, channels of the usual use channel group and the waiting channel group are allocated with carrier frequencies increasing at a rate of 0.01 GHz.

A control operation is performed for each reception slot of these slots in the master apparatus 20 and the slave apparatus 30, as shown in FIG. 25. Hereinafter, a control for electric field intensity measurement in the master apparatus 20 will be described. Here, steps (S1010 to S1110) common to FIG. 6 used for the first embodiment are denoted by the same step numbers.

In FIG. 25, first, at S1010, the error count processing unit 13h determines whether or not a predetermined period of time elapses. The predetermined period of time is a period of time equal to or longer than a time interval during which a background scan makes a round of the entire slot of the entire channel of the entire frequency band. If it is determined at S1010 that the predetermined period of time elapses, at S1020, the error count processing unit 13h counts down an error counter of a slot of a corresponding channel. Details of the process in which the error count processing unit 13h counts down the error counter when the predetermined period of time elapses will be described later.

Next, at S1030, the communication controller 13 determines whether or not the slot at that time is a reception slot for data communication. That is, in case of the master apparatus 20, it is determined whether or not the slot at that time is a reception slot for data communication (slot 0 to 5 shown in FIG. 5) in the master apparatus. If it is determined at S1030 that the slot at that time is not a reception slot for data communication, the process proceeds to S1040.

At S1040, the reception electric field intensity data processing unit 13o determines whether or not the slot at that time is a reception slot for electric field intensity measurement. If it is determined that the slot at that time is not a reception slot for electric field intensity measurement, the process is ended. If it is determined at S1040 that the slot at that time is a reception slot for electric field intensity measurement, at S1050, the reception electric field intensity data processing unit 13o executes a sequence of good channel information storage.

Here, the sequence of good channel information storage will be described with reference to FIGS. 7 and 26 to 28. FIG. 7 is a flow chart showing a sequence of good channel information storage, FIG. 26 shows a channel/slot reception electric field intensity map, FIG. 27 shows a good channel/slot map, and FIG. 28 shows an error channel/slot map.

In the sequence of good channel information storage, reception electric field intensity of a predetermined slot is first measured at S210, as shown in FIG. 7. This measurement is made when the reception electric field intensity data processing unit 13o instructs the wireless transceiver 12 to do so. Reception electric field intensity data representing the measured reception electric field intensity are stored, as a channel/slot reception electric field intensity map shown in FIG. 26, in the memory 13q of the reception electric field intensity data processing unit 13o.

This channel/slot reception electric field intensity map is a table storing the measured electric field intensity as reception electric field intensity data in association with respective channel numbers, in which the usual use channel group and the waiting channel group are allocated with five channels in three frequency bands (bands 1 to 3), respectively, by the channel allocating unit 13t. The electric field intensity measured at S210 is stored in a corresponding location in the channel/slot reception electric field intensity map.

The example of FIG. 26 shows a result after all channel/slots for respective frequency bands are subjected to a background scan, and electric field intensity data are stored in respective locations of the channel/slot reception electric field intensity map. At S220, the reception electric field intensity data processing unit 13o determines whether or not the measured electric field intensity is lower than a predetermined value.

The marking indicating the goodness at S230 is recorded as shown in FIG. 27. FIG. 27 shows an example of goodness badness marking on the channel/slot map. If it is determined that the measured electric field intensity is lower than a predetermined value, it may mean that there is no or little interference electric wave. Then, at S230, a marking indicating goodness is made at positions of channel/slots having high goodness, as shown in FIG. 27.

In the examples of FIGS. 26 and 27, the channel/slot reception electric field intensity map or the good channel/slot map are to measure electric field intensity with each of channels of bands 1 to 3 as the minimal unit on a frequency axis and with each slot of TDMA as the minimal unit on a time axis and mark goodness badness on a two-dimension. In this manner, by marking the goodness badness for different slots, it is possible to detect situations of interference electric waves from the surroundings more closely and determine channel conditions of a switching destination precisely. In addition, in each of the usual use channel group and the waiting channel group, intensity or goodness badness are individually recorded for each channel/slot in bands 1 to 3. In other words, if the electric field intensity of each slot of a channel number of a corresponding frequency band is less than a predetermined threshold, it is stored as good, and otherwise, if the electric field intensity is equal to or more than the predetermined threshold, it is stored as bad. The threshold may be determined in a suitable manner.

If it is determined at S220 of FIG. 7 that the measured electric field intensity is equal to or more than the predetermined value, it may mean that an interference electric wave is detected in a slot of the measured channel. Then, at S240, a marking is made which indicates that corresponding channel/slots are bad.

At S250 of FIG. 7, the reception electric field intensity data processing unit 13o counts up the error counter (error occurrence information). This error counter is counted up based on the determination at S220 that the measured electric field intensity is equal to or more than the predetermined value, and the count-up is stored, as an error channel/slot map shown in FIG. 28, in the memory 13q of the reception electric field intensity data processing unit 13o. In this manner, in addition to a CRC error occurring in wireless communication, even when an interference electric wave is detected in electric field intensity measurement for interference electric waves, the error counter is counted up as an error. In this manner, the good channel/slot map or the error channel/slot map is updated (S260).

Figure 29:
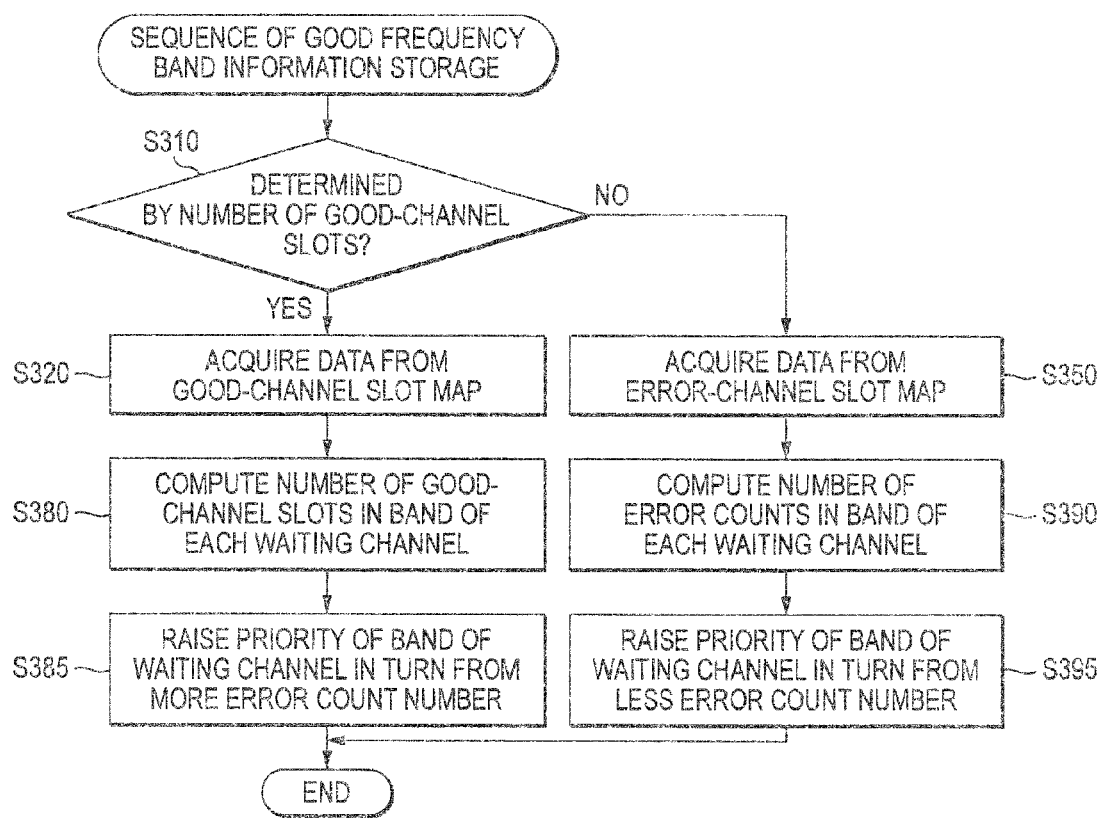
FIG. 29 is a flow chart showing a sequence of good frequency band information storage.

When the sequence of good channel information storage is ended, a sequence of good frequency band information storage is executed at S1000 of FIG. 25. Here, the sequence of good frequency band information storage at S1060 will be described with reference to FIG. 29. FIG. 29 is a flow chart showing a sequence of good frequency band information storage. Here, steps (S310, S320 and S350) common to FIG. 11 used for the first embodiment are denoted by the same step numbers.

In the sequence of good frequency band information storage, first, at S310, the reception electric field intensity data processing unit 13o determines whether or not there is a setting that a degree of goodness of each frequency band is determined based on the total number of good channel/slots for each frequency band. If it is determined that there is a setting that the determination is made based on the total number of good channel/slots, the process proceeds to S320.

At S320, the reception electric field intensity data processing unit 13o acquires data of each channel/slot of the waiting channel group from the good channel/slot map. At S380, the reception electric field intensity data processing unit 13o sums up the number of markings indicating goodness for each frequency band belonging to the waiting channel group, and calculates good frequency band priority information about the waiting channel group based on a result of the summing up.

At S385, the reception electric field intensity data processing unit 13o sets priority of frequency bands belonging to the waiting channel group based on the calculated good frequency band priority information in such a manner that the frequency band priority becomes higher in an order of increasing in the total number of goodness markings. A frequency band with higher priority information is more preferentially used. In the example of FIG. 27, the good frequency band priority information is 22 in band 1, 30 in band 2 and 25 in band 3. Here, band 2 has high priority since it is the largest in the total number of goodness markings, and band 1 has low priority since it is the smallest in the total number of goodness markings.

In addition, in the examples of FIGS. 26 and 27, the channel/slot reception electric field intensity map or the good channel/slot map are to measure electric field intensity with each of channels of bands 1 to 3 as the minimal unit on a frequency axis and with each slot of TDMA as the minimal unit on a time axis and mark goodness badness on a two-dimension. In this manner, by marking goodness badness for slots as well as the unit of channels, it is possible to detect situations of interference electric waves from the surroundings more closely and determine channel conditions of a switching destination precisely.

On the other hand, at S310, if it is determined that there is a setting that the determination is not made based on the total number of good channel/slots, the process proceeds to S350.

At S350, the reception electric field intensity data processing unit 13o acquires data of channel/slots of the waiting channel group from the error channel/slot map. At S390, it performs a totaling operation for each frequency band based on each error counter belonging to the waiting channel group of the error channel/slot map and calculates good frequency band priority information about the waiting channel group based on a result of the totaling. In the example of FIG. 28, the good frequency band priority information is 18 in band 1, 3 in band 2 and 9 in band 3.

At S395, the reception electric field intensity data processing unit 13o sets frequency band priority based on the calculated good frequency band priority information in such a manner that the frequency band priority becomes higher in an order of decreasing in the total number of good channel/slots. In other words, in the example of FIG. 28, band 1 has low priority since it is the largest in the total number of good channel/slots, and band 2 has high priority since it is the smallest in the total number of good channel/slots.

In this manner, when priority is set for each frequency band in the sequence of good frequency band information storage (see FIG. 29), at S1070 of FIG. 25, the reception electric field intensity data processing unit 13o determines whether or not an interference electric wave is detected. If the reception electric field intensity measured at S210 of FIG. 7 is more than the predetermined value, it is determined that an interference electric wave is detected. If it is determined at S1070 that an interference electric wave is not detected, the process is ended.

Next, a sequence of determination for data reception slots of the master apparatus 20 will be described. If it is determined at S1030 that slots at that time are reception slots (slots 0 to 5 shown in FIG. 5) for data communication in order of slots shown in FIG. 25, at S1080, the replacement determining unit 13*l* executes a sequence of reception level badness determination.

Here, the sequence of reception level badness determination will be described with reference to FIG. 12. FIG. 12 is a flow chart showing a sequence of reception level badness determination. In the sequence of reception level badness determination, first, at S410, it is determined whether or not a setting indicating that a determination is made based on a reception level is valid. If it is determined at S410 that the setting is invalid, since it means that a process according to the sequence of reception level badness determination is not performed, this process is ended.

If it is determined at S410 that the setting is valid, at S420, it is determined whether or not electric field intensity of the reception slots for data communication is less than a predetermined value. This reception electric field intensity is input to the replacement determining unit 13*l* through the reception electric field intensity data processing unit 13*o*.

If it is determined at S420 that the electric field intensity is less than the predetermined value, since it may mean that the master apparatus 20 is separated from the slave apparatus 30, a badness detection flag is effectively set at S430, and then the process is ended.

In this manner, when the sequence of reception level badness determination is ended, a sequence of error count is executed at S1090 of FIG. 25.

Figure 30:
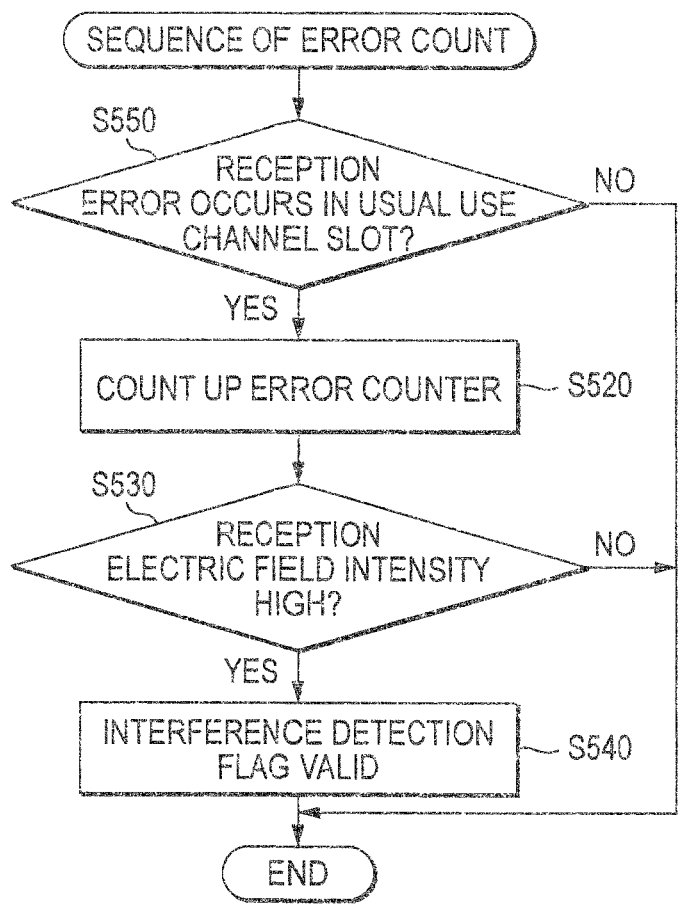
FIG. 30 is a flow chart showing a sequence of error count.

Next, the sequence of error count will be described with reference to FIGS. 30 and 14. FIG. 30 is a flow chart showing a sequence of error count, and FIG. 14 shows a slot format.

In the sequence of error count shown in FIG. 14, first, at S550, the error count processing unit 13*h* determines whether or not a received slot generates a reception error. Upon receiving data packets, the reception control data packet processing unit 13*e* processes data for communication control and detects a reception error by CRC added for the data for communication control. In addition, the reception voice data packet processing unit 13*f* processes voice data and detects a reception error by CRC added for the voice data. That is, as shown in FIG. 14, it is determined whether or not the reception error is generated in a slot of a use channel (hereinafter referred to as "use channel/slot") belonging to the usual use channel group, based on a determination on whether or not a synchronization error of a syncword in a slot format was present or a determination on whether or not information indicating that a CRC error (packet error) is detected in communication data is sent from the reception control data packet processing unit 13*e* or the reception voice data packet processing unit 13*f*.

If it is determined at S550 that the reception error is not occurred in the use channel/slot belonging to the usual use channel group, the process is ended. If it is determined at S550 that the reception error is occurred, at S520, a corresponding error counter of the error channel/slot map shown in FIG. 28 is counted up. For example, if a use channel/slot in which a reception error is occurred is channel number 3 and slot 1 of band 1 of the usual use channel, it becomes slot 2 by incrementing the error counter by +1. If a channel/slot is currently slot 3, it becomes slot 4 by incrementing the error counter by +1.

In this manner, as each error counter of the error channel/slot map is counted up when the reception error or the like is generated, priority allocated for each frequency band is lowered in the sequence of good frequency band information storage (see FIG. 29) when the usual use channel group is replaced with the waiting channel group. Once priority is lowered, it remains in the lowered state for a while, and thus the error counter is not counted down at once even when no reception error is present in the next slot. That is, the priority is affected by the past state of occurrence of the reception error.

The error counter is counted down in all channel/slots whenever a predetermined period of time elapses. That is, if a predetermined period of time elapses at S1010 of FIG. 25 described above, error counters of all channel/slots are counted down at S1020. In this manner, by automatically counting down the error counter during some period of time, the priority can be returned according to change of surrounding circumstances such as disappearance of an effect by interference electric waves.

At S530 of FIG. 30, the replacement determining unit 13*l* determines whether or not electric field intensity of a reception slot (use channel/slot) for data communication is more than a predetermined value. This determination is made based on the badness detection flag set at S430 of FIG. 12.

If electric field intensity of when a reception error is detected is relatively high, the reception error is very likely to be caused by an interference electric wave. This is because, if an reception error is detected although electric field intensity is high as the master apparatus 20 is close to the slave apparatus 30, it may be determined that the reception error is caused by the interference electric wave. Accordingly, in that interference is detected at S530 if the reception electric field intensity is more than the predetermined value, at S540, the replacement determining unit 13*l* determines an interference detection flag as valid and ends the process. If it is determined at S530 that the reception electric field intensity is equal to or less than the predetermined value, the process is ended.

In this manner, when the sequence of count process is ended, at S1100 of FIG. 25, a sequence of error badness determination is executed.

Figure 31:
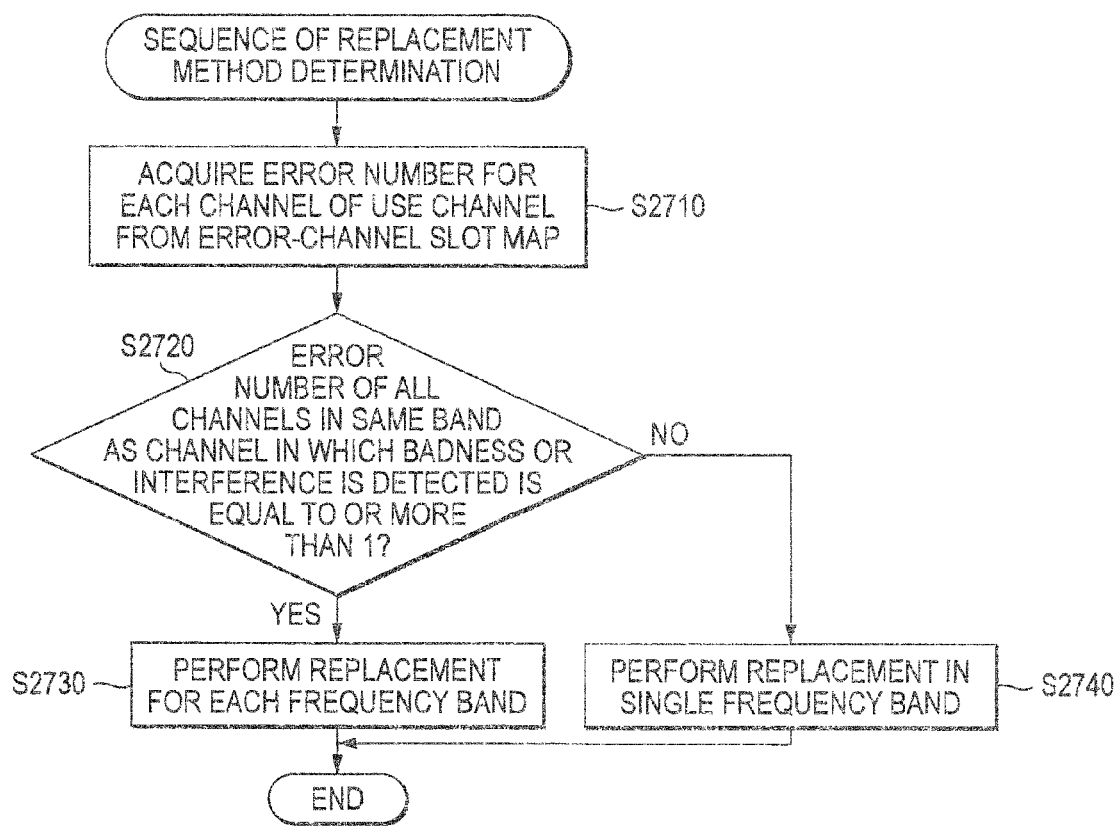
FIG. 31 is a flow chart showing a sequence of selection of replacement method.

Next, the sequence of error badness determination will be described with reference to FIGS. 15, 31 to 35. FIG. 15 is a flow chart showing a sequence of error badness determination, FIG. 31 is a flow chart showing a sequence of replacement method determination, and FIGS. 32 to 35 are flow charts showing sequences A to D of channel/slot replacement.

In the sequence of error badness determination, bad channel/slots are determined based on an error rate. In FIG. 15, first, at S610, the replacement determining unit 13*l* acquires an error rate. The error rate will be calculated by the reception electric field intensity data processing unit 13*o* based on a value of each error counter of the error channel/slot map within a predetermined period of time. That is, the error rate is managed every slot.

Next, at S620, the replacement determining unit 13*l* acquires a value of the consecutive frame error counter 13*s*. The consecutive frame error counter 13*s* provided in the replacement determining unit 13*l* is managed every slot and is a counter continuing to count up when an error is consecutively generated in a plurality of frames. For example, when a reception error such as a CRC error or a synchronization error is generated in any slot, this counter counts up by information from the error count processing unit 13*h*.

For example, as shown in FIG. 5, if a transmission packet transmitted from the slave apparatus A using slot 1 is an reception error, the consecutive frame error counter 13*s* counts up (+1). If a reception error is occurred in the same slot of the next frame, the consecutive frame error counter 13*s* additionally counts up. Once counting up (+1) with the reception error, if no reception error is generated in the next frame, the consecutive frame error counter 13s is cleared.

Next, at S630, the replacement determining unit 13l determines whether or not an error rate is high or a value of the consecutive frame error counter 13s is a consecutive frame error exceeding a predetermined value. A high error rate means that the error rate calculated at S610 exceeds a predetermined value and a reception error is frequently generated in this use channel/slot. In addition, since the value of the consecutive frame error counter 13s acquired at S620 is counted up (+1) whenever a reception error is generated, for example, when a reception error is consecutively generated in five frames, the value of the consecutive frame error counter 13s becomes 5. Accordingly, if a reception error is generated in slots consecutive by five frames, the predetermined value is set to 4 with the reception error as the consecutive frame error.

If it is determined at S630 that the error rate is less than a predetermined value or the value of the consecutive frame error counter 13s is less than a predetermined value, the process is ended.

If it is determined at S630 that the error rate is high or the value of the consecutive frame error counter 13s exceeds the predetermined value, since it means that corresponding channel/slots are bad, at S640, a badness detection flag is made valid, and then the process is ended.

In this manner, when the sequence of error badness determination is ended, at S1110 of FIG. 25, the channel selecting unit 13x determines whether or not a badness detection flag or an interference detection flag is valid. If both flags are invalid, the process is ended.

Hereinafter, a case where the badness detection flag or the interference detection flag is valid will be described. If it is determined at S1110 of FIG. 25 that one of the badness detection flag and the interference detection flag is valid, replacement of channel/slot is performed. This embodiment provides four methods for selection of channel of a replacement destination, some of which may be selected depending on a setting (a channel replacement sequence flag).

There are two methods for replacement of use channel. Selection of one of these methods is determined by the replacement method selecting unit 13v. Next, a selection method performed at S2120 by the replacement method selecting unit 13v will be described with reference to FIG. 31.

The replacement method selecting unit 13v acquires and checks the number of errors (error occurrence information) of all channels for a frequency band to which use channels belongs, from the error channel/slot map (S2710).

The replacement method selecting unit 13v determines whether or not the total number of errors of the channels belonging to this frequency band is more than 1 (S2720). If the total number of errors is more than 1, since it means that errors are generated in a plurality of channels, a setting for replacement for each frequency band is made (S2730). If the total number of errors is 0, since it means badness only in use channels, a setting for replacement in a single channel is made (S2740).

Next, at S2130 of FIG. 25, it is determined whether or not a channel replacement sequence flag is 1. At S2140, it is determined whether or not the channel replacement sequence flag is 2. At S2150, it is determined whether or not the channel replacement sequence flag is 3. At S2160, it is determined whether or not the channel replacement sequence flag is 4. If the channel replacement sequence flag is none of 1 to 4, the process is ended.

Figure 32:
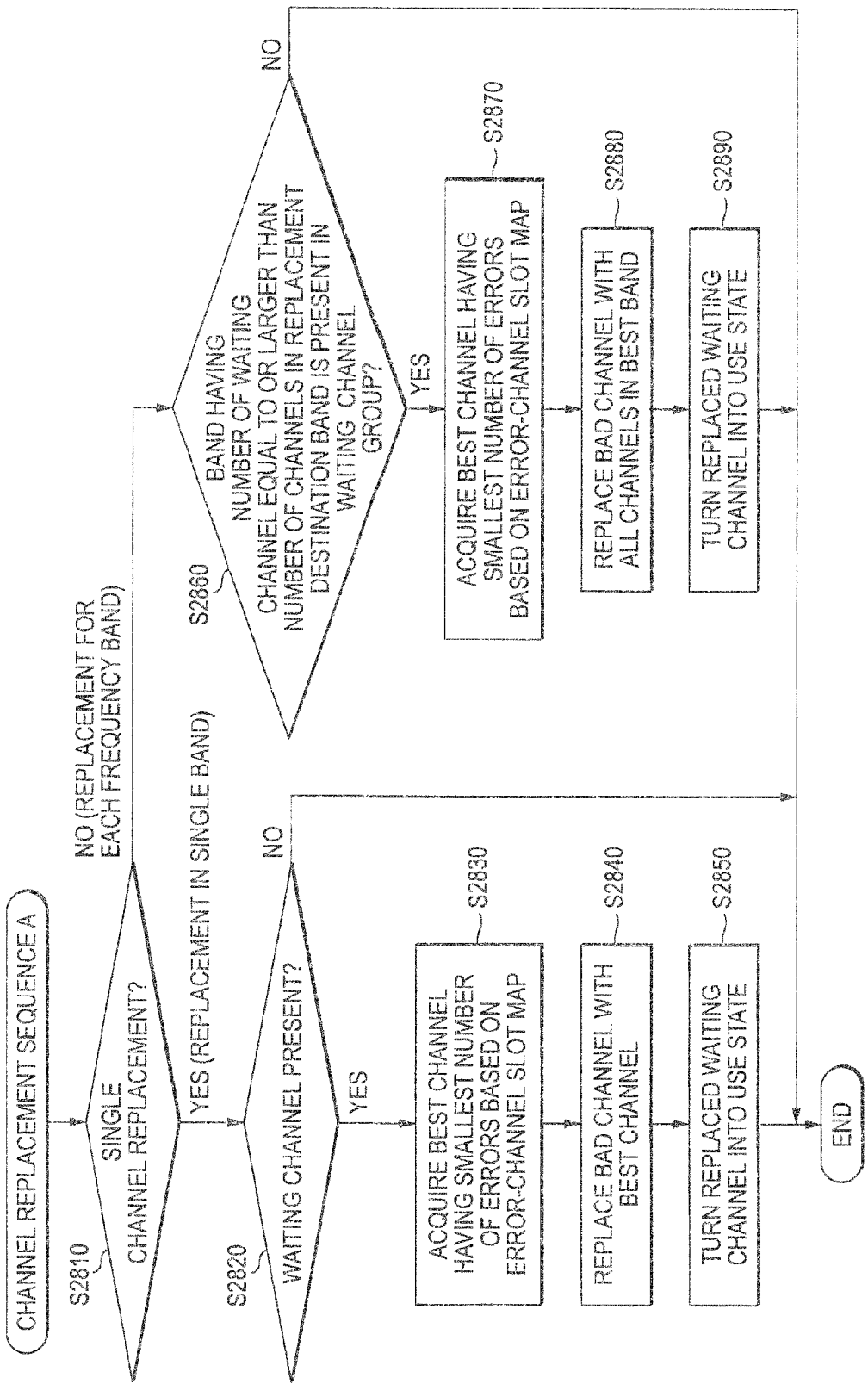
FIG. 32 is a flow chart showing a channel/slot replacement sequence A.

First, if it is determined at S2130 that the channel replacement sequence flag is 1, at S2170, a channel replacement sequence A is executed. In the channel replacement sequence A, as shown in FIG. 32, first, the channel selecting unit 13x determines whether or not replacement of a use channel is performed in a single channel (S2810). This determination is made by checking the setting at S2730 or S2740 of FIG. 31 by the replacement method selecting unit 13v.

If the setting indicates that replacement of a use channel is performed in a single channel, then the channel selecting unit 13x determines whether or not a replaceable waiting channel is present in a waiting channel group of a channel state table (see FIG. 23) (S2820). If no waiting channel is present, since it means that the use channel can not be replaced, the process is ended.

If any waiting channel is present in the waiting channel group, the channel selecting unit 13x acquires a waiting channel having the smallest number of errors for each channel as the best channel by referring to the error channel/slot map (S2830). In the examples of FIGS. 23 and 28, since channel numbers 16, 19 and the like have the smallest number 0 of errors, the channel selecting unit 13x may select, for example, channel number 16.

While the channel replacement unit 13w instructs the wireless transceiver 12 to replace the use channel (bad channel) whose bad detection flag or interference detection flag was valid with the selected best channel (S2840), the channel selecting unit 13x changes channel number 16 of the channel state table from the waiting state to the use state and changes the replaced use channel from the use state to the replacement state and then process is ended (S2850).

If it is determined at S2810 that replacement of a use channel is not performed in a single channel, the channel selecting unit 13x determines whether or not there exist any frequency band having the number of waiting channels included in the waiting channel group, which is larger than the number of channels being used included in the frequency band to which a use channel required to be replaced belongs, by referring to the channel state table (S2860). Since this means replacing all channels of the frequency band to which the use channel belongs when the use channel is replaced with a waiting channel, waiting channels more than the total number of use channels belonging to at least this frequency band are needed in bands 1 to 3 of the waiting channel group. Accordingly, if replaceable bands 1 to 3 are not present in the waiting channel group, since it means that the use channel can not be replaced, the process is ended.

If it is determined at S2860 that frequency bands (bands 1 to 3) replaceable for each frequency band to which the use channel belongs are present in the waiting channel group, a frequency band having the smallest number of errors of the replaceable frequency bands is acquired as the best band by referring to the error channel/slot map (S2870). In the examples of FIGS. 23 and 28, since the number of errors of band 2 is the smallest, i.e., 3, the channel selecting unit 13x may select band 2. Accordingly, if the use channel is a channel belonging to band 2, it means selection of the same frequency band. If the use channel is out of band 2, it means selection of a different frequency band.

While the channel replacement unit 13w instructs the wireless transceiver 12 to replace a frequency band to which the use channel (bad channel) whose bad detection flag or interference detection flag was valid belongs with the selected best band (S2880), the channel selecting unit 13x changes band 2 of the waiting channel group of the channel state table from the waiting state to the use state and changes a frequency band to which the replaced use channel belongs from the use state to the replacement state and then process is ended (S2890).

Figure 33:
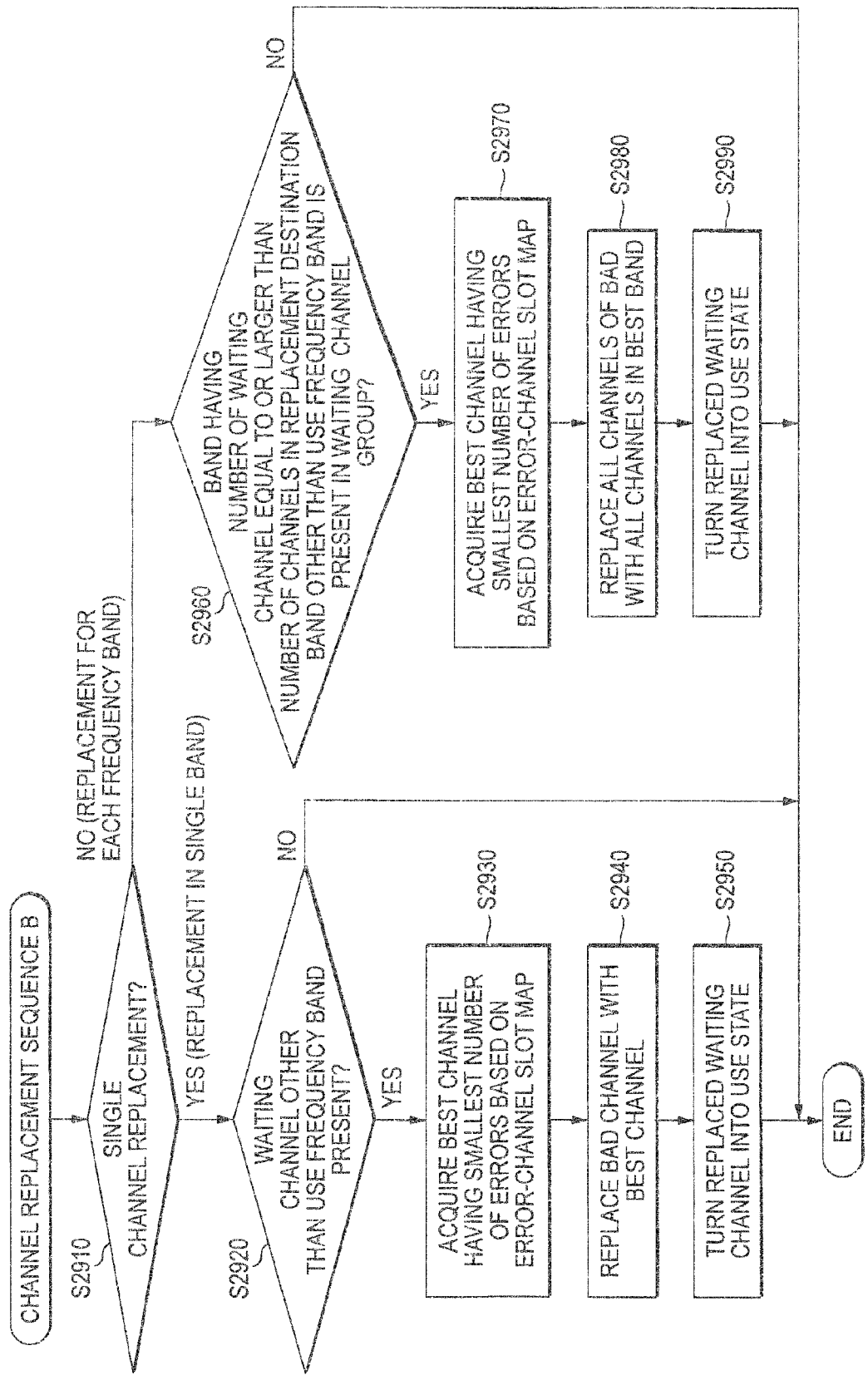
FIG. 33 is a flow chart showing a channel/slot replacement sequence B.

Next, a case where the channel replacement sequence flag is 2 will be described. If it is determined at S2140 of FIG. 25 that the channel replacement sequence flag is 2, at S2180, the channel replacement sequence B is executed. In the channel replacement sequence B, as shown in FIG. 33, first, the channel selecting unit 13x determines whether or not replacement of a use channel is performed in a single channel (S2910).

If the setting indicates that replacement of a use channel is performed in a single channel, then the channel selecting unit 13x determines whether or not a replaceable waiting channel out of the frequency band of the use channel is present in a waiting channel group of the channel state table (see FIG. 23) (S2920). If no waiting channel is present, since it means that the use channel can not be replaced, the process is ended.

If any waiting channel is present in the waiting channel group, the channel selecting unit 13x acquires a waiting channel having the smallest number of errors for each channel as a waiting channel of a frequency band different from the frequency band of the use channel by referring to the error channel/slot map (S2930). In the examples of FIGS. 23 and 28, if the use channel is band 1, since channel numbers 24 and 25 belonging to band 2 or channel numbers 26, 28 and the like belonging to band 3 have the smallest number 0 of errors, the channel selecting unit 13x may select, for example, channel number 24 as the best channel.

While the channel replacement unit 13w instructs the wireless transceiver 12 to replace the use channel (bad channel) whose bad detection flag or interference detection flag was valid with the selected best channel (S2940), the channel selecting unit 13x changes channel number 24 of the channel state table from the waiting state to the use state and changes the replaced use channel from the use state to the replacement state and then process is ended (S2950).

If it is determined at S2910 that replacement of a use channel is not performed in a single channel, the channel selecting unit 13x determines whether or not there exist any frequency band different from the frequency band of the use channel and having the number of waiting channels included in the waiting channel group, which is larger than the number of channels being used included in the frequency band to which a use channel required to be replaced belongs, by referring to the channel state table (S2960). If replaceable bands 1 to 3 are not present, since it means that the frequency band of the use channel can not be replaced, the process is ended.

If it is determined at S2960 that frequency bands (bands 1 to 3) replaceable for each frequency band to which the use channel belongs are present in the waiting channel group, a frequency band having the smallest number of errors of the replaceable frequency bands is acquired as the best band by referring to the error channel/slot map (S2970). In the examples of FIGS. 23 and 28, if the frequency band of the use channel is band 2, since band 1 is 18 and band 3 is 9 and accordingly since the number of errors of band 3 is the smallest, i.e., 9, the channel selecting unit 13x may select band 3.

While the channel replacement unit 13w instructs the wireless transceiver 12 to replace a frequency band to which the use channel (bad channel) whose bad detection flag or interference detection flag was valid belongs with the selected best band (S2980), the channel selecting unit 13X changes band 2 of the waiting channel group of the channel state table from the waiting state to the use state and changes a frequency band to which the replaced use channel belongs from the use state to the replacement state and then process is ended (S2990).

Figure 34:
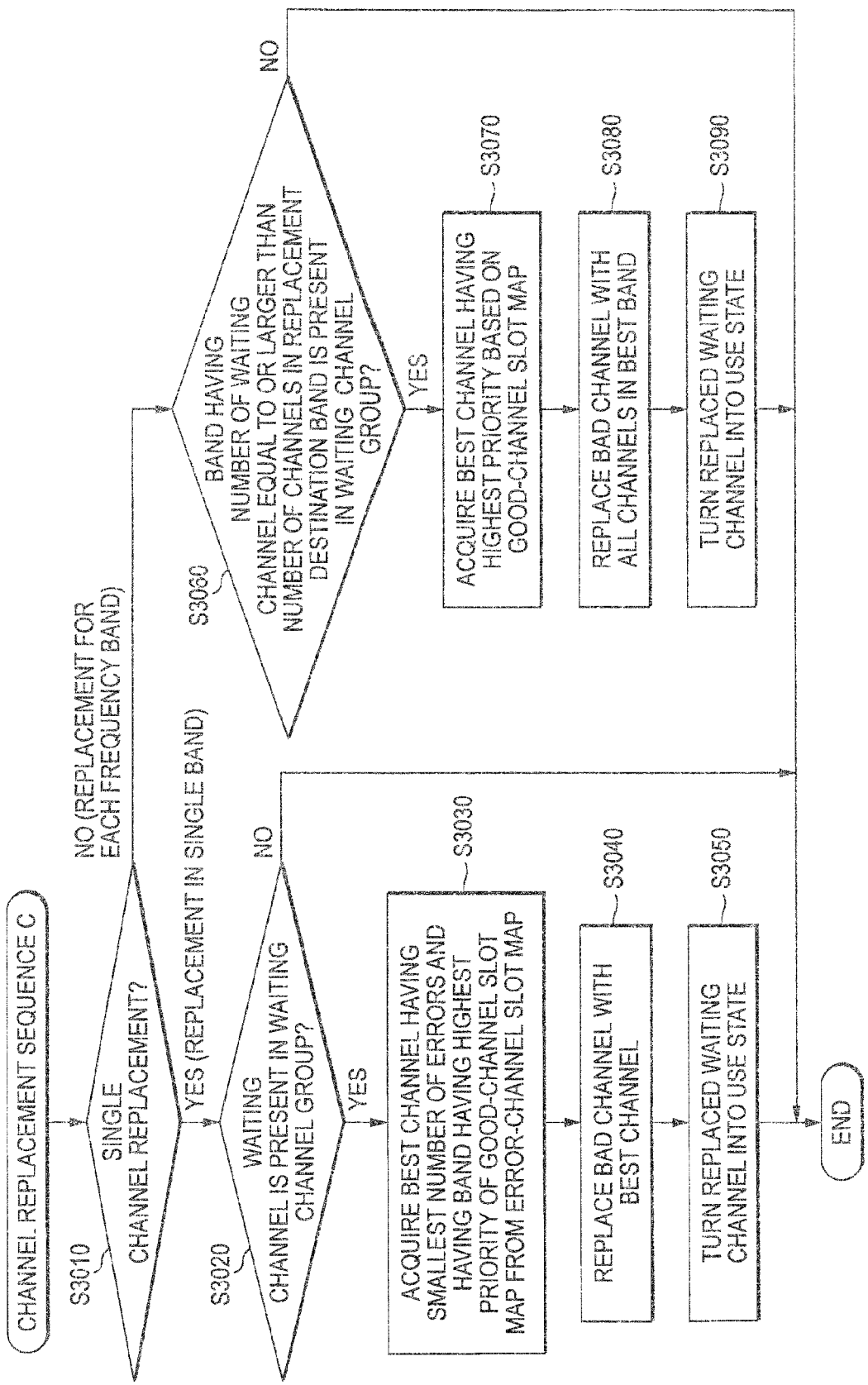
FIG. 34 is a flow chart showing a channel/slot replacement sequence C.

Next, a case where the channel replacement sequence flag is 3 will be described. If it is determined at S2150 of FIG. 25 that the channel replacement sequence flag is 3, at S2190, the channel replacement sequence C is executed. In the channel replacement sequence C, as shown in FIG. 34, first, the channel selecting unit 13x determines whether or not replacement of a use channel is performed in a single channel (S3010).

If the setting indicates that replacement of a use channel is performed in a single channel, then the channel selecting unit 13x determines whether or not a replaceable waiting channel out of the frequency band of the use channel is present in a waiting channel group of the channel state table (see FIG. 23) (S3020). If no waiting channel is present, since it means that the use channel can not be replaced, the process is ended.

If any waiting channel is present in the waiting channel group, the channel selecting unit 13x acquires a frequency band having the highest priority based on good frequency band priority information by referring to the good channel/slot map. In the example of FIG. 27, band 2 has the highest priority. Next, the channel selecting unit 13x acquires a waiting channel belonging to band 2 of the waiting channel group based on the channel state table. In the example of FIG. 23, channel numbers 23 to 25 are waiting. In addition, the channel selecting unit 13x acquires a slot having the smallest number of errors by referring to the error channel/slot map. In the example of FIG. 28, channel numbers 24 and 25 have the smallest number 0 of errors. Accordingly, the channel selecting unit 13x may select channel number 24 or channel number 25 as the best channel (S3030).

While the channel replacement unit 13w instructs the wireless transceiver 12 to replace the use channel (bad channel) whose bad detection flag or interference detection flag was valid with the selected best channel (S3040), the channel selecting unit 13x changes channel number 24 of the channel state table from the waiting state to the use state and changes the replaced use channel from the use state to the replacement state and then process is ended (S3050).

If it is determined at S3010 that replacement of a use channel is not performed in a single channel, the channel selecting unit 13x determines whether or not there exist any frequency band having the number of waiting channels included in the waiting channel group, which is larger than the number of channels being used included in the frequency band to which a use channel required to be replaced belongs, by referring to the channel state table (S3060). If replaceable bands 1 to 3 are not present in the waiting channel group, since it means that the use channel can not be replaced, the process is ended.

If it is determined at S3060 that frequency bands (bands 1 to 3) replaceable for each frequency band to which the use channel belongs are present in the waiting channel group, a frequency band having the highest priority is acquired as the best band based on the good frequency band priority information of the error channel/slot map (S3070).

In the examples of FIGS. 23 and 27, if a use channel is channel number 6, the total number of use channels belonging to band 2 is 5. Accordingly, since the number of channels required to be replaced is 5, frequency bands having five waiting channels in the waiting channel group are band 1 and band 3. In band 1 and band 3, the good frequency band priority information by the good channel/slot map has priority higher in band 3 than in band 1. Accordingly, the channel selecting unit 13x may select band 3 as the best band.

While the channel replacement unit 13w instructs the wireless transceiver 12 to replace a frequency band to which a bad channel belongs with the selected best band (S3080), the channel selecting unit 13x changes band 3 of the waiting channel group of the channel state table from the waiting state to the use state and changes band 2 to which the replaced use channel belongs from the use state to the replacement state and then process is ended (S3090).

Figure 35:
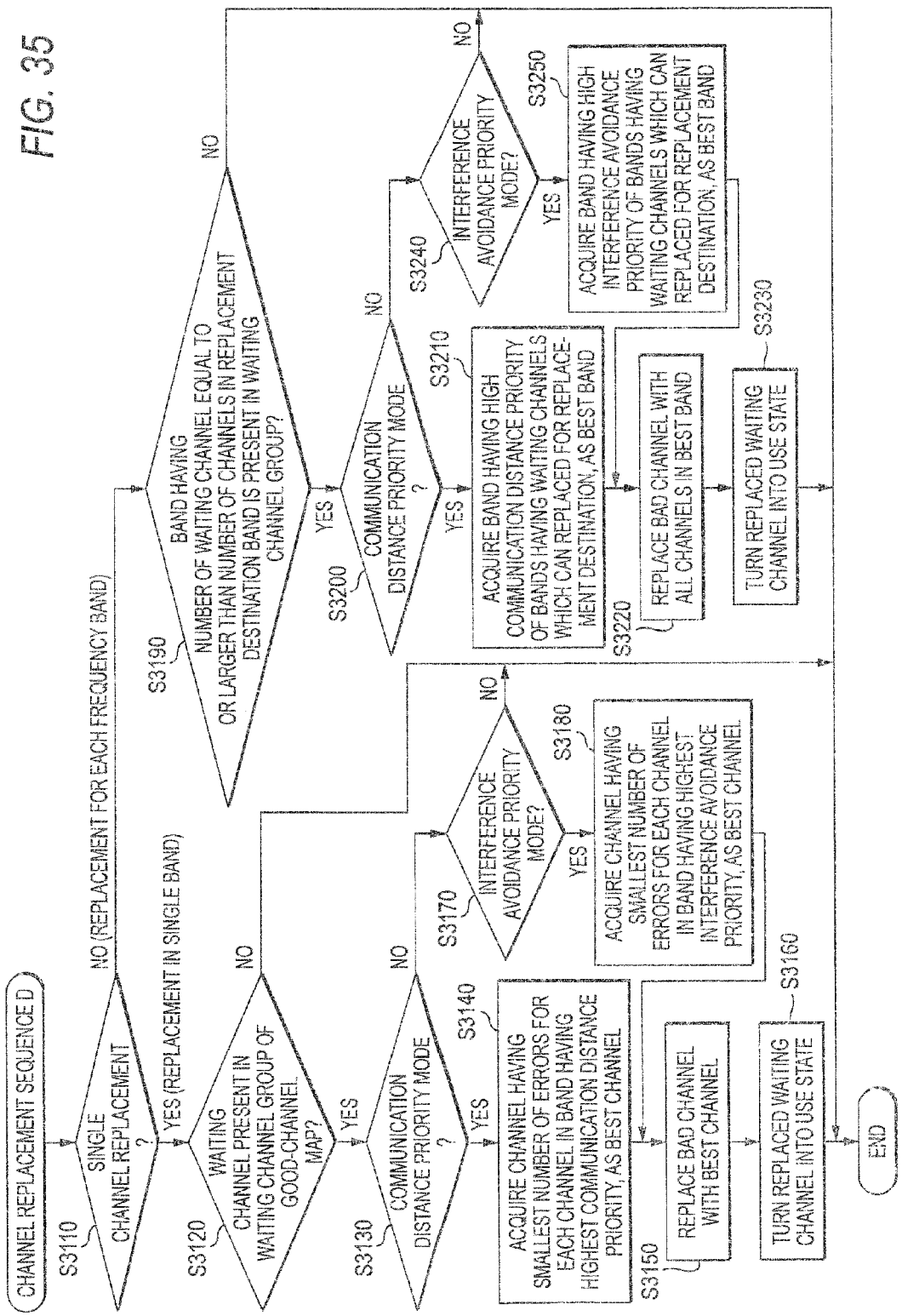
FIG. 35 is a flow chart showing a channel/slot replacement sequence D.

Next, a case where the channel replacement sequence flag is 4 will be described. If it is determined at S2160 of FIG. 25 that the channel replacement sequence flag is 4, at S2220, the channel replacement sequence D is executed. In the channel replacement sequence D, as shown in FIG. 35, first, the channel selecting unit 13x determines whether or not replacement of a use channel is performed in a single channel (S3110).

If the setting indicates that replacement of a use channel is performed in a single channel, then the channel selecting unit 13x determines whether or not a replaceable waiting channel is present in the waiting channel group of the channel state table (see FIG. 23) (S3120). If no waiting channel is present, since it means that the use channel can not be replaced, the process is ended.

If any waiting channel is present in the waiting channel group, the channel selecting unit 13x determines whether or not a setting is a communication distance priority mode (S3130). If the setting is a communication distance priority mode, the channel selecting unit 13x acquires replaceable waiting channels from the waiting channel group by referring to the channel state table. Next, the channel selecting unit 13x acquires a channel having the smallest number of errors in a frequency band having high communication distance priority among the acquired waiting channels, as the best channel by referring to the error channel/slot map (S3140).

Here, the communication distance priority refers to an order of frequency band to allow a longer communication distance to be secured. In this embodiment, as frequency bands (bands 1 to 3), three frequency bands, that is, a 1.9 GHz band, a 2.4 GHz band and a 5.8 GHz band, are used. Since one having a longer wavelength of these three frequency bands provides a relatively longer arrival distance at the same transmission power, communication distance priority becomes higher in order of band 1, band 2 and band 3. Accordingly, if a bad channel/slot is detected in band 2 or band 3, a good channel/slot of band 1 is first selected.

For example, in the examples of FIGS. 23 and 28, waiting channels are included in any frequency band (band 1 to band 3) in the waiting channel group of the channel state table. 1.9 GHz (band 1) having the longest wavelength has the highest communication distance priority. Of channels belonging to band 1 of the waiting channel group, since channel numbers 16, 19 and the like have the smallest number 0 of errors, the channel selecting unit 13x may select, for example, channel number 16 as the best channel.

While the channel replacement unit 13w instructs the wireless transceiver 12 to replace a bad channel with the selected best band (S3150), the channel selecting unit 13x changes channel number 16 of the channel state table from the waiting state to the use state and changes the replaced use channel from the use state to the replacement state and then process is ended (S3160).

In this manner, as priority is set in order of long wavelength of frequency bands 1 to 3, a frequency band providing a long arrival distance of an electric wave can be preferentially allocated as a channel of a replacement destination. Accordingly, even when reception electric field intensity is lowered or an reception error frequently occurs as the master apparatus 20 becomes distant from the slave apparatus 30, it is possible to improve communication environments to some extents.

If it is determined at S3130 that a setting is not a communication distance priority mode, it is determined at S3170 whether or not a setting is an interference avoidance priority mode. If it is determined that a setting is not an interference avoidance priority mode, the process is ended.

If it is determined that a setting is an interference avoidance priority mode, the channel selecting unit 13x acquires replaceable waiting channels from the waiting channel group by referring to the channel state table. Next, the channel selecting unit 13x acquires a channel having the smallest number of errors in a frequency band having high interference avoidance priority among the acquired waiting channels, as the best channel by referring to the error channel/slot map (S3180).

Here, the interference avoidance priority refers to an order of little effect by an interference electric wave. There exist many sources of interference electric waves, such as a microwave oven, a Wi-Fi as a wireless LAN and the like, in the 2.4 GHz frequency band. In addition, the 1.9 GHz frequency band is significantly affected by an interference electric wave since only five channels are allocated in this band according to a communication standard. Accordingly, in this embodiment, interference avoidance priority becomes higher in order of band 3, band 1 and band 2.

For example, in the examples of FIGS. 23 and 28, waiting channels are included in any frequency band (band 1 to band 3) in the waiting channel group of the channel state table. Band 3 has the highest interference avoidance priority. Of channels belonging to band 3 of the waiting channel group, since channel numbers 26, 28 and the like have the smallest number 0 of errors, the channel selecting unit 13x may select, for example, channel number 26 as the best channel.

In this manner, since priority is set depending on the kind of electronic devices in which interference electric wave is occurred such as a microwave oven, Wi-Fi and the like, it is possible to select a good frequency band by avoiding an interference electric wave.

If it is determined at S3110 that replacement of a use channel is not performed in a single channel, the channel selecting unit 13x determines whether or not there exist any frequency band having the number of waiting channels included in the waiting channel group, which is larger than the number of channels being used included in the frequency band to which a use channel required to be replaced belongs, by referring to the channel state table (S3190). If replaceable bands 1 to 3 are not present in the waiting channel group, since it means that the use channel can not be replaced, the process is ended.

If it is determined at S3190 that frequency bands (bands 1 to 3) replaceable for each frequency band to which the use channel belongs are present in the waiting channel group, the channel selecting unit 13x determines whether or not a setting is a communication distance priority mode (S3200).

If it is determined that a setting is a communication distance priority mode, the channel selecting unit 13x acquires a frequency band having high communication distance priority of replaceable frequency bands, as the best band (S3210).

In the examples of FIGS. 23 and 27, if a use channel is channel number 6, the total number of use channels belonging to band 2 is 5. Accordingly, since the number of channels required to be replaced is 5, frequency bands having five waiting channels in the waiting channel group are band 1 and band 3. In band 1 and band 3, band 1 has higher communication distance priority than band 3. Accordingly, the channel selecting unit 13x may select band 1 as the best band.

While the channel replacement unit 13w instructs the wireless transceiver 12 to replace a frequency band to which a bad channel belongs with the selected best band (S3220), the channel selecting unit 13x changes band 3 of the waiting channel group of the channel state table from the waiting state to the use state and changes band 2 to which the replaced use channel belongs from the use state to the replacement state and then process is ended (S3230).

If it is determined at S3200 that a setting is not a communication distance priority mode, it is determined at S3240 whether or not a setting is an interference avoidance priority mode. If it is determined that a setting is not an interference avoidance priority mode, the process is ended.

If it is determined that a setting is an interference avoidance priority mode, the channel selecting unit 13x acquires a frequency band having high interference avoidance priority among replaceable frequency bands in the waiting channel group, as the best band by referring to the channel state table (S3250).

In the examples of FIGS. 23 and 27, if a use channel is channel number 6, the total number of use channels belonging to band 2 is 5. Accordingly, since the number of channels required to be replaced is 5, frequency bands having five waiting channels in the waiting channel group are band 1 and band 3. In band 1 and band 3, band 3 has higher communication distance priority than band 1. Accordingly, the channel selecting unit 13x may select band 3 as the best band.

Upon receiving a replacement instruction, the wireless transceiver 12 performs channel replacement between communication counterpart devices. This channel replacement will be described with reference to FIG. 36. FIG. 36 is a flow chart showing a state where channel replacement is performed between communication counterpart devices.

For example, between the master apparatus 20 and the slave apparatus 30, it is assumed that slot 1 is used from the slave apparatus 30 to the master apparatus 20 and slot 7 is used from the master apparatus 20 to the slave apparatus 30. If a channel replacement event occurs in the slave apparatus 30, the slave apparatus 30 informs the master apparatus 20 of the channel replacement and a channel number of a replacement destination through slot 1. The master apparatus 20 informs the slave apparatus 30 of allowance for the channel replacement through slot 7. According to the information from the slave apparatus 30, the master apparatus 20 turns a use channel being used into a replacement state while performing a channel state table update that a waiting channel of a replaced waiting channel group is being used.

The slave apparatus 30 transmits data through slot 1 with a channel belonging to the replaced waiting channel group as a new use channel. The master apparatus 20 transmits data through slot 7 using the new use channel. Here, the slots are not changed.

In this manner, if an interference electric wave as a noise interferes in a use channel, it is possible to maintain good communication by switching the use channel to any channel belonging to a waiting channel group of other frequency bands based on the channel/slot reception electric field intensity map.

In addition, as shown in FIGS. 24A and 24B, even if there exist a plurality of channels which can be allocated to a frequency band, by dividing the channels into a usual use channel group and a waiting channel group and limiting the number of usual use channels, it is possible to reduce time taken to establish synchronization between the slave apparatus 30 and the master apparatus 20, for example. Since the slave apparatus 30 attempts to establish synchronization by receiving beacons transmitted from the master apparatus 20 while scanning the usual use channels, if a great number of channels are allocated for communication, all the channels are scanned in the worst case, which results in delay of notification of communication initiation from the slave apparatus 30 to the master apparatus 20. Accordingly, by limiting channels as the usual use channel group, synchronization can be established quickly and the slave apparatus 30 may not have high processing capability.

In addition, as the replacement method selecting unit 13v can select one of the single channel replacement and the replacement of channels of different frequency bands, since it is possible to cope with an effect of interference electric waves on both of a single channel and the entire frequency bands, it is possible to secure high communication quality through more dynamic channel replacement. As the replacement method selecting unit 13v checks an error counter based on the error channel/slot map and selects channel replacement for each frequency band if an error occurs in a frequency band to which a use channel belongs, it is possible to detect an effect of interference electric waves on the entire frequency bands.

While the second embodiment has been illustrated in the above, the present invention is not limited to the second embodiment. For example, as shown in FIGS. 37A and 37B, channels may be alternately allocated in the usual use channel group and the waiting channel group.

In addition, for selection of channels belonging to the waiting channel group to be replaced for a use channel by means of the channel selecting unit 13x, a channel having the smallest number of reception electric field intensity data may be selected by referring to the channel/slot reception electric field intensity map. Thus, it is possible to select a channel, which is little affected by an interference electric wave, from the waiting channel group.

In addition, while the wireless communication apparatus has been illustrated with the cordless telephone system in the second embodiment, the same effect can be achieved even when the present invention is applied to time division-based communication between wireless communication apparatuses such as, for example, communication between mobile telephones and base stations.

In addition, since the communication distance of the frequency band 1 (1.9 GHz band) having a long wavelength at the same transmission power is the largest and a communication distance becomes smaller as a wavelength becomes shorter, priority is set in order of long wavelength in the frequency band 1 to 3 in the second embodiment. However, if transmission power is different in the frequency bands, a relation between priority and a frequency band may be different from the example in the second embodiment. Transmission power which can be set in each frequency band is specified according to national wireless standards and there is a need to set transmission power to be lower in one frequency band than in other frequency bands according to circumstances of every nation. In that case, since a communication distance can not be secured even with a long wavelength, priority of frequency bands is rated using both of wavelength and transmission power.

Third Embodiment

A wireless communication apparatus according to a third embodiment will be described by way of example of a cordless telephone system with reference to the drawings. A cordless telephone system according to a third embodiment has the same configuration as that of the first embodiment shown in FIG. 1. The frequency bands and channels used by the cordless telephone system shown in FIG. 1 are as shown in FIGS. 2A and 2B used for the first embodiment.

A cordless telephone system 10 shown in FIG. 1 includes one master apparatus 20 connected to a telephone line L and three slave apparatuses 30(A to C) which conduct TDMA-based communication with the master apparatus 20. In the wireless communication between the master apparatus 20 and the slave apparatuses 30 used herein, six slots are used in each of up and down links, with one frame constituted by twelve slots (see FIG. 40).

Figure 40:
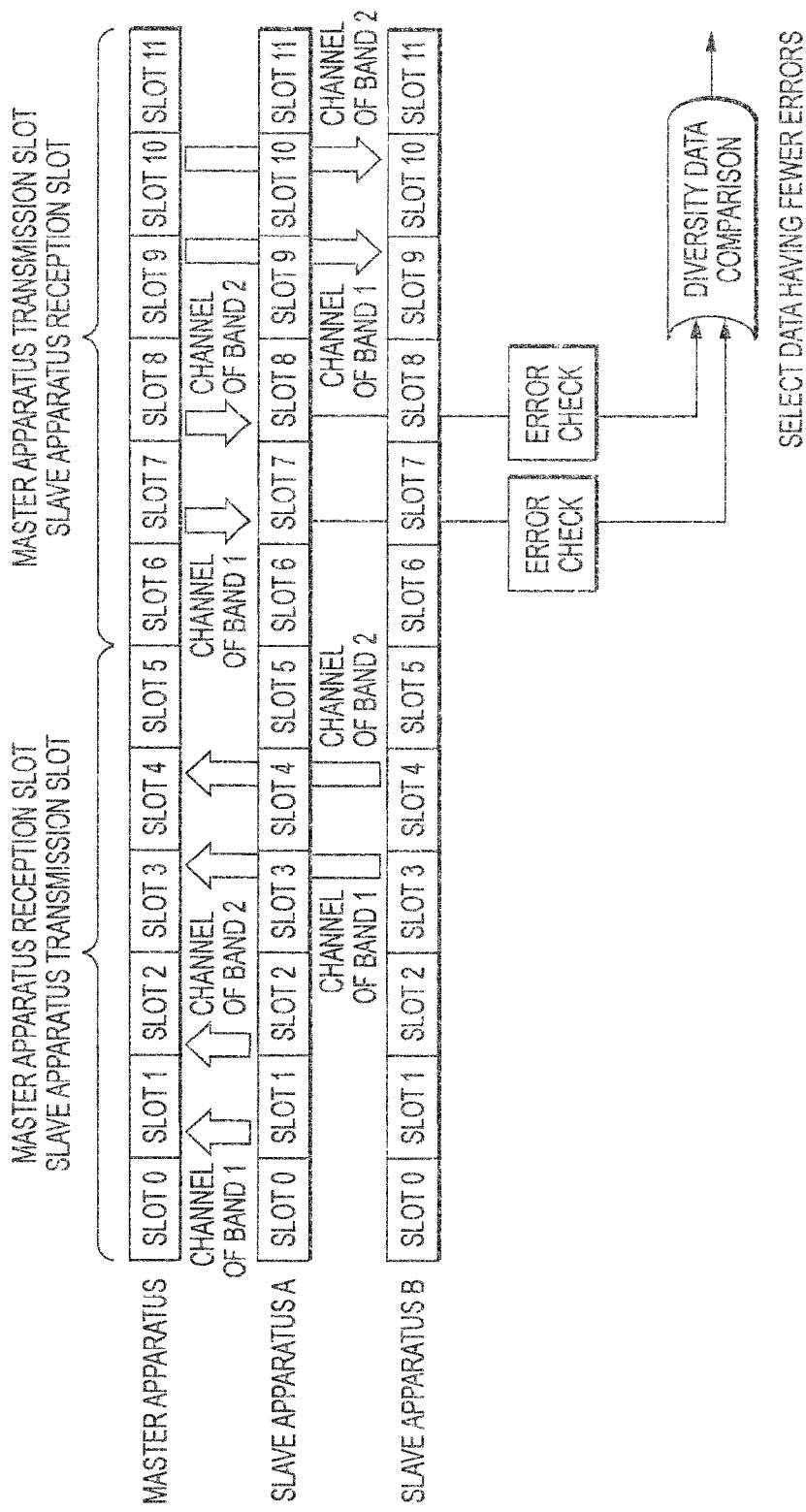
FIG. 40 shows a frame structure.

FIG. 40 shows a frame structure. In a frame structure with which the master apparatus 20 communicates with the slave apparatuses 30(A to C) as shown in FIG. 40, one frame consists of twelve slots, the first half six slots being used as master apparatus reception slots (or slave apparatus transmission slots) and the second half six slots being used as master apparatus transmission slots (or slave apparatus reception slots).

In the third embodiment, the same data are transmitted through two slots between the master apparatus 20 and the slave apparatus 30, and a reception side conducts slot diversity communication to select reception data of a good slot and process voice. In the example of FIG. 40, one slave apparatus A transmits data to the master apparatus 20 using slots 1 and 2, while another slave apparatus B transmits data to the master apparatus 20 using slots 3 and 4.

In the third embodiment, the master apparatus 20 and the slave apparatus 30 conduct communication therebetween using three different frequency bands. Specifically, five carrier frequencies (hereinafter called "channel") are allocated, as shown in FIG. 2B, in three frequency bands, i.e., a 1.9 GHz band (band 1), a 2.4 GHz band (band 2) and a 5.8 GHz band (band 3) as shown in FIG. 2A, respectively, and communication is conducted using one of the five channels.

A channel in use may be set for each slot and is switched to a channel to be used in a slot of a switching destination when a slot is changed. Hereinafter, a two-dimensional matrix consisting of channels on a frequency axis and slots on a time axis is called "channel/slot." (reception electric field intensity is measured for each channel/slot and is recorded as shown in FIG. 9.) Here, one of two channel/slots used in slot diversity is called first channel/slot and the other is called second channel/slot.

Figure 38:
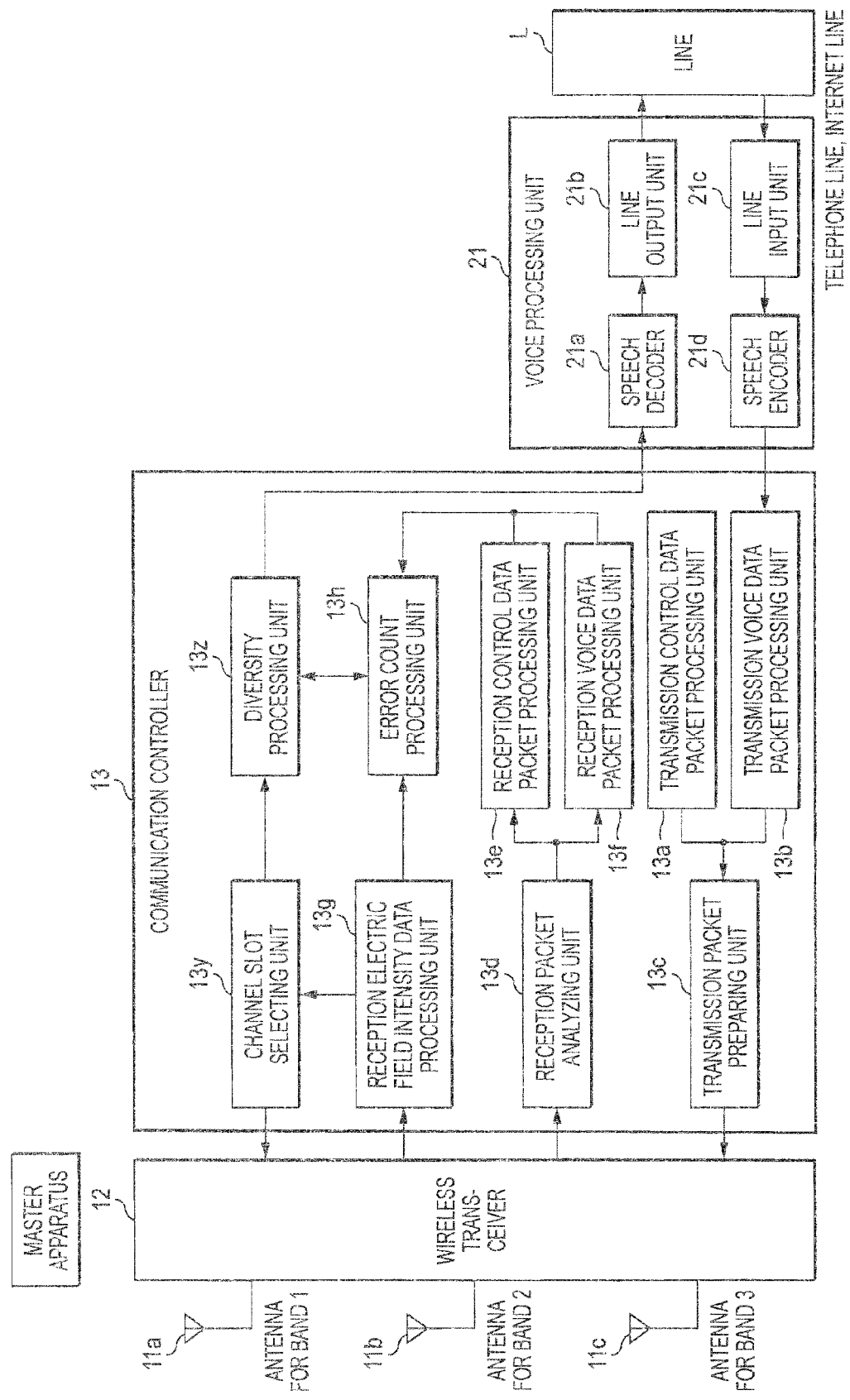
FIG. 38 is a block diagram showing a configuration of a master apparatus of the cordless telephone system shown in FIG. 1.
Figure 39:
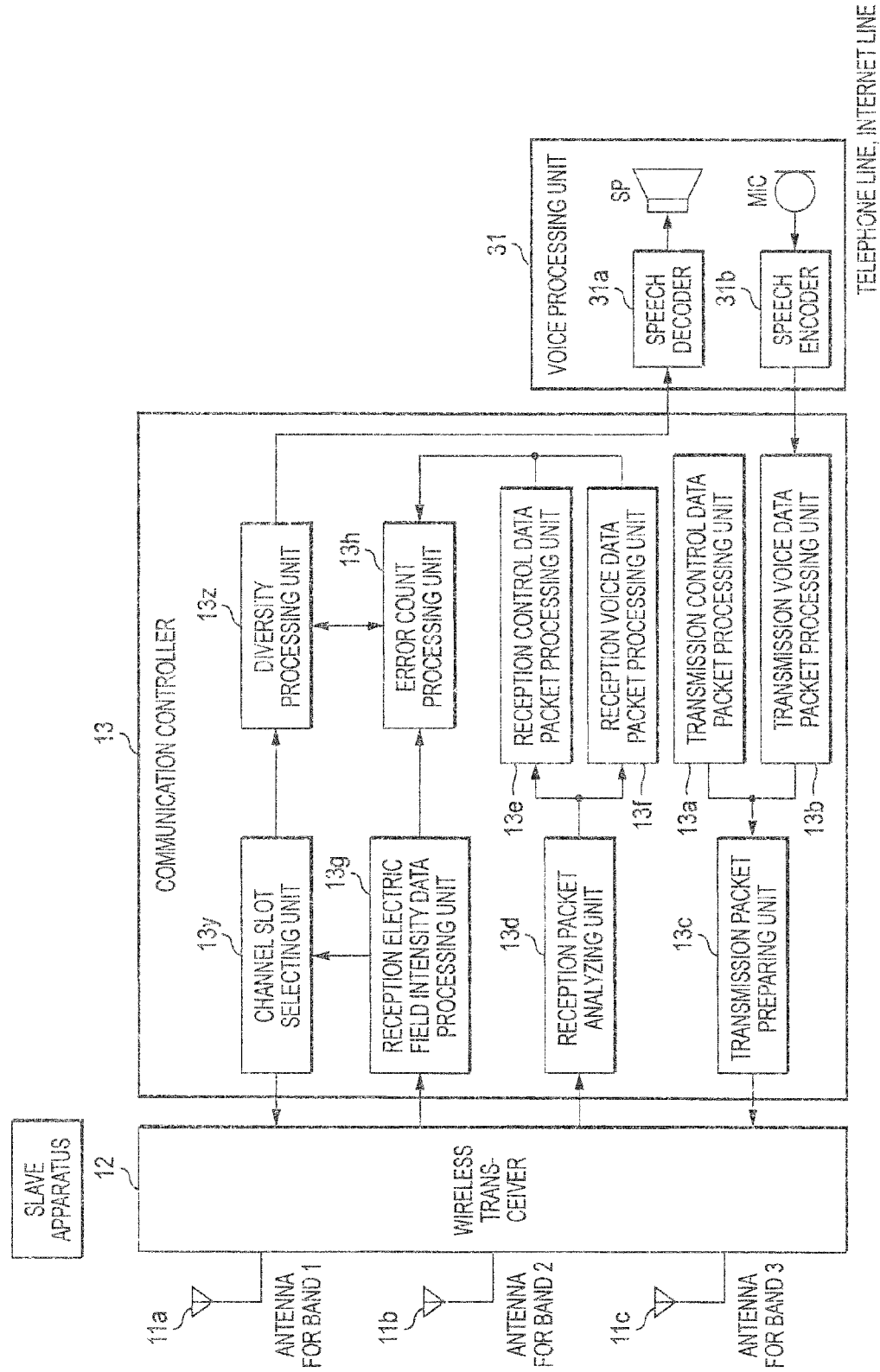
FIG. 39 is a block diagram showing a configuration of a slave apparatus of the cordless telephone system shown in FIG. 1.

Next, a configuration of the master apparatus 20 and slave apparatuses 30 will be described in detail with reference to FIGS. 38 to 39. FIG. 38 is a block diagram showing a configuration of the master apparatus of the cordless telephone system shown in FIG. 1. FIG. 39 is a block diagram showing a configuration of the slave apparatus of the cordless telephone system shown in FIG. 1. In FIGS. 38 and 39, the same components as FIGS. 3 and 4 used for the first embodiment are denoted by the same reference numerals. In FIG. 38, the master apparatus 20 includes antennas 11a to 11c for bands 1 to 3, a wireless transceiver 12, a communication controller 13 and a voice processing unit 21.

The antennas 11a to 11c for bands 1 to 3 are antennas having a characteristic suitable for transmission reception of electric waves of respective frequency bands. For wireless communication with the slave apparatuses 30, the wireless transceiver 12 selectively switches one frequency band of bands 1 to 3 and conducts wireless communication with the slave apparatuses 30.

The communication controller 13 selects an optimal frequency band and directs use channel/slots to the wireless transceiver 12 in wireless communication with the slave apparatus 30. One (first channel/slot) of two channel/slots is set to be different from the other (second channel/slot) in frequency band to which respective channels belong.

If a use channel/slot is supposed to be changed, the communication controller 13 selects a frequency band of a switching destination according a determination process to be described later, and directs new channel/slots having a frequency band different from the frequency band to which respective channels of the first and second channel/slots belong. In this manner, channels of different frequency bands are necessarily used in the two slots used in the slot diversity.

The communication controller 13 includes a transmission control data packet processing unit 13a, a transmission voice data packet processing unit 13b, a transmission packet preparing unit 13c, a reception packet analyzing unit 13d, a reception control data packet processing unit 13e and a reception voice data packet processing unit 13f. In addition, the communication controller 13 includes a reception electric field intensity data processing unit 13g, an error count processing unit 13h, a channel/slot selecting unit 13y and a diversity processing unit 13z.

Hereinafter, various components of the communication controller 13 will be described in detail. The transmission control data packet processing unit 13a adds CRC which is an error detection code generated for communication control data. The transmission voice data packet processing unit 13b adds CRC generated for voice data.

The transmission packet preparing unit 13c combines the communication control data generated in the transmission control data packet processing unit 13a and the voice data generated in the transmission voice data packet processing unit 13b to generate packets to be transmitted by the wireless transceiver 12.

The reception packet analyzing unit 13d analyzes the packets received through the wireless transceiver 12 and separates the received packets into the control data and the voice data.

The reception control data packet processing unit 13e processes the communication control data. In addition, the reception control data packet processing unit 13e functions as a reception error detecting unit by detecting a reception error by the CRC added to the communication control data and outputting a value corresponding to the detected reception error (a reception error value) as reception error information.

The reception voice data packet processing unit 13f has a function to process the voice data. In addition, the reception voice data packet processing unit 13f functions as a reception error detecting unit by detecting a reception error by the CRC added to the voice data and outputting a value corresponding to the detected reception error (a reception error value) as reception error information.

The reception electric field intensity data processing unit 13g measures electric field intensity of each slot of each channel in each frequency band, stores it as reception electric field intensity data, determines whether or not slots are good based on the measured electric field intensity, or totals the number of good slots to set slot priority.

The error count processing unit 13h counts up an error counter when a reception error occurs.

The channel/slot selecting unit 13y selects a channel to be used as a first channel of channels determined as good based on the reception electric field intensity data and selects a channel to be used as a second channel in a frequency band other than the frequency band of the first channel.

The diversity processing unit 13z compares reception error information of respective slots and employs data of a good slot as reception data. The master apparatus 20 transmits the reception data employed in the diversity processing unit 13z to the line L through the voice processing unit 21. The slave apparatus 30 transmits the reception data employed in the diversity processing unit 13z to the voice processing unit 31.

The voice processing unit 21 of the master apparatus 20 decodes the voice data from the communication controller 13 by means of a speech decoder 21a and outputs the decoded voice data to the line L through a line output unit 21b, or codes a signal input from the line L through a line input unit 21c into voice data by means of a speech encoder 21d and outputs the voice data to the communication controller 13.

Although it has been illustrated in the third embodiment that the master apparatus 20 is the cordless telephone system 10 connected to the line L, the master apparatus 20 may be an IP telephone when the voice processing unit 21 is connected to Internet.

Next, the slave apparatus 30 will be described with reference to FIG. 39. While the voice input output unit in the master apparatus 20 shown FIG. 38 is the line L, the voice input output unit in the slave apparatus 30 is a speaker SP and a microphone MIC. The slave apparatus 30 has substantially the same configuration for TDMA communication as the master apparatus 20 shown in FIG. 38 except for the voice input output, and so components having the same function as the master apparatus 20 are denoted by the same reference numerals and explanation thereof in the slave apparatus 30 will be omitted. If the master apparatus 20 conducts TDMA communication with the slave apparatus 30, they have a master slave relation, that is, the master apparatus 20 act as a master and the slave apparatus 30 acts as a slave.

The slave apparatus 30 includes antennas 11a to 11c for bands 1 to 3, a wireless transceiver 12, a communication controller 13 and a voice processing unit 31.

The voice processing unit 31 decodes voice data from the communication controller 13 by means of a speech decoder 31a and outputs the decoded voice data to the speaker SP, or codes a signal input through the microphone MIC into voice data by means of a speech encoder 31b and outputs the voice data to the communication controller 13.

Operation of the above-configured cordless telephone system according to the third embodiment will be described.

In the example of FIG. 40, one slave apparatus A transmits data to the master apparatus 20 using slots 1 and 2, while another slave apparatus B transmits data to the master apparatus 20 using slots 3 and 4. In addition, the master apparatus 20 transmits data to the slave apparatus A using the slot 7 and the slot 8, and transmits data to the slave apparatus B using the slot 9 and the slot 10.

In the third embodiment, two slots in a predetermined channel communicating between the master apparatus 20 and the slave apparatus 30 are called first channel/slot and second channel/slot, respectively.

The communication controller 13 of the master apparatus 20 or the slave apparatus 30 performs a background scan to measure reception electric field intensity for each slot of each channel of each frequency band (bands 1 to 3) by executing a sequence of good channel information storage (FIG. 7) in a waiting state in order to allocate the first channel/slot and the second channel/slot used for communication. According to a result of the background scan, the channel/slot selecting unit 13y allocates the first channel/slot and the second channel/slot.

FIG. 7 is a flow chart showing a sequence of good channel information storage. The master apparatus 20 and the slave apparatus 30 record good channel information by measuring electric field intensity in each reception slot during the background scan. FIG. 8 shows a channel/slot reception electric field intensity map, FIG. 9 shows a good channel/slot map, and FIG. 10 shows an error channel/slot map.

In FIG. 7, at S210, the error count processing unit 13h measures electric field intensity of a predetermined slot. This measurement is made when the reception electric field intensity data processing unit 13g instructs the wireless transceiver 12 to do so.

A result of the measurement is stored, as a channel/slot reception electric field intensity map shown in FIG. 8, in the reception electric field intensity data processing unit 13g. This channel/slot reception electric field intensity map is a table storing the measured electric field intensity as reception electric field intensity data for each slot in association with a channel number allocated for each frequency band. The electric field intensity measured at S210 is stored in a corresponding location in the channel/slot reception electric field intensity map.

The example of FIG. 8 shows a result after all channel/slots for respective frequency bands are subjected to a background scan, and electric field intensities are stored in respective locations of the channel/slot reception electric field intensity map.

At S220, the reception electric field intensity data processing unit 13g determines whether or not the measured electric field intensity is lower than a predetermined value. If it is determined that the measured electric field intensity is lower than a predetermined value, it may mean that there is no or little interference electric wave. Then, at S230, a marking is made which indicates that corresponding channel/slots are good. The marking indicating the goodness at S230 of FIG. 7 is stored as a good channel/slot map shown in FIG. 9. In other words, if the electric field intensity of each slot of a channel number of a corresponding frequency band is less than a predetermined value, it is stored as good, and otherwise, if the electric field intensity is equal to or more than the predetermined value, it is stored as bad. The predetermined value may be determined in a suitable manner.

If it is determined at S220 of FIG. 7 that the measured electric field intensity is equal to or more than the predetermined value, it may mean that an interference electric wave is detected in a slot of the measured channel. Then, at S240, a marking is made which indicates that corresponding channel/slots are bad.

At S250, the reception electric field intensity data processing unit 13g counts up the error counter. This error counter is counted up based on the determination at S220 that the measured electric field intensity is equal to or more than the predetermined value, and the count-up is stored, as an error channel/slot map shown in FIG. 10, in the reception electric field intensity data processing unit 13g. That is, in addition to a CRC error occurring in wireless communication, if an interference electric wave is detected in electric field intensity measurement for interference electric waves, the error counter is counted up as an error.

In this manner, the good channel/slot map or the error channel/slot map is updated (S260).

When the sequence of good channel information storage is ended, a sequence of good frequency band information storage is executed.

FIG. 11 is a flow chart showing a sequence of good frequency band information storage. In the sequence of good frequency band information storage shown in FIG. 11, first, at S310, the reception electric field intensity data processing unit 13g determines whether or not there is a setting that a degree of goodness of each frequency band is determined based on the total number of good channel/slots for each frequency band. If it is determined that there is a setting that the determination is made based on the total number of good channel/slots, the process proceeds to S320.

At S320, the reception electric field intensity data processing unit 13g acquires data from the good channel/slot map. At S330, the reception electric field intensity data processing unit 13g sums up the number of markings indicating goodness for each frequency band based on data from the good channel/slot map, and calculates good channel/slot priority information based on goodness markings. In the example of FIG. 9, the good channel/slot priority information is 20 in band 1, 30 in band 2 and 25 in band 3. Here, band 2 has high priority since it is the largest in the total number of good channel/slots, and band 1 has low priority since it is the smallest in the total number of good channel/slots.

In the examples of FIGS. 9 and 10, the channel/slot reception electric field intensity map and the good channel/slot map are to measure electric field intensity with each of channels of bands 1 to 3 as the minimal unit on a frequency axis and with each slot of TDMA as the minimal unit on a time axis and mark goodness badness on a two-dimension. In this manner, by marking the goodness badness for different slots even on the time axis, it is possible to detect situations of interference electric waves from the surroundings more closely and determine conditions in selection of the first and second channels precisely.

At S340, the reception electric field intensity data processing unit 13*g* sets frequency band priority based on the calculated good channel/slot priority information in such a manner that the frequency band priority becomes higher in an order of increasing in the total number of good channel/slots. In the example of FIG. 9, band 2 has high priority since it is the largest in the total number of good channel/slots, and band 1 has low priority since it is the smallest in the total number of good channel/slots.

If it is determined at S310 that there is a setting that the determination is not made based on the total number of good channel/slots, the process proceeds to S350.

At S350, the reception electric field intensity data processing unit 13*g* acquires data from the error channel/slot map. At S360, it performs a totaling operation for each frequency band based on each error counter of the error channel/slot map and calculates good channel/slot priority information by the error counter. In the example of FIG. 10 1 priority is 14 in band 1, 3 in band 2 and 9 in band 3.

At S370, the reception electric field intensity data processing unit 13*g* sets frequency band priority based on the calculated good channel/slot priority information in such a manner that the frequency band priority becomes higher in an order of decreasing in the total number of good channel/slots. In the example of FIG. 10, band 1 has low priority since it is the largest in the total number of good channel/slots, and band 2 has high priority since it is the smallest in the total number of good channel/slots.

In this manner, according to the sequence of good channel information storage and the sequence of good frequency band information storage, the reception electric field intensity is measured for each slot of each channel of each frequency band, and the channel/slot reception electric field intensity map, the good channel/slot map and the error channel/slot map are created based on the measured reception electric field intensity.

Next, the first channel/slot and the second channel/slot are allocated.

Figure 41:
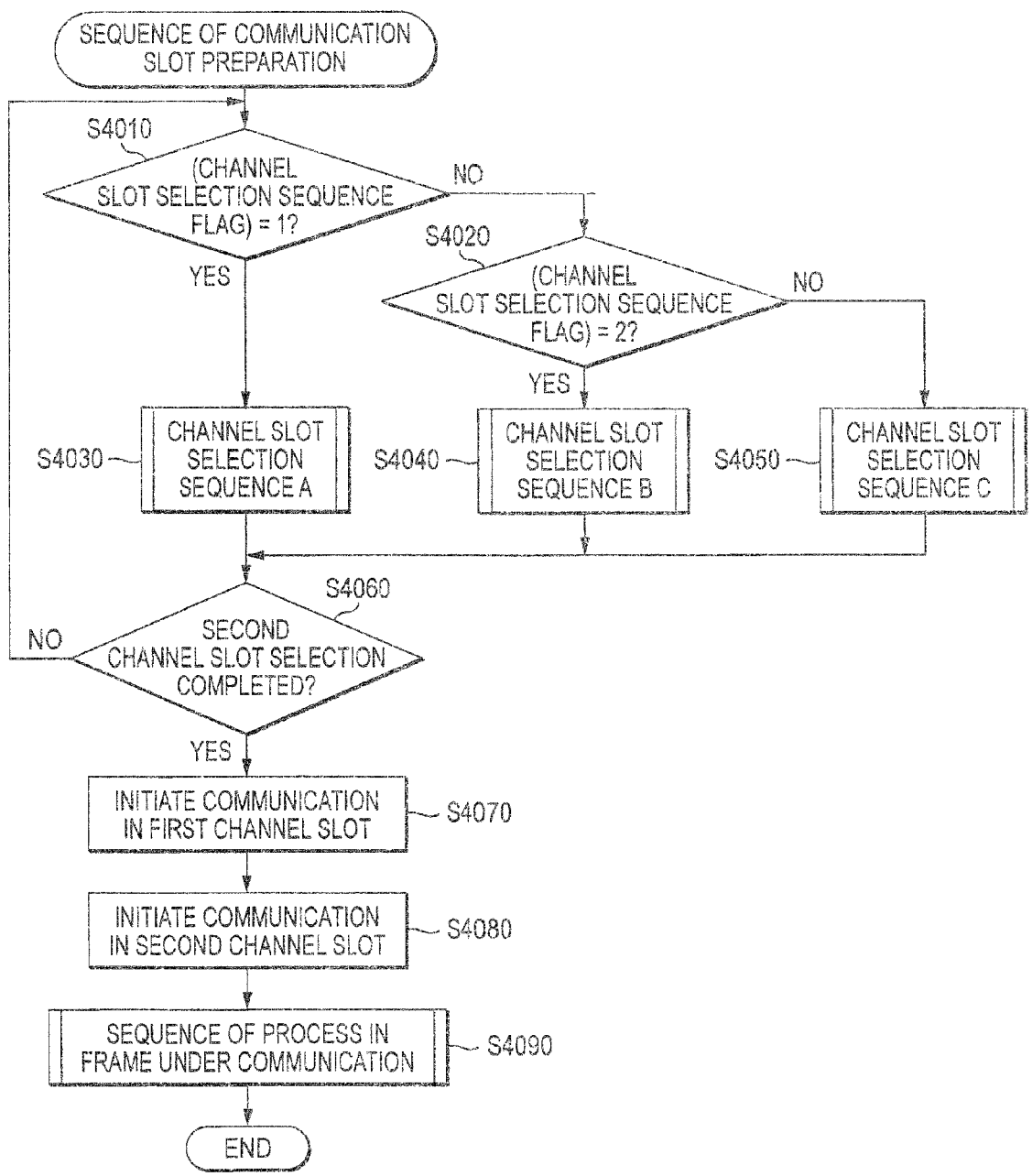
FIG. 41 is a flow chart showing a sequence of communication slot preparation.
Figure 42:
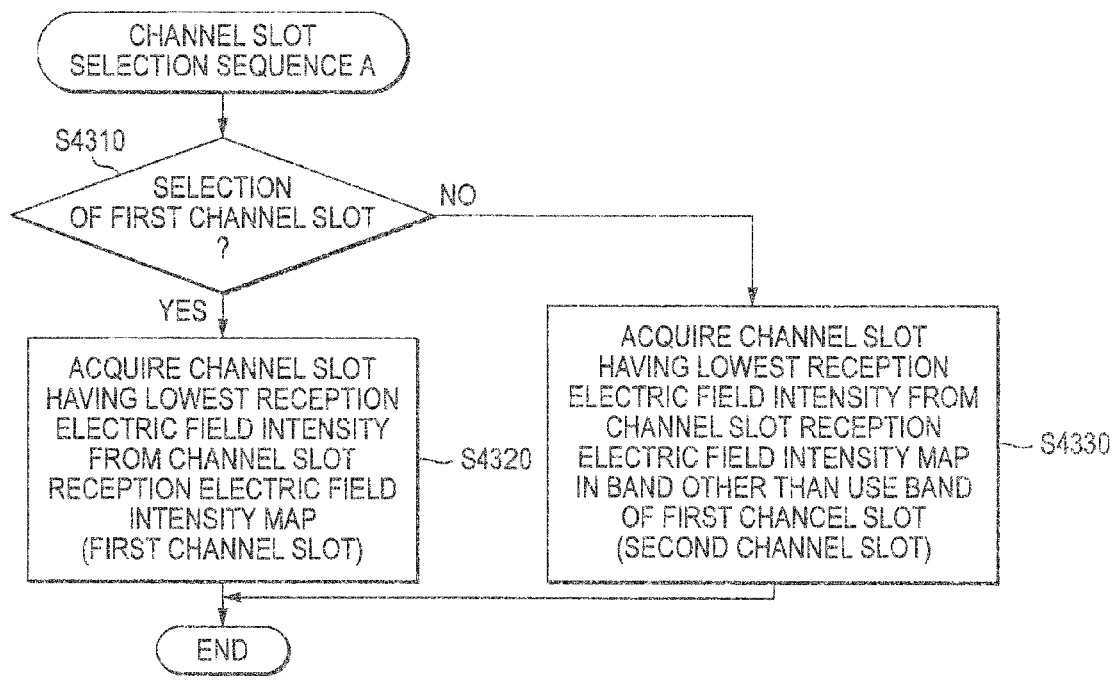
FIG. 42 is a flow chart showing a channel/slot selection sequence A.
Figure 43:
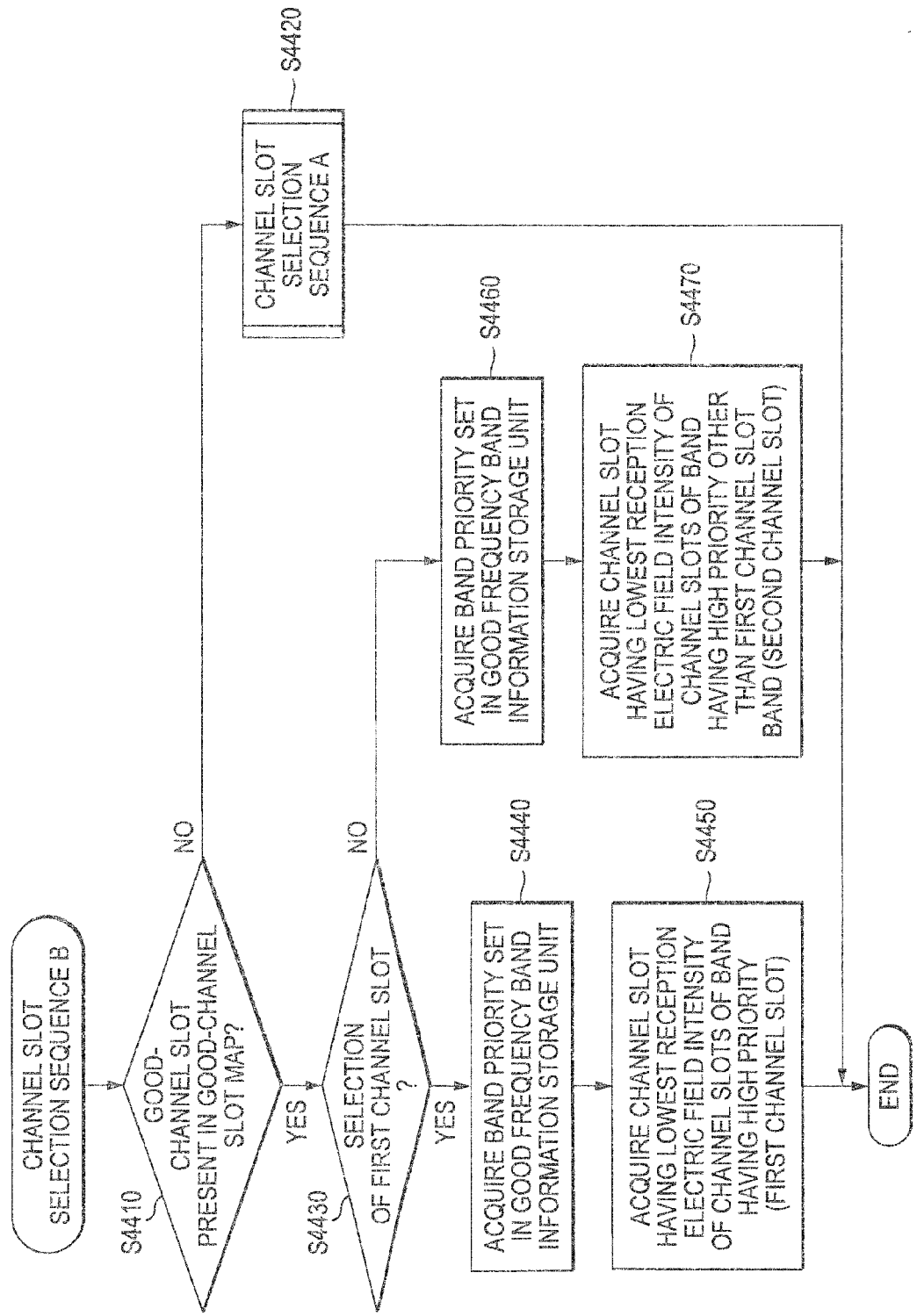
FIG. 43 is a flow chart showing a channel/slot selection sequence B.
Figure 44:
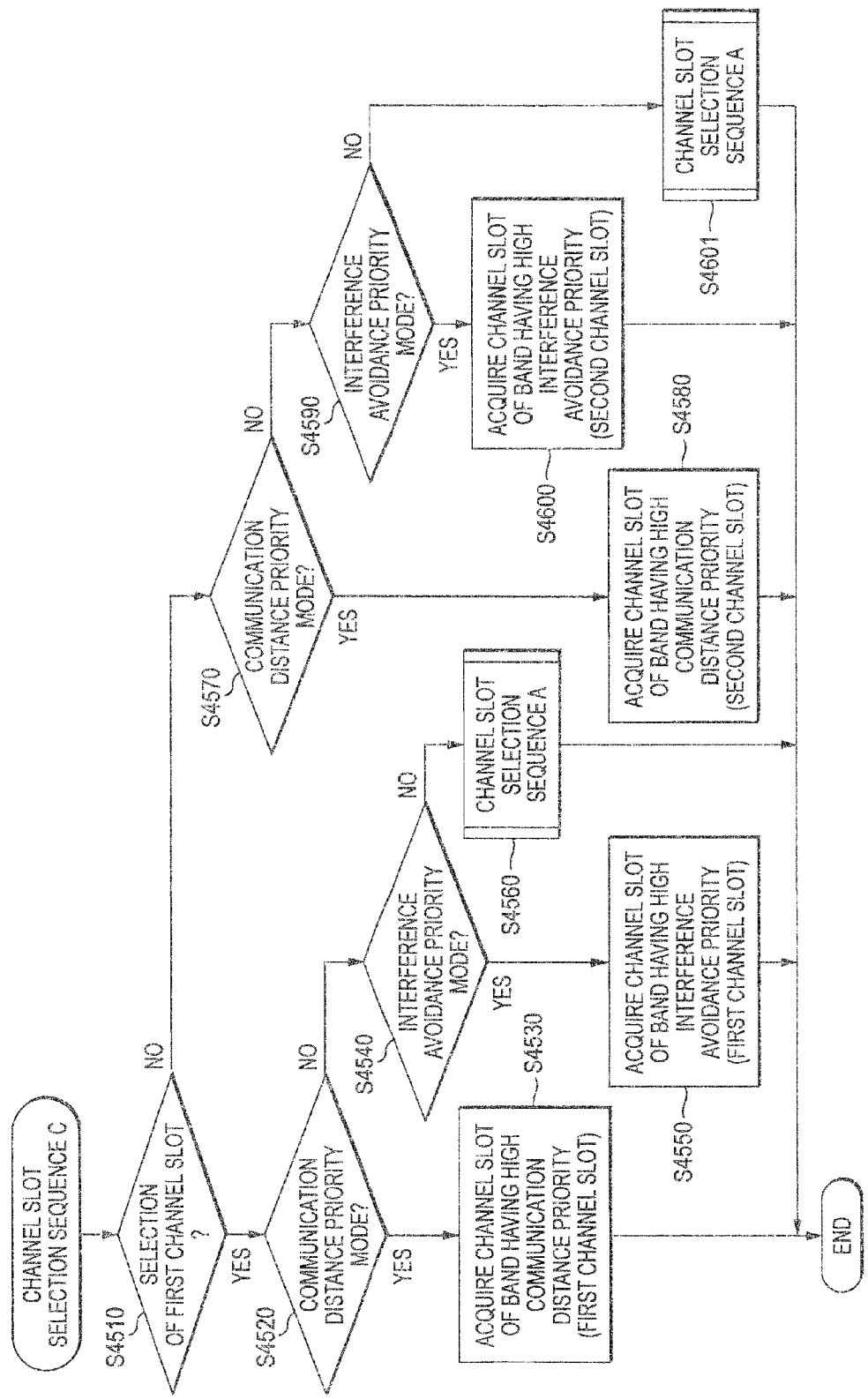
FIG. 44 is a flow chart showing a channel/slot selection sequence C.

FIG. 41 is a flow chart showing a sequence of communication slot preparation processed by the channel/slot selecting unit 13*y*. FIGS. 42 to 44 are flow charts showing sequences A to C of channel/slot selection. The sequences A, B and C of channel/slot selection are switched according to a channel/slot selection sequence flag.

In FIG. 41, first, at S4010 and S4020, a value of channel/slot selection sequence flag is determined. For example, if the channel/slot selection sequence flag is 1, the process proceeds from S4010 to S4030 where the channel/slot selection sequence A is executed. If the channel/slot selection sequence flag is 2, the process proceeds from S4020 to S4040 where the channel/slot selection sequence B is executed. If the channel/slot selection sequence flag is not 1 and is equal to or more than 2, the process proceeds from S4020 to S4050 where the channel/slot selection sequence C is executed. When these sequences A to C of channel/slot selection are executed, the first channel/slot is first selected. In this embodiment, after first selecting the first channel/slot, the second channel/slot is selected.

Subsequently, at S4060, it is determined whether or not selection of the second channel/slot is completed. If only the first channel/slot is selected (the second channel/slot not selected), the process proceeds to S4010 where the second channel/slot is selected in the same order as the first channel/slot.

Here, the channel/slot selection sequence A processed at S4030 will be described with reference to FIG. 42.

In the channel/slot selection sequence A, first, at S4310, it is determined whether or not a selection order at that time is for selection of the first channel/slot. If it is determined that a selection order at that time is for selection of the first channel/slot (YES), at S4320, a channel/slot of a frequency band having the lowest reception electric field intensity in the channel/slot reception electric field intensity map (see FIG. 8) is acquired. In the example of FIG. 8, slot 1 of channel number 8 of band 2 has the lowest value (−90 dBm). The channel/slot selecting unit 13*y* selects it as the first channel/slot.

If it is determined at S4310 that a selection order at that time is not for selection of the first channel/slot, at S4330, as selection of the second channel/slot, a channel/slot of a frequency band which is out of the frequency band allocated for the first channel/slot and has the lowest reception electric field intensity in the channel/slot reception electric field intensity map (see FIG. 8) is acquired. That is, when slot 1 (−90 dBm) of channel number 8 of band 2 is selected as the first channel/slot, one selected of slots having reception electric field intensity of −85 dBm other than slot 1, which is one channel of other band 1 or band 3, is set as the second channel/slot.

In this manner, by selecting the first and second channel/slots having different frequency bands, it is possible to select channel/slots having the best communication environments at this point, respectively.

Next, the channel/slot selection sequence B processed at S4040 will be described with reference to FIG. 43.

In the channel/slot selection sequence B, first, at S4410, it is determined whether or not a good channel/slot is present in the good channel/slot (see FIG. 9). If it is determined that no good channel/slot is present, at S4420, the above channel/slot selection sequence A is processed to select the first and second channel/slots, and the process is ended.

If it is determined at S4410 that a good channel/slot is present, at S4430, it is determined whether or not a selection order at that time is for selection of the first channel/slot. If it is determined that a selection order at that time is for selection of the first channel/slot (YES), at S4440, an order set by good channel/slot priority information (see FIG. 9) by goodness markings set in the above sequence of good frequency band information storage or good channel/slot priority information (see FIG. 10) by an error counter is acquired.

At S4450, a channel/slot having a frequency band highest in this order and the lowest reception electric field intensity is acquired from the channel/slot reception electric field intensity map, and the acquired channel/slot is set as the first channel/slot.

If it is determined at S4330 that a selection order at that time is not for selection of the first channel/slot (NO), at S4460, an order set by the good channel/slot priority information by goodness markings set in the sequence of good frequency band information storage or the good channel/slot priority information by the error counter is acquired.

At S4470, a channel/slot having the highest order frequency band other than the frequency band allocated for the first channel/slot and the lowest reception electric field intensity is acquired from the channel/slot reception electric field intensity map, and the acquired channel/slot is set as the second channel/slot.

In this manner, by selecting the first and second channel/slots having different frequency bands in channels determined as good based on the reception electric field intensity data, it is possible to select good frequency bands generally. In particular, with priority by the good channel/slot priority information calculated based on the goodness markings, since a degree of goodness can be determined based on the measured reception electric field intensity, it is possible to select frequency bands which insignificantly affected by interference electric waves at this point. In addition, with priority by the good channel/slot priority information calculated based on the error counter, since a degree of goodness can be determined based on small sum-up of the error counter, it is possible to select frequency bands insignificantly affected by interference electric waves from a statistical point of view.

Next, the channel/slot selection sequence C processed at S4050 will be described with reference to FIG. 44. In the channel/slot selection sequence C, a channel/slot is selected based on setting information indicating whether a setting is a communication distance priority mode or an interference avoidance priority mode.

In the channel/slot selection sequence C, first, at S4510, it is determined whether or not a selection order at that time is for selection of the first channel/slot. If it is determined that a selection order at that time is for selection of the first channel/slot (YES), at S4520, it is determined whether or not a setting is a communication distance priority mode. Whether or not a setting is a communication distance priority mode is preset.

If it is determined that a setting is a communication distance priority mode, at S4530, a channel/slot of a frequency band having high communication distance priority is set as the first channel/slot.

If it is determined at S4520 that a setting is not a communication distance priority mode, at S4540, it is determined whether or not a setting is an interference avoidance priority mode. Whether or not a setting is an interference avoidance priority mode is preset.

If it is determined that a setting is an interference avoidance priority mode, at S4550, a channel/slot of a frequency band having high interference avoidance priority is set as the first channel/slot.

If it is determined at S4540 that a setting is not an interference avoidance priority mode, at S4560, the channel/slot selection sequence A is executed.

If it is determined at S4510 that a selection order at that time is not for selection of the first channel/slot (NO), at S4570, it is determined whether or not a setting is a communication distance priority mode. If it is determined that a setting is a communication distance priority mode, at S4580, a channel/slot of a frequency band, which is out of the frequency band allocated for the first channel/slot and has the highest communication distance priority, is set as the second channel/slot.

If it is determined that a setting is not a communication distance priority mode, at S4590, it is determined whether or not a setting is an interference avoidance priority mode. If it is determined that a setting is an interference avoidance priority mode, at S4600, a channel/slot of a frequency band, which is out of the frequency band allocated for the first channel/slot and has the highest interference avoidance priority, is set as the second channel/slot.

If it is determined at S4590 that a setting is not an interference avoidance priority mode, at S4601, the channel/slot selection sequence A is processed to select the first and second channel/slots, and the process is ended. That is, if a setting is neither a communication distance priority mode nor an interference avoidance priority mode, the channel/slot selection sequence A is processed to select the first and second channel/slots.

Here, the communication distance priority will be described in detail. In general, as a frequency becomes lower (a wavelength becomes longer), an arrival distance becomes relatively longer at the same transmission power. In this embodiment, as frequency bands (bands 1 to 3), three frequency bands, that is, a 1.9 GHz band, a 2.4 GHz band and a 5.8 GHz band, are used. At the same transmission power, a communication distance of frequency band 1 (1.9 GHz band) is the longest, while a communication distance of frequency band 3 (5.8 GHz band) is the shortest. An order of communication distance is an order of increase of communication distance in bands 1 to 3. As the communication distance priority, the priority becomes higher in order of band 1, band 2 and band 3. Accordingly, in the communication distance priority mode, by allocating a band of the first channel/slot as first communication distance priority (band 1: 1.9 GHz) and allocating a band of the second channel/slot as second communication distance priority (band 2: 2.4 GHz), it is possible to increase a distance between the master apparatus 20 and the slave apparatus 30.

Next, the interference avoidance priority will be described in detail. The interference avoidance priority is an order of interference difficulty. For example, there exist many sources of interference electric waves, such as a microwave oven, a Wi-Fi as a wireless LAN and the like, in the 2.4 GHz frequency band of band 2. In addition, the 1.9 GHz frequency band is significantly affected by an interference electric wave since few channels, e.g., only five channels, can be allocated in this band according to a communication standard.

Accordingly, in the third embodiment, as the interference avoidance priority, the priority becomes higher in order of band 3, band 1 and band 2. Accordingly, in the interference avoidance priority mode, by allocating a band of the first channel/slot as first interference avoidance priority (band 3: 5.8 GHz) and allocating a band of the second channel/slot as second interference avoidance priority (band 1: 1.9 GHz), it is possible to provide interference-insensitive communication environments.

In this manner, when the selection of the second channel/slot is completed at S4580 or S4600, selection completion is determined at S4060 (FIG. 41), and the process proceeds to S4070.

At S4070, communication is conducted in the selected first channel/slot. At S4080, communication is conducted in the selected second channel/slot. At S4090, a sequence of process in a communication frame is executed.

Figure 45:
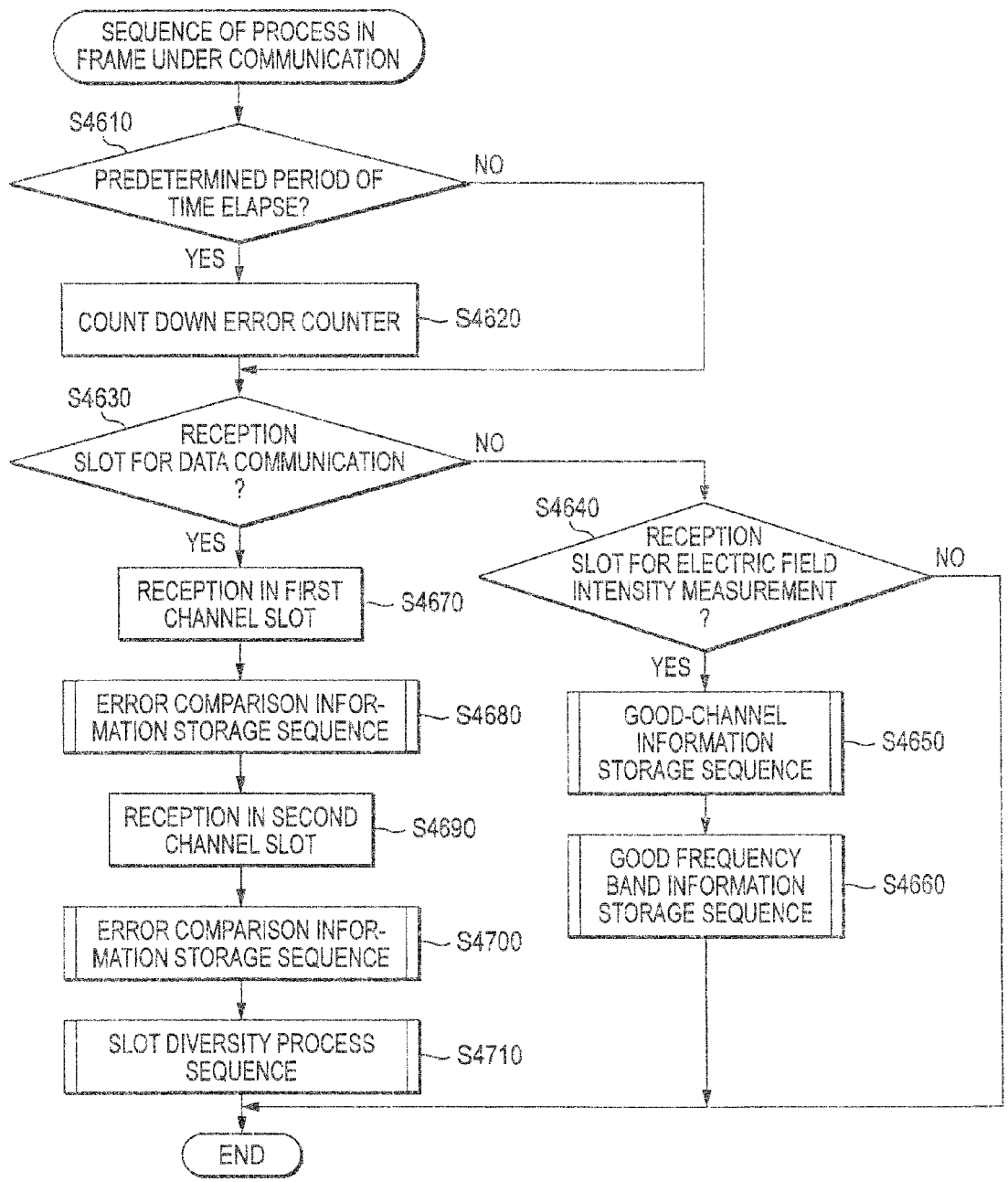
FIG. 45 is a flow chart showing a sequence of intraframe process during communication.

FIG. 45 is a flow chart showing a sequence of intraframe process during communication. Next, the sequence of intraframe process during communication will be described based on FIG. 45. In the sequence of intraframe process during communication, at S4610, the error count processing unit 13h determines whether or not a predetermined period of time elapses. The predetermined period of time is preferably a period of time during which a background scan makes a round of the entire slot of the entire channel of the entire frequency band. If it is determined at S4610 that the predetermined period of time elapses, at S4620, the error count processing unit 13h counts down an error counter of a slot of a corresponding channel. Details of the process in which the error count processing unit 13h counts down the error counter when the predetermined period of time elapses will be described later.

Next, at S4630, the communication controller 13 determines whether or not the slot at that time is a reception slot for data communication. That is, in case of the master apparatus 20, it is determined whether or not the slot at that time is a slot 0 to 5 shown in FIG. 40. If it is determined at S4630 that the slot at that time is not a reception slot for data communication, the process proceeds to S4640. At S4640, the reception electric field intensity data processing unit 13g determines whether or not the slot at that time is a reception slot for electric field intensity measurement. If it is determined that the slot at that time is a reception slot for electric field intensity measurement, at S4650, the reception electric field intensity data processing unit 13g executes the sequence of good channel information storage. If it is determined at S4640 that the slot at that time is not a reception slot for electric field intensity measurement, the process is ended.

In the sequence of good channel information storage, as described in detail above with reference to FIG. 7, the reception electric field intensity is measured and the contents of the channel/slot reception electric field intensity map (see FIG. 8) and the good channel/slot map are updated.

Next, at S4660, the sequence of good frequency band information storage is executed. In the sequence of good frequency band information storage, as described in detail above with reference to FIG. 11, priority for each frequency band is determined from good markings of the good channel/slot map or a value of the error counter of the error channel/slot map.

If it is determined at S4630 that the slot at that time is a reception slot for data communication, that is, in case of the master apparatus 20, it is determined that the slot at that time is a slot 0 to 5 shown in FIG. 40, at S4670, a reception operation is performed in the first channel/slot. When the reception operation is performed in the first channel/slot, at S4680, a sequence of error comparison information storage is executed.

Figure 46:
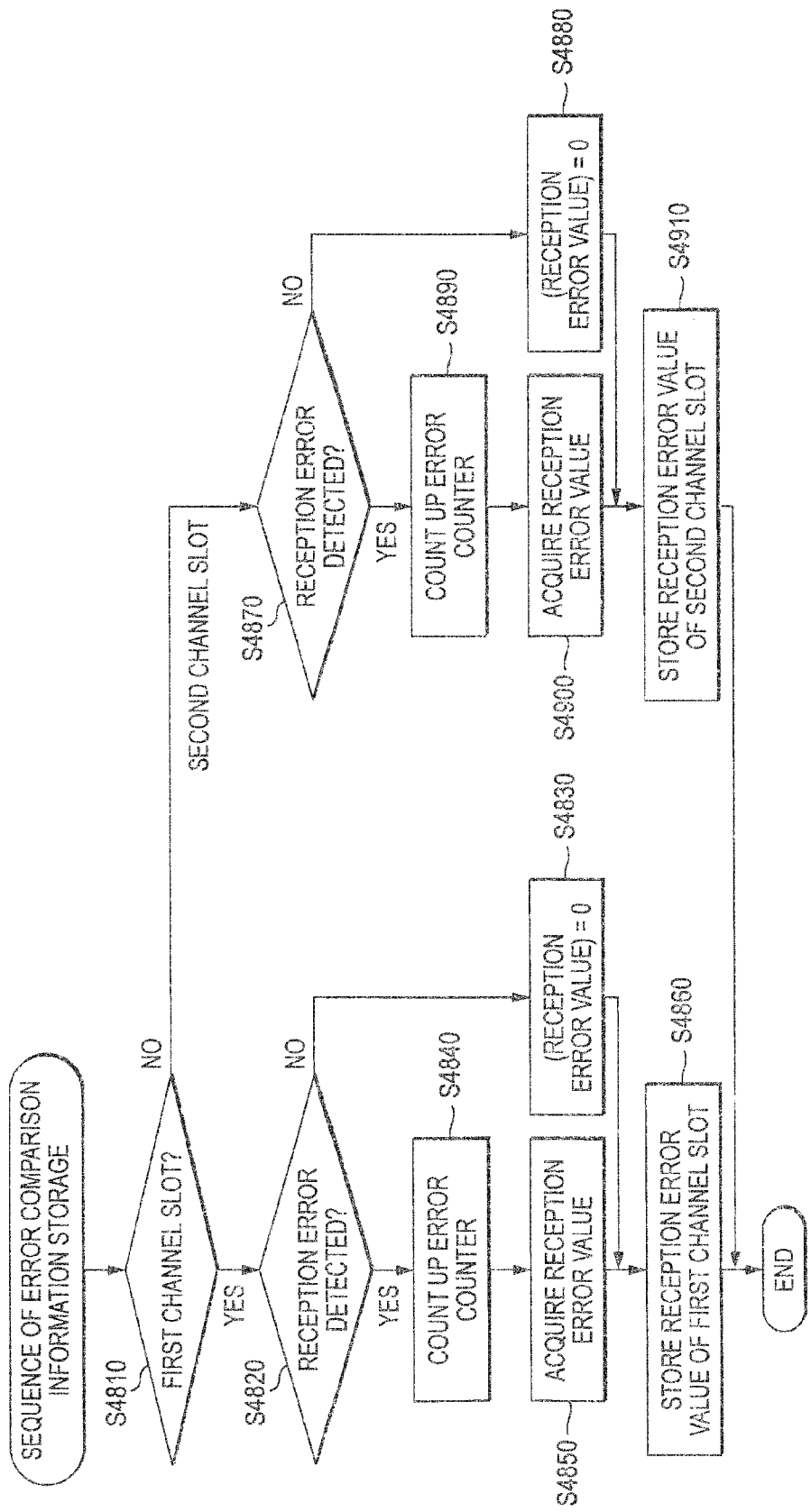
FIG. 46 is a flow chart showing a sequence of error comparison information storage.

FIG. 46 is a flow chart showing a sequence of error comparison information storage. In the sequence of error comparison information storage shown in FIG. 46, first, at S4810, the diversity processing unit 13z determines whether or not the slot at that time is the first channel/slot. In this case, since the slot is the first channel/slot, the process proceeds to S4820 where it is determined whether or not a reception error is detected.

FIG. 14 shows a slot format. Here, a reception error and a reception error value will be described with reference to FIG. 14.

As shown in FIG. 14, an reception error includes a synchronization error detected by checking a synch word and CRC (not shown) given to the synch word, and a packet error detected by checking communication data and CRC given to the communication data by means of the reception control data packet processing unit 13e. Although CRC is used as an error detection code in the third embodiment, other error detection codes may be used as long as they are code which can detect a reception error. In addition, the error detection code may be a code which can not only detect a reception error but also correct an error.

In the third embodiment, if communication data is voice data, one packet consists of four sub packets into which the voice data is divided, and CRCs given to the respective sub packets. That is, when a packet error is checked for each sub packet, the packet error may include one sub packet to four sub packets at maximum. In the error count processing unit 13h, a reception error value is set to 1 if a synch error occurs. If a sub packet error occurs, a reception error value is set to 1 to 4 depending on the number sub packets in which a reception error occurs. If no reception error occurs, a reception error value is always set to 0.

Accordingly, if no reception error is detected at S4820, at S4830, 0 is set as a reception error value.

If a reception error is detected at S4820, at S4840, the error count processing unit 13h counts up an error counter of a corresponding channel/slot of the error channel/slot map shown in FIG. 10.

Next, at S4850, a reception error value of the first channel/slot is acquired from the reception control data packet processing unit 13e and the reception voice data packet processing unit 13f. At S4860, the acquired reception error value is stored as the reception error value of the first channel/slot.

In this manner, count-up of the error counter and setting of the reception error of when the first channel/slot is received are performed.

Next, at S4690 of FIG. 45, a reception operation is performed in the second channel/slot. When a reception operation is performed in the second channel/slot, at S4700, a sequence of error comparison information storage is executed.

In the sequence of error comparison information storage shown in FIG. 46, first, at S4810, the diversity processing unit 13z determines whether or not the slot at that time is the first channel/slot. In this case, since the slot is the second channel/slot, the process proceeds to S4870 where it is determined whether or not a reception error is detected. If no reception error is detected, at S4880, 0 is set as a reception error value.

If a reception error is detected at S4870, at S4890, the error count processing unit 13h counts up an error counter of a corresponding channel/slot of the error channel/slot map shown in FIG. 10.

As each error counter of the error channel/slot map is counted up due to occurrence of a reception error or the like, priority allocated for each frequency band is lowered in the sequence of good frequency band information storage (see FIG. 11). When the predetermined period of time elapses at S4610 of FIG. 45, at S4620, the error counter counted up in this manner is counted down for the entire channel/slot. In case of transient communication badness due to, for example, an interference electric wave, in many cases, since such communication badness may be alleviated with elapse of time, there may arise no trouble although the error counter is returned to its original state. In this manner, by automatically counting down the error counter during some period of time, the priority can be returned according to change of surrounding circumstances such as disappearance of an effect by interference electric waves.

Next, at S4900, the error count processing unit 13h acquires a reception error value from the reception control data packet processing unit 13e and the reception voice data packet processing unit 13f. At S4910, the acquired reception error value is stored as a reception error value of the second channel/slot.

In this manner, count-up of the error counter and setting of the reception error of when the second channel/slot is received are performed.

Next, at S4710 of FIG. 45, the diversity processing unit 13z executes a sequence of slot diversity process.

Figure 47:
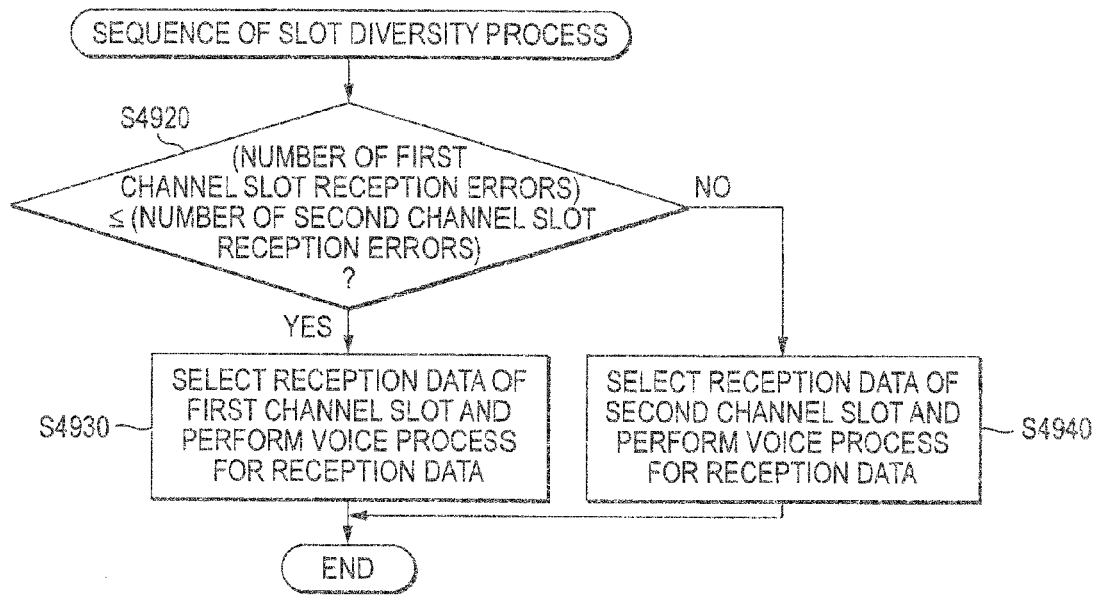
FIG. 47 is a flow chart showing a sequence of slot diversity process.

FIG. 47 is a flow chart showing a sequence of slot diversity process. In the sequence of slot diversity process, as shown in FIG. 47, at S4920, a reception error value of the first channel/ slot and a reception error value of the second channel/slot are read from the error count processing unit 13h and are compared each other. As a result of the comparison, if the reception error value of the first channel/slot is smaller than the reception error value of the second channel/slot, at S4930, reception data of the first channel/slot is selected, and a voice process is performed by the voice processing unit 21 for the master apparatus 20, while a voice process is performed by the voice processing unit 31 for the slave apparatus 30.

At S4920, if the reception error value of the second channel/slot is smaller than the reception error value of the first channel/slot, at S4940, reception data of the second channel/slot is selected, and, like the first channel/slot, a voice process is performed by the voice processing unit 21 for the master apparatus 20, while a voice process is performed by the voice processing unit 31 for the slave apparatus 30.

In this manner, for example, in different frequency bands of 1.9 GHz and 2.4 GHz, since data transmitted in two slots are very likely to be properly received in one frequency band although a reception error occurs in the other frequency band due to an interference electric wave, it is possible to conduct communication with slots in the one frequency band although communication can not be conducted with slots in the other frequency band. In addition, since data of different frequency bands are not simultaneously received, it is possible to reduce power consumption of the wireless transceiver 12, as compared to simultaneous reception of data.

While the third embodiment has been illustrated in the above, the present invention is not limited to the third embodiment. For example, the first and second channel/slot may be set in the unit of channel instead of the unit of slot.

In addition, while the wireless communication apparatus has been illustrated with the cordless telephone system in the third embodiment, the same effect can be achieved even when the present invention is applied to time division-based communication between wireless communication apparatuses such as, for example, communication between mobile telephones and base stations.

In addition, since the communication distance of the frequency band 1 (1.9 GHz band) having a long wavelength at the same transmission power is the largest and a communication distance becomes smaller as a wavelength becomes shorter, priority is set in order of long wavelength in the frequency band 1 to 3 in this embodiment. However, if transmission power is different in the frequency bands, a relation between priority and a frequency band may be varied. Transmission power which can be set in each frequency band is specified according to national wireless standards and there is a need to set transmission power to be lower in one frequency band than in other frequency bands according to circumstances of every nation. In that case, since a communication distance can not be secured even with a long wavelength, priority of frequency bands is rated using both of wavelength and transmission power.

Many modifications and variations of the present invention are possible in the light of the above techniques. It is therefore to be understood that within the scope of the invention the invention may be practiced than as specifically described. The present application is based upon and claims the benefit of priorities of Japanese Patent Applications Nos. 2008-136235, 2008-165578 and 2008-190575, the contents of which are incorporated herein by reference in its entirety.

What is claimed is:

1. A wireless communication apparatus, comprising:
    a channel allocating unit which allocates and stores a plurality of frequency channels in a plurality of frequency bands, comprising at least three frequency bands, to a usual-use channel group and a waiting channel group, respectively;
    a wireless transceiver which conducts communication with another wireless communication apparatus using one of channels allocated to the usual-use channel group by the channel allocating unit;
    a channel replacement unit which replaces the channel being used with a channel in the waiting channel group which belongs to a second band of the plurality of frequency bands other than a first band of the plurality of frequency bands to which the channel being used belongs; and
    a reception electric field intensity measuring unit which measures a reception electric field intensity of a channel of another band of the plurality of frequency bands other than the first band,
    wherein the channel replacement unit selects among the at least three frequency bands to select the second band of the plurality of frequency bands based on a wavelength of each frequency band of the plurality of frequency bands,
    wherein the channel replacement unit replaces the channel being used, based on the reception electric field intensity measured by the reception electric field intensity measuring unit.

2. The wireless communication apparatus according to claim 1, wherein the channel replacement unit selects a longer wavelength in the plurality of frequency bands as the second band.

3. The wireless communication apparatus according to claim 1, wherein the channel replacement unit selects the second band of the plurality of frequency bands based on a wavelength and transmission power of each frequency band of the plurality of frequency bands.

4. The wireless communication apparatus according to claim 1, wherein the reception electric field intensity measuring unit sets a priority information of each of the frequency bands based on the reception electric field intensity.

5. The wireless communication apparatus according to claim 4, the channel replacement unit selects one of the frequency bands based on the priority information.

6. A wireless communication apparatus comprising:
    a channel allocating unit which allocates and stores a plurality of frequency channels in a plurality of frequency bands, comprising at least three frequency bands, to a usual-use channel group and a waiting channel group, respectively;
    a wireless transceiver which conducts communication with another wireless communication apparatus using one of channels allocated to the usual-use channel group by the channel allocating unit;
    a channel replacement unit which replaces the channel being used with a channel in the waiting channel group which belongs to a second band of the plurality of frequency bands other than a first band of the plurality of frequency bands to which the channel being used belongs, wherein the channel replacement unit selects among the at least three frequency bands to select the second band of the plurality of frequency bands based on a wavelength of each frequency band of the plurality of frequency bands; and
    a replacement determining unit which determines whether the channel being used needs to be replaced, wherein the channel replacement unit replaces the channel being used, when the replacement determining unit has determined that the channel being used needs to be replaced.

7. A wireless communication apparatus, comprising:

a channel selecting unit which selects a first channel in a first band of a plurality of frequency bands, comprising at least three frequency bands, and selects a second channel in a second band of the plurality of frequency bands other than the first band;

a wireless transceiver which receives identical data by two slots from another wireless communication apparatus, using the first channel and the second channel selected by the channel selecting unit; and a reception electric field intensity measuring unit which measures a reception electric field intensity of a channel in another hand of the plurality of frequency bands other than the first band, wherein the channel selecting unit selects the second channel based on the reception electric field intensity measured by the reception electric field intensity measuring unit, and wherein the channel selecting unit selects among the at least three frequency bands to select the second band of the plurality of frequency bands based on a wavelength of each frequency band of the plurality of frequency bands.

8. The wireless communication apparatus according to claim 7, wherein the channel selecting unit selects a longer wavelength in the plurality of frequency bands as the second band.

9. The wireless communication apparatus according to claim 7, wherein the channel selecting unit selects the second band of the plurality of frequency bands based on a wavelength and transmission power of each frequency band of the plurality of frequency bands.

* * * * *